(12) United States Patent
Saleh Ibrahim et al.

(10) Patent No.: US 12,258,359 B1
(45) Date of Patent: Mar. 25, 2025

(54) METHOD OF PREPARING A HYBRID INORGANIC-ORGANIC MOF COMPOUND WITH HIGH PHOTOLUMINESCENCE (PL) QUANTUM YIELDS (PLQY)

(71) Applicant: United Arab Emirates University, Al Ain (AE)

(72) Inventors: Na'il Saleh Ibrahim, Al Ain (AE); Shaikha S. Al Neyadi, Al Ain (AE)

(73) Assignee: United Arab Emirates University, Al Ain (AE)

( * ) Notice: Subject to any disclaimer, the term of this patent is extended or adjusted under 35 U.S.C. 154(b) by 0 days.

(21) Appl. No.: 18/743,681

(22) Filed: Jun. 14, 2024

(51) Int. Cl.
*C07F 3/00* (2006.01)
*C09B 67/20* (2006.01)
*C09K 11/06* (2006.01)

(52) U.S. Cl.
CPC .......... *C07F 3/003* (2013.01); *C09B 67/0065* (2013.01); *C09K 11/06* (2013.01); *C09K 2211/1018* (2013.01)

(58) Field of Classification Search
CPC ........ C07F 3/003; C07F 3/06; C09B 67/0065; C09K 11/06; C09K 2211/1458
See application file for complete search history.

(56) References Cited

PUBLICATIONS

A. Gürses, et al. Dyes and pigments. Springer, 2016 (Year: 2016).*
P. Gregory, Kirk-Othmer Encyclopedia of Chemical Technology 1-66 ("Gregory") (2000) (Year: 2000).*
Z. Yin et al., 378 Coordination Chemistry Reviews, 500-512 (2019) (Year: 2019).*
J. Liu et al., 46 Chem. Soc. Rev., 5730-5770 (2017) (Year: 2017).*
C.G. Piscopo, et al., 208 Microporous and Mesoporous Materials, 30-35 (2015) (Year: 2015).*
Guo, B-B, et al. 9.23 Advanced Optical Materials 2100283 ("Guo") (2021) (Year: 2021).*
P. Laha, et al. 11.11 Advanced Materials Interfaces 2300889 (2024) ("Laha") (Year: 2024).*
J. Choi, et al. 1.7 The Journal of Physical Chemistry Letters 1101-1106 (2010) ("Choi") (Year: 2010).*
D-D. Xu, Dong-Dong, et al. 61.51 Inorganic chemistry 21107-21114 (2022) ("Xu") (Year: 2022).*
Y. Wen, et al. 29.37 Advanced Materials 1700778 (2017) (Year: 2017).*
Hawley's Condensed Chemical Dictionary, p. 540 (Year: 2016).*
A. Anderson et al., Reagents, in Theory and Strategy in Histochemistry (Year: 1991).*
H. Kim et al., 137 Journal of the American Chemical Society, 10009-10015 (2015) (Year: 2015).*
Hawley's Condensed Chemical Dictionary, p. 1190 (Year: 2016).*
S. Kula, et al. 197 Journal of Photochemistry and Photobiology B: Biology 111555, (2019) ("Kula") (Year: 2019).*
Wang, Hang, et al. "Membrane Adsorbers with Ultrahigh Metal-Organic Framework Loading for High Flux Separations." Nature Communications, vol. 10, No. 1, Sep. 2019, p. 4204.
Sha, Haifeng, and Bing Yan. "Dye-Functionalized Metal-Organic Frameworks with the Uniform Dispersion of MnO 2 Nanosheets for Visualized Fluorescence Detection of Alanine Aminotransferase." Nanoscale, vol. 13, No. 47, 2021, pp. 20205-20212.
Wang, Yu, et al. "The Synthesis and Photoluminescence of Three Porous Metal-Organic Frameworks." Inorganic Chemistry Communications, vol. 129, Jul. 2021, p. 108613.

* cited by examiner

*Primary Examiner* — Alexander R Pagano
*Assistant Examiner* — Frank S. Hou
(74) *Attorney, Agent, or Firm* — Boyle Fredrickson, S.C.

(57) ABSTRACT

A method of preparing a hybrid inorganic-organic metal organic framework compound in the form of 3TCC@MOF-177 solids, with high photoluminescence (PL) quantum yields (PLQY) by mixing a dye in the form of 1-cyano-2-[α-terthiophen-2-yl]-vinyl)carboxylic acid with a metal organic framework in the form of MOF-177 in an organic solvent (such as methanol, glycerol, DMF, ethanol) to form a solvent mixture and heating the solvent mixture to obtain the hybrid inorganic-organic Metal (MOF) compound. The PLQY of the hybrid inorganic-organic MOF compound prepared using the method is enhanced by more than 25% than any materials produced by conventional methods.

7 Claims, 51 Drawing Sheets
(48 of 51 Drawing Sheet(s) Filed in Color)

FIG. 6A 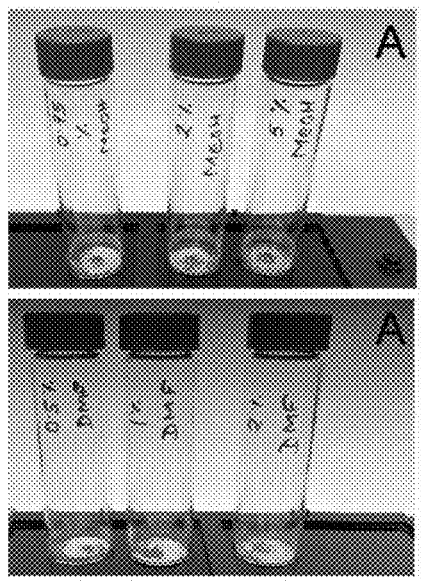 FIG. 6B 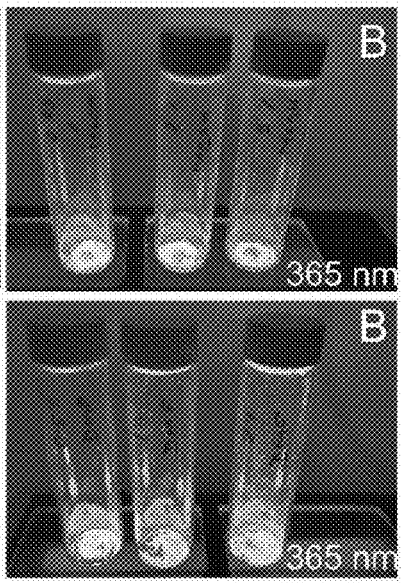 FIG. 6C 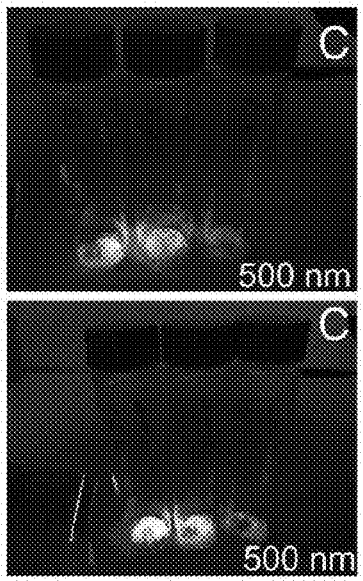
FIG. 6D FIG. 6E FIG. 6F
FIG. 6G 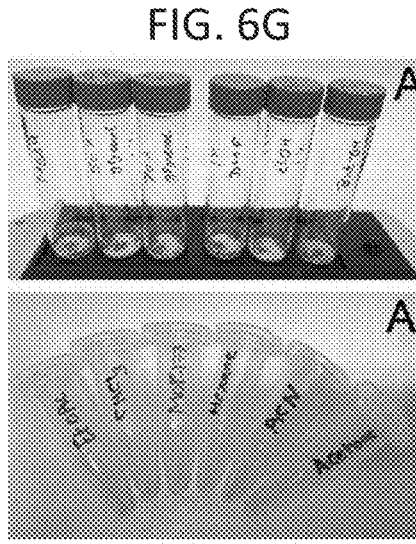 FIG. 6H 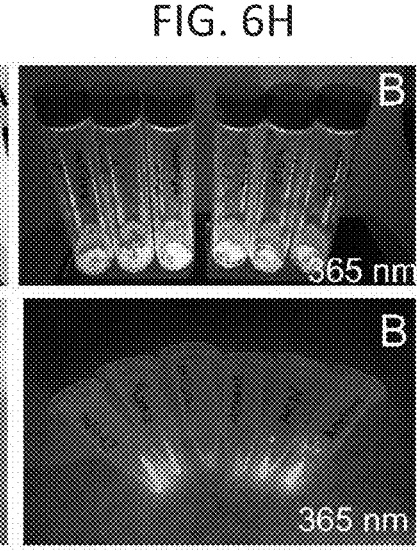 FIG. 6I 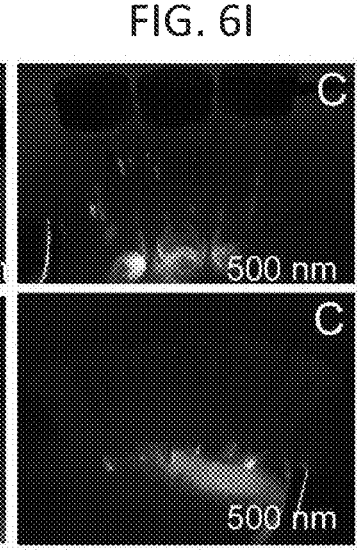
FIG. 6J FIG. 6K FIG. 6L

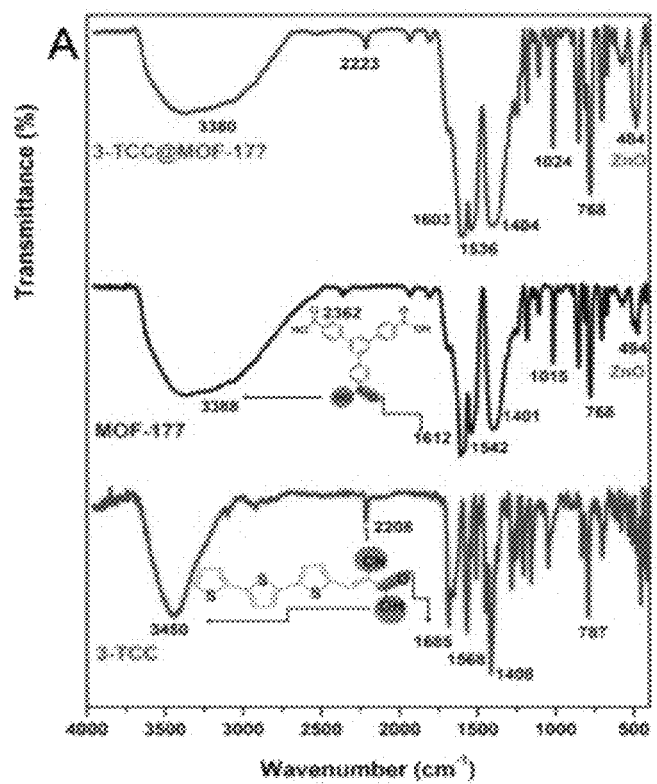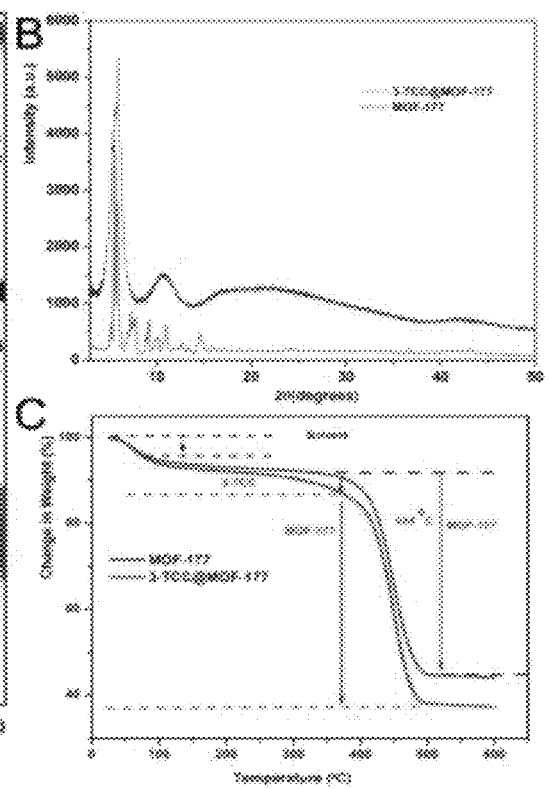
FIG. 7A
FIG. 7B
FIG. 7C

FIG. 17A
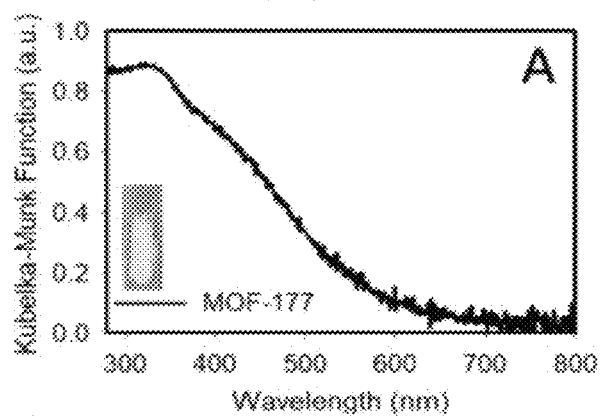
FIG. 17B
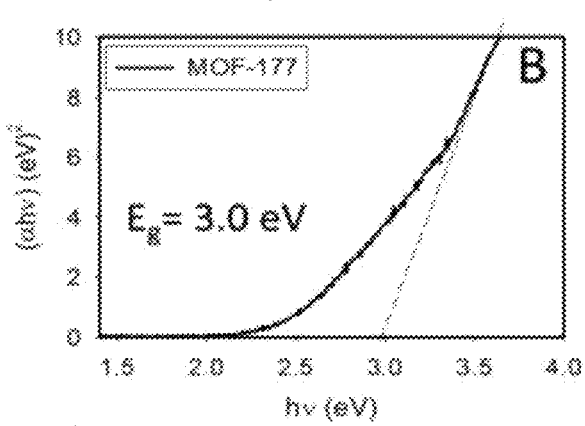
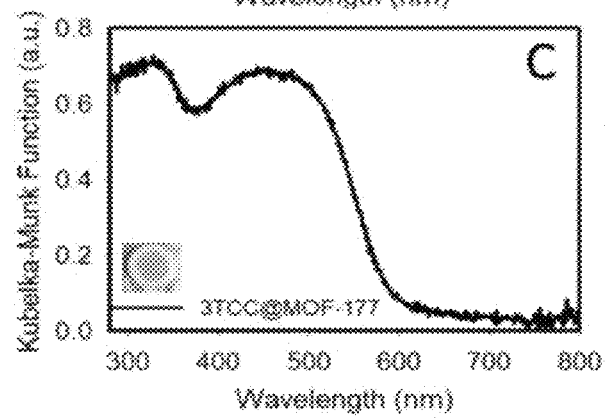
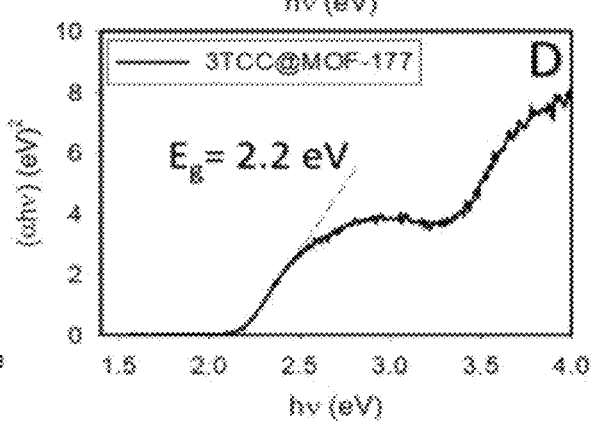
FIG. 17C
FIG. 17D FIG. 20A
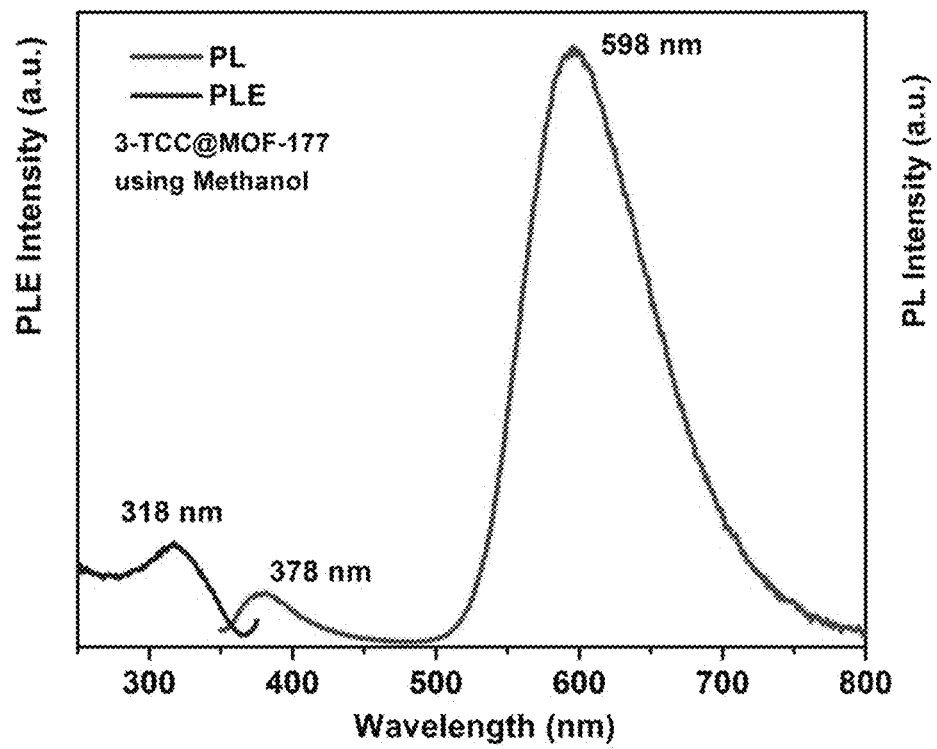
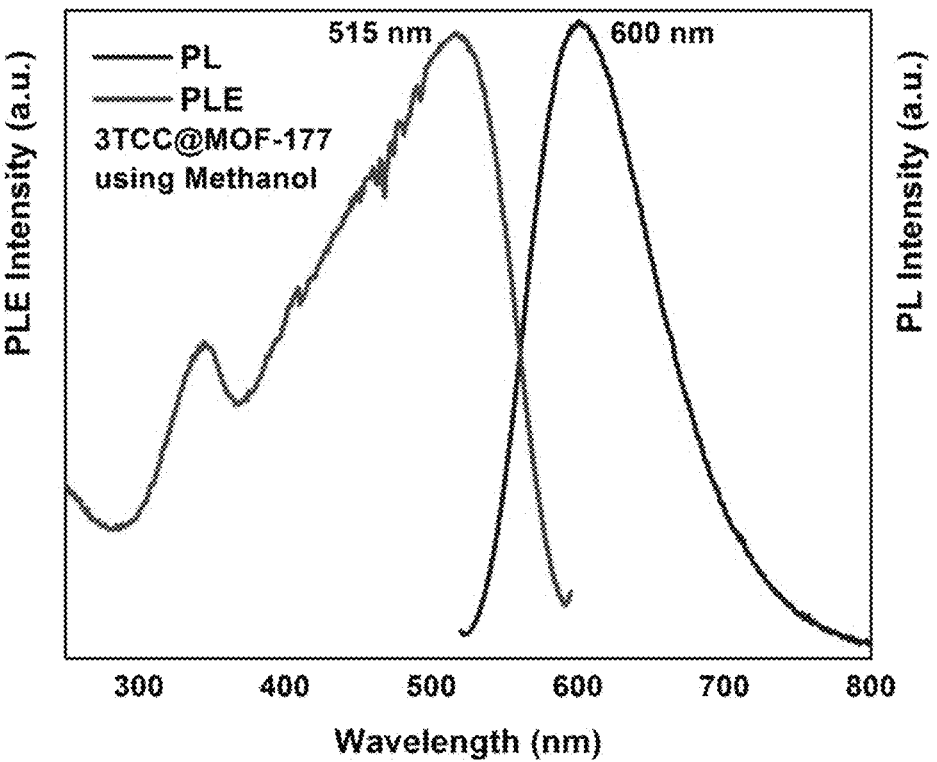
FIG. 20B FIG. 20C
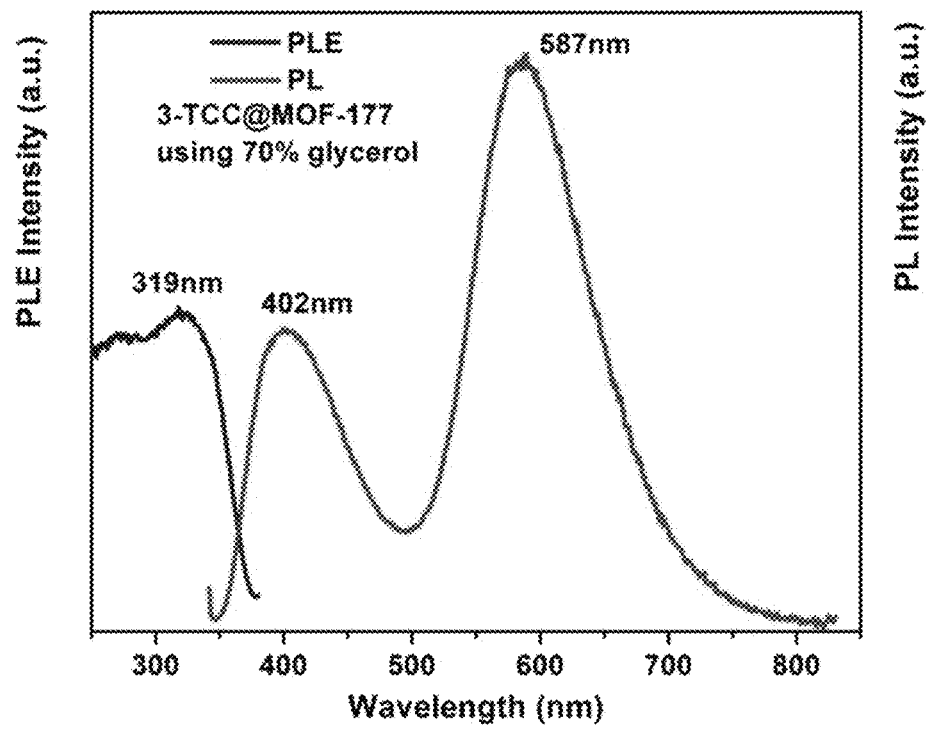
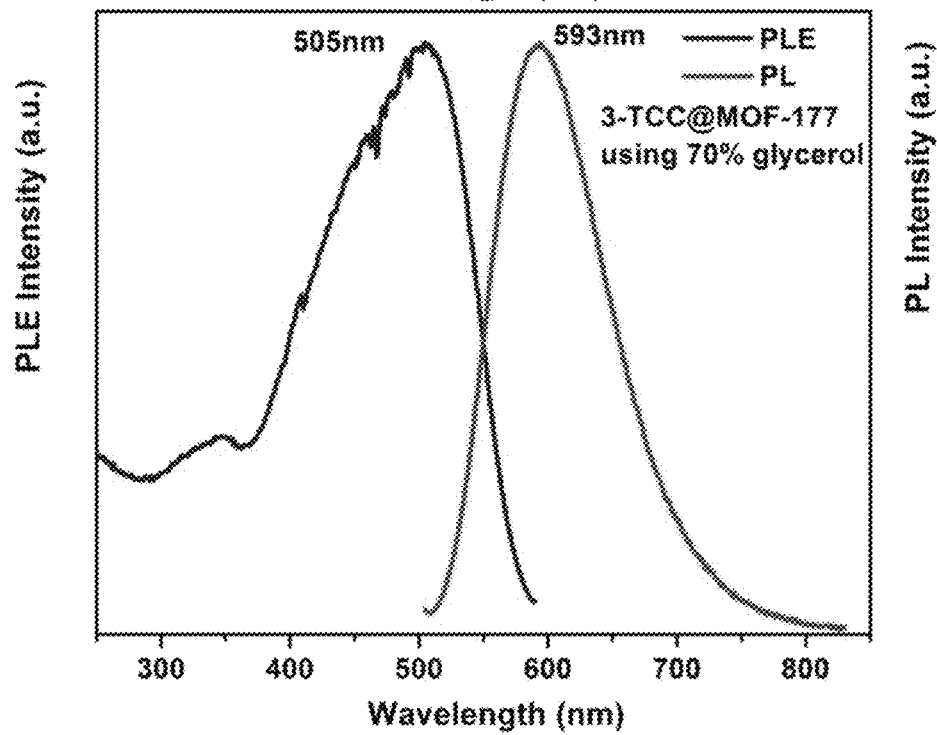
FIG. 20D FIG. 20E
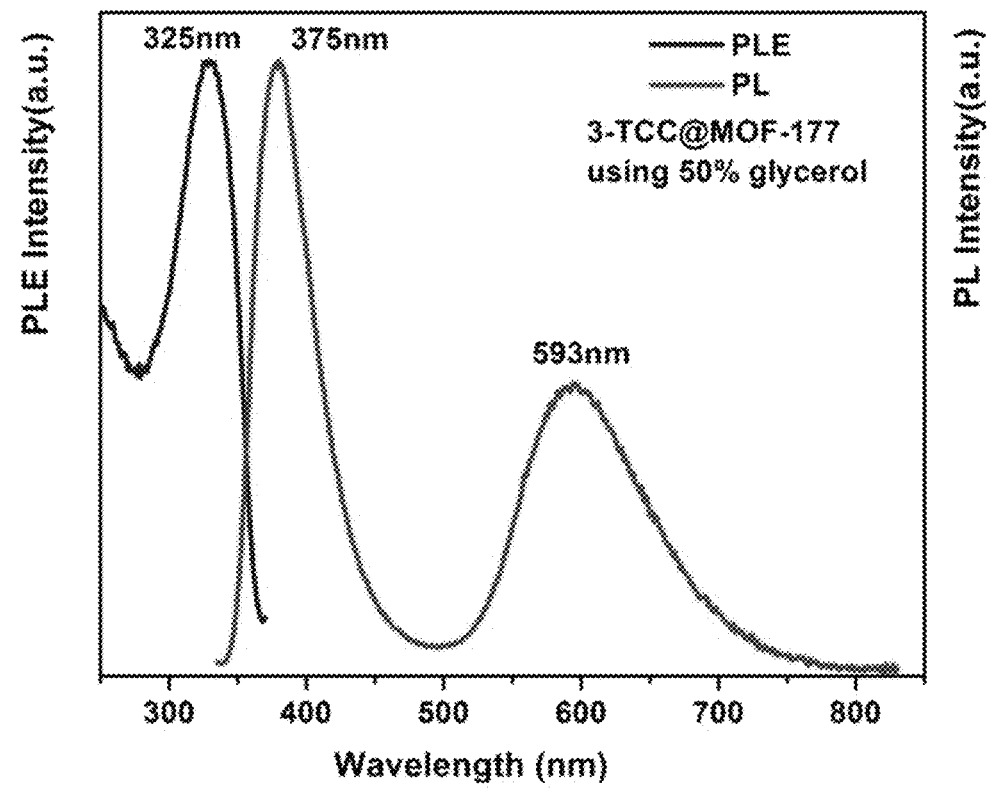
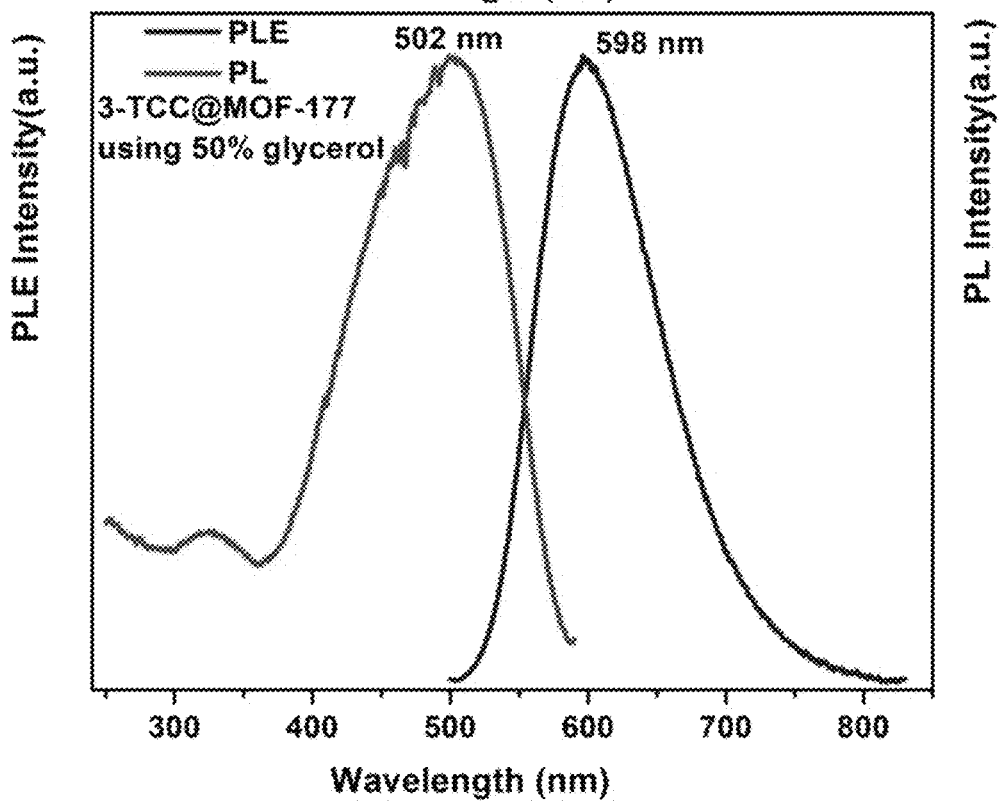
FIG. 20F FIG. 20G
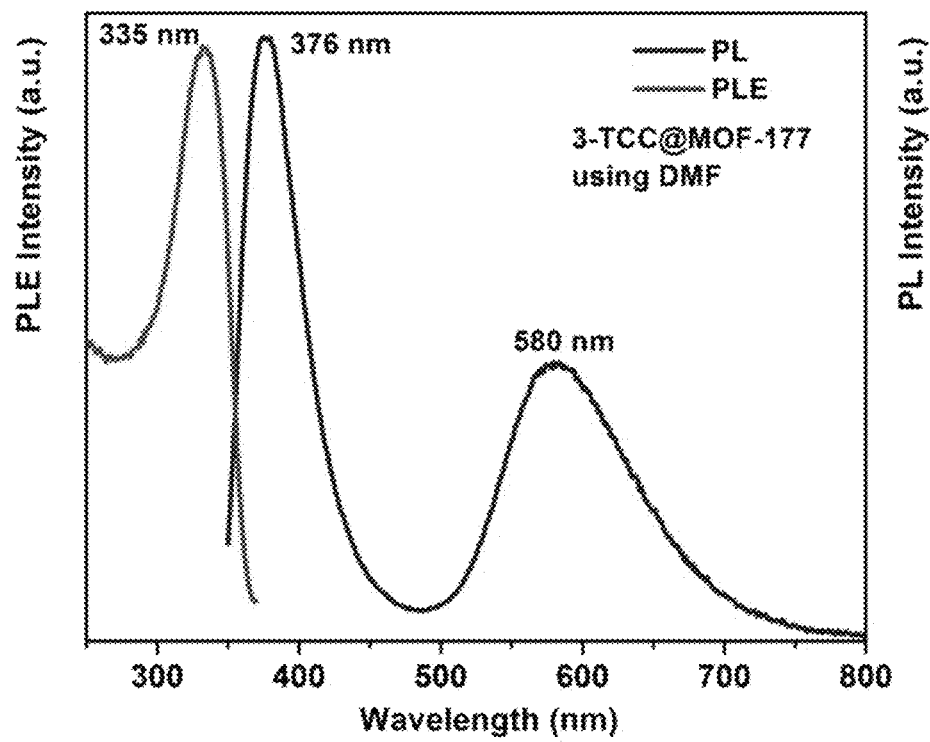
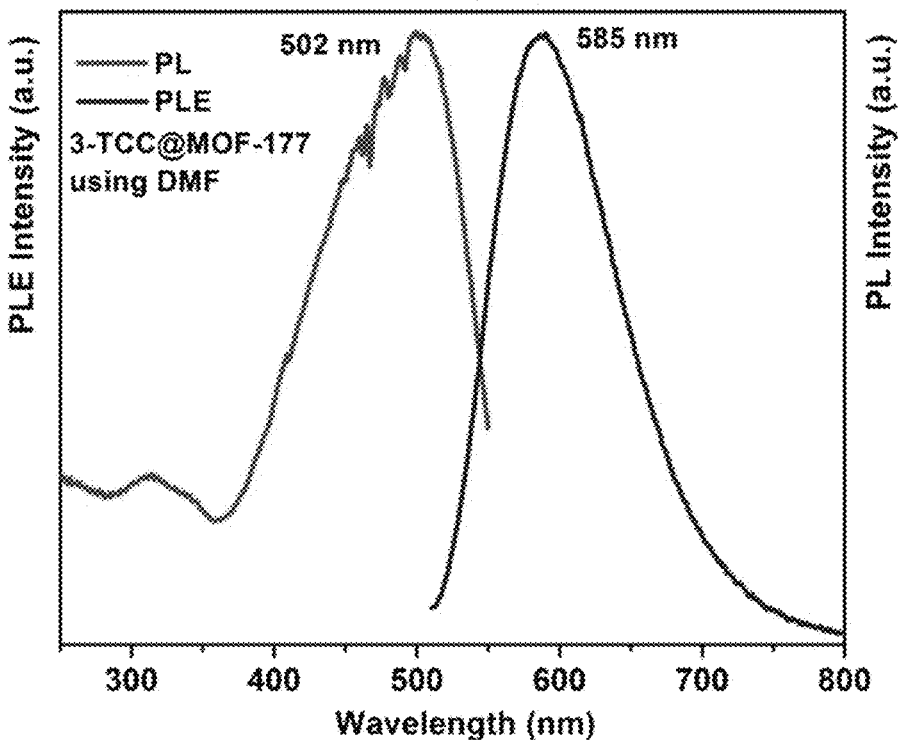
FIG. 20H FIG. 20I
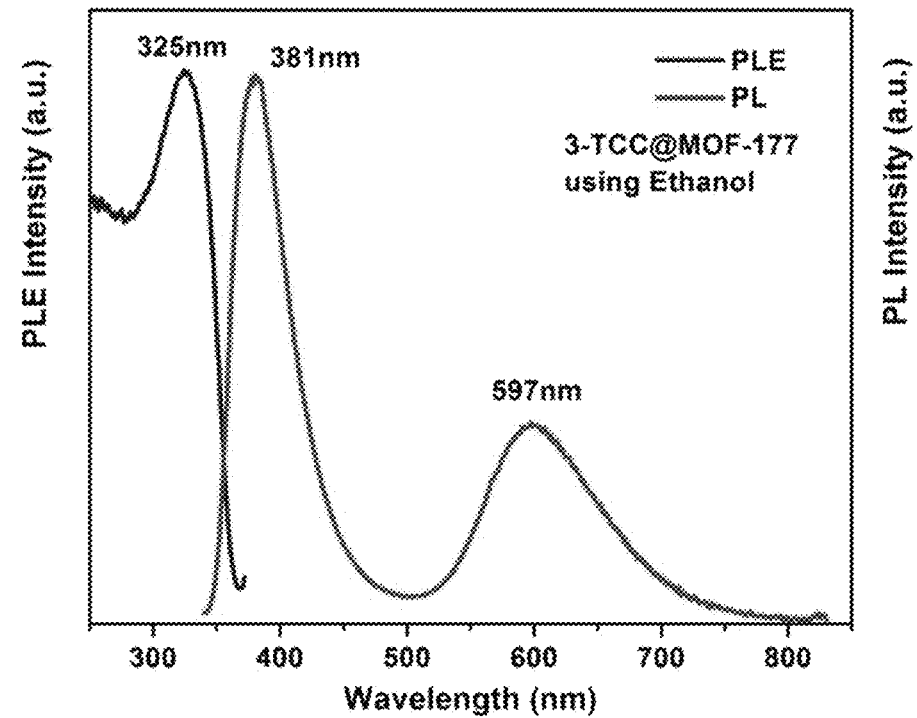
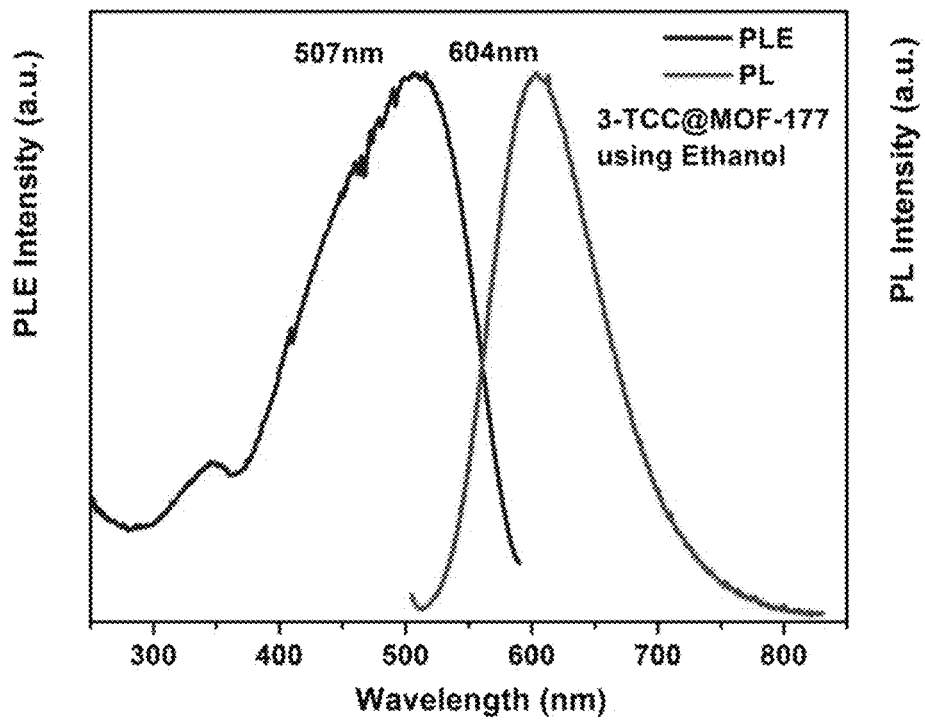
FIG. 20J FIG. 20K
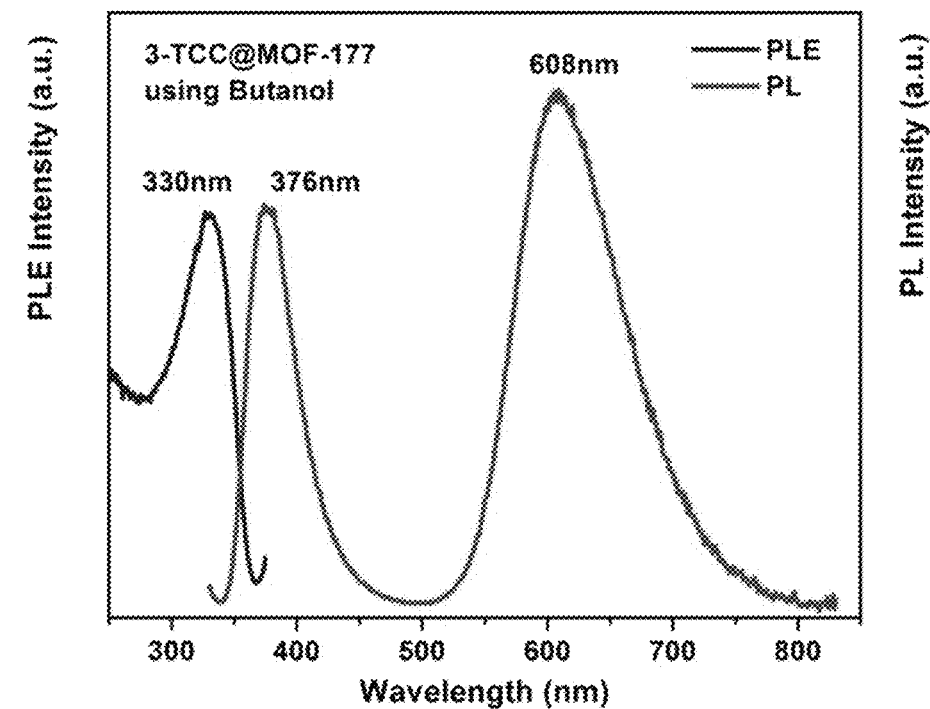
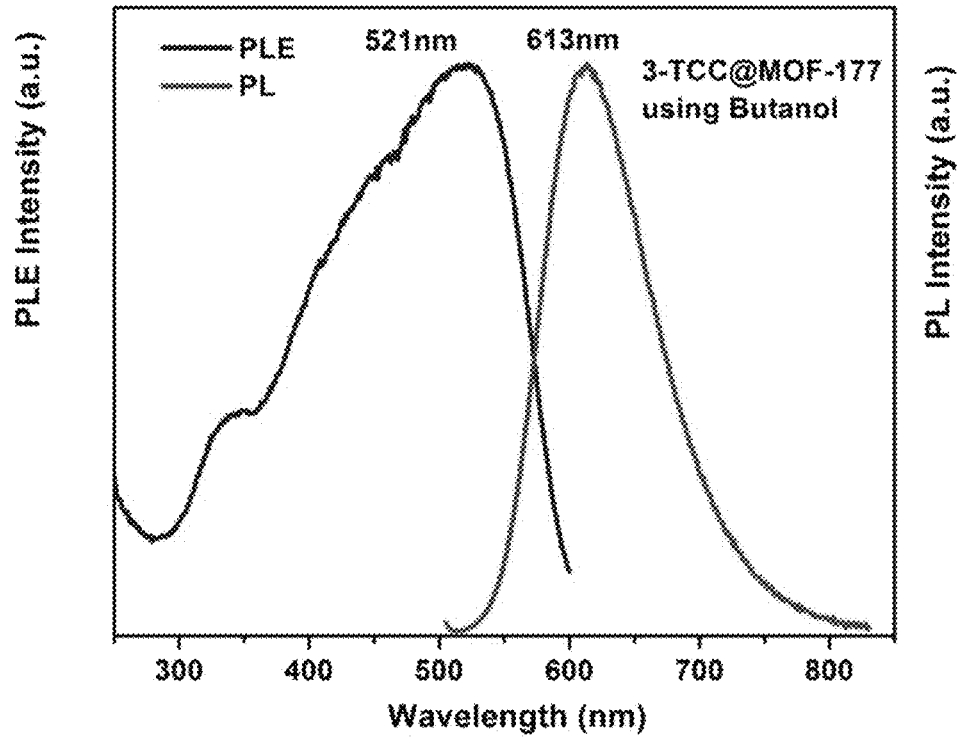
FIG. 20L FIG. 21A
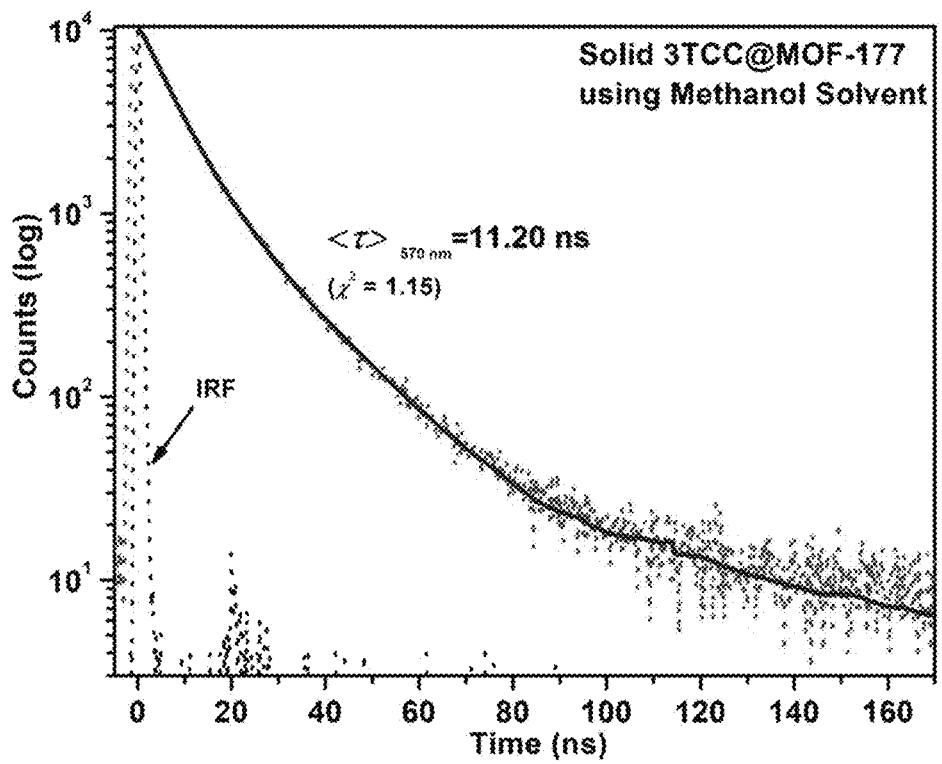
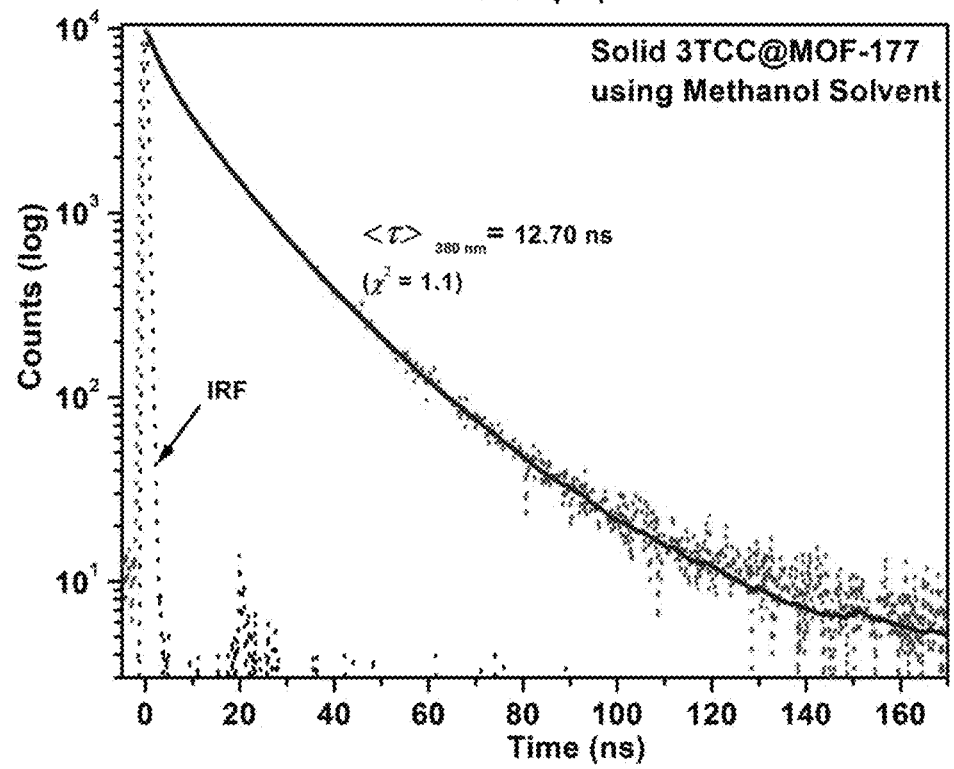
FIG. 21B FIG. 21E
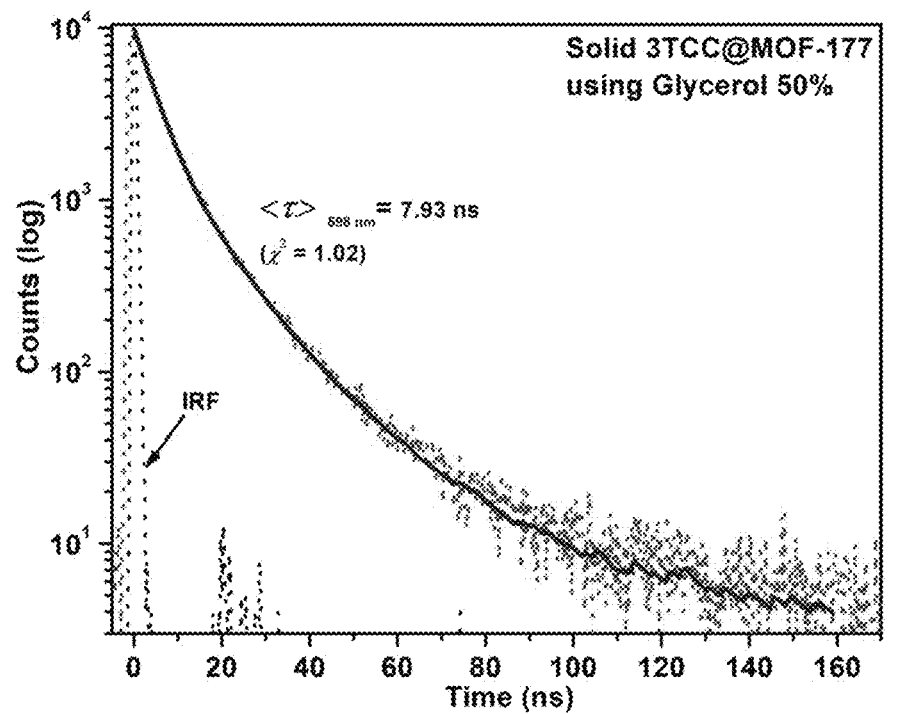
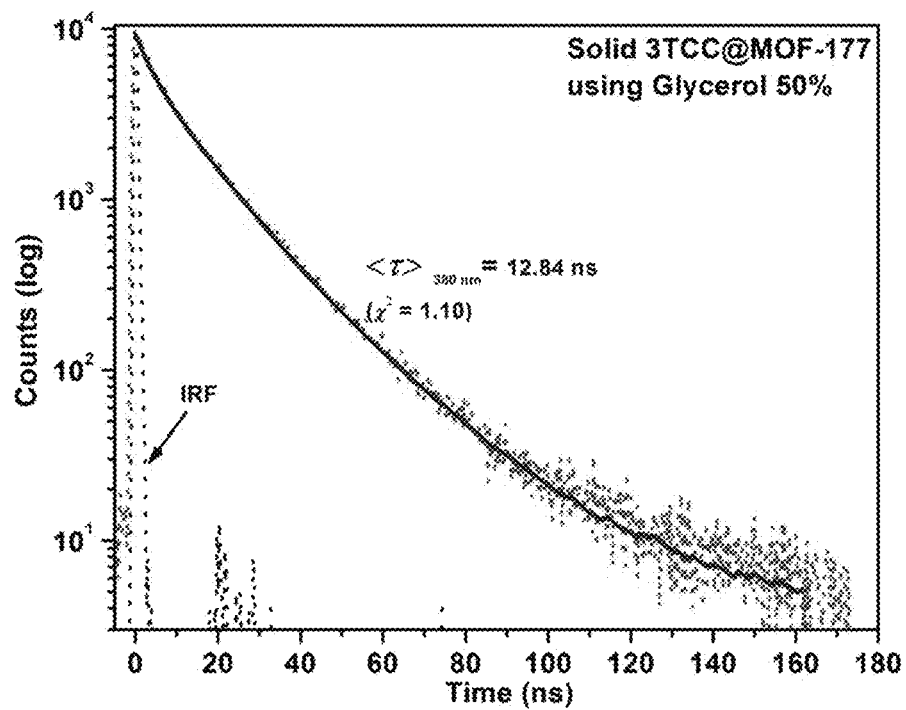
FIG. 21F FIG. 21G
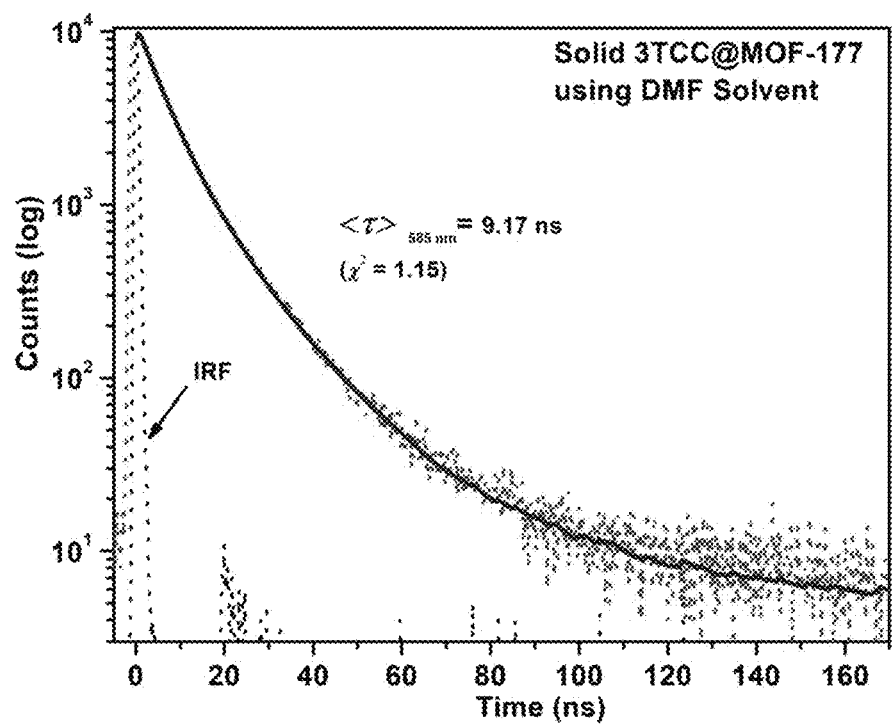
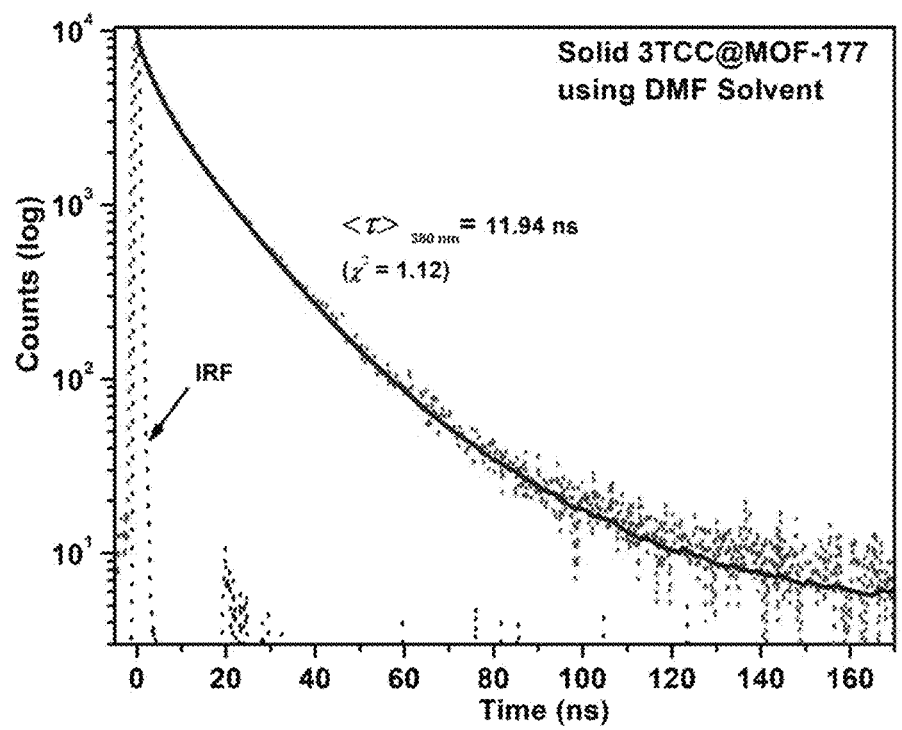
FIG. 21H FIG. 21K
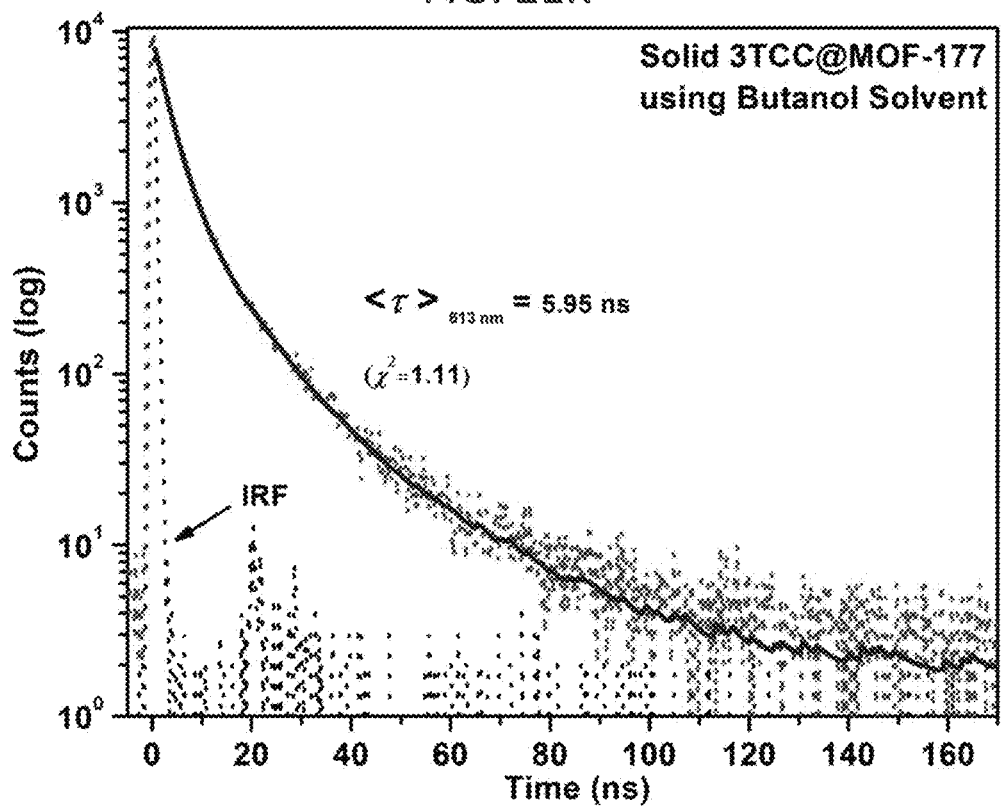
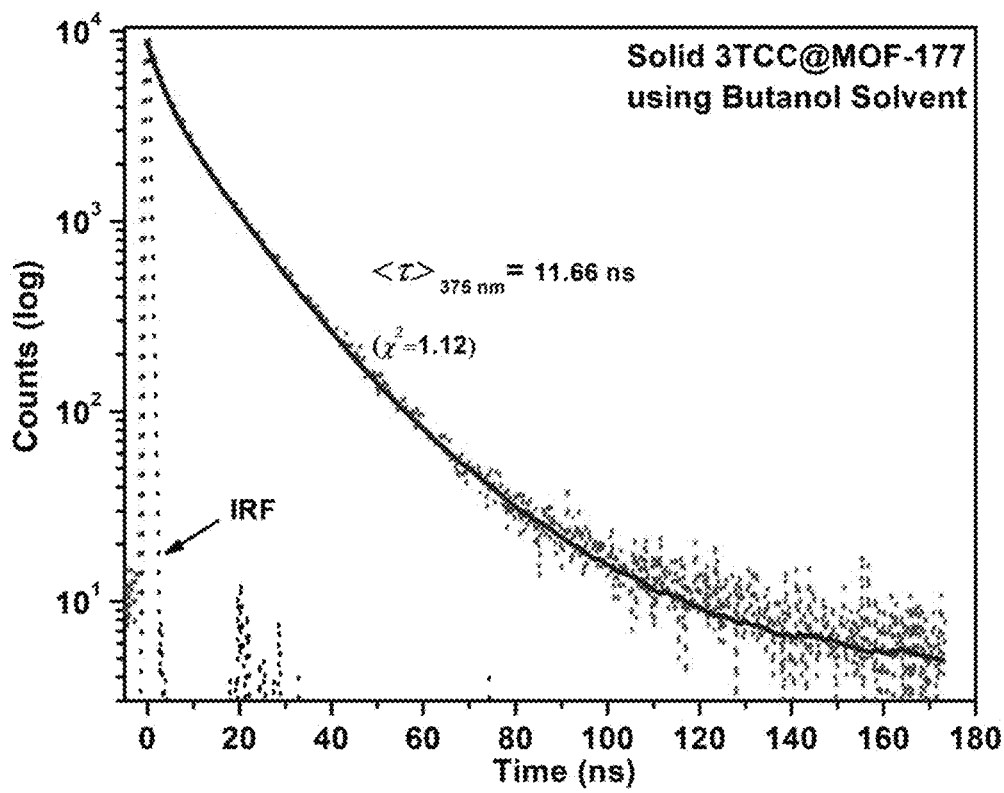
FIG. 21L

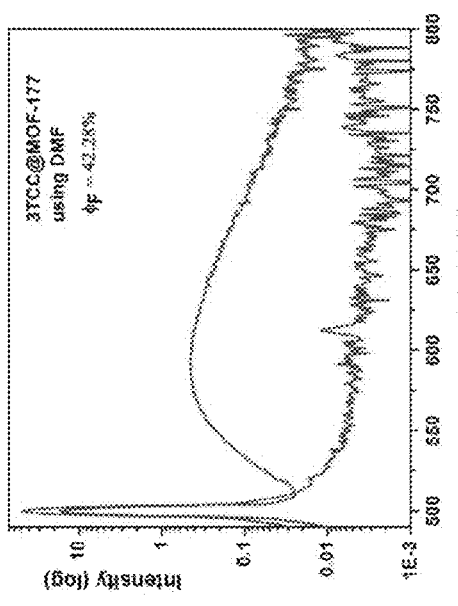
FIG. 23A
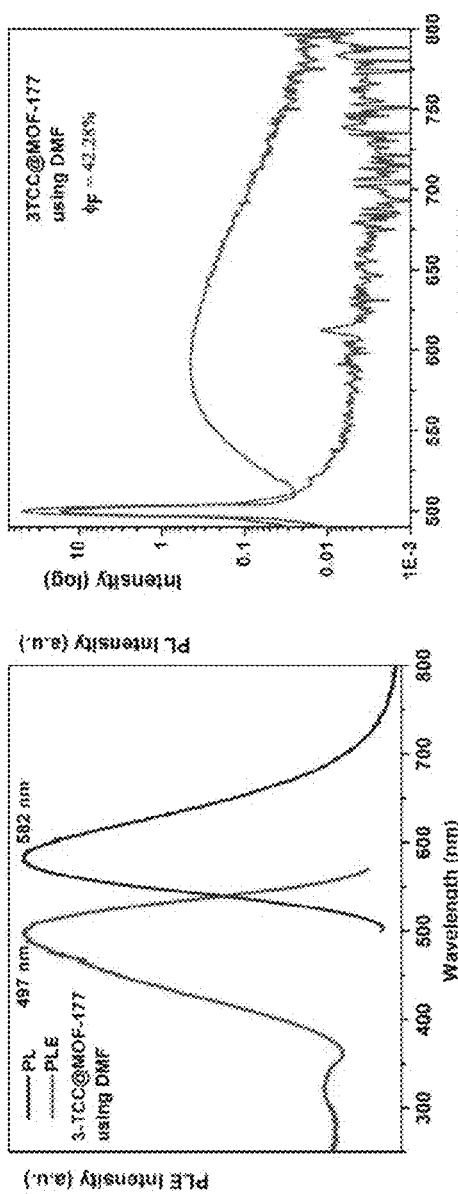
FIG. 23B
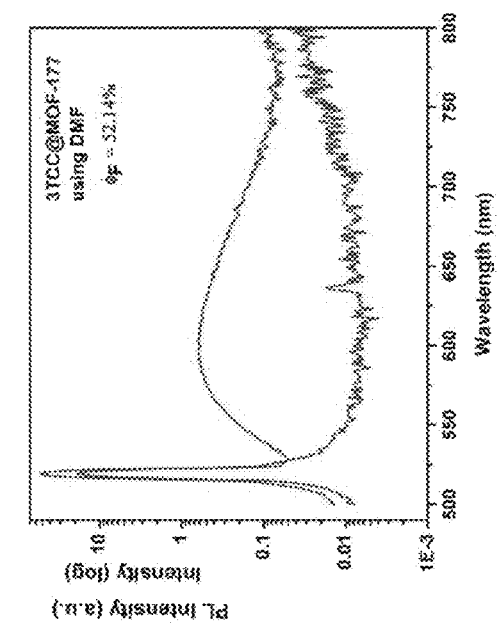
FIG. 23C
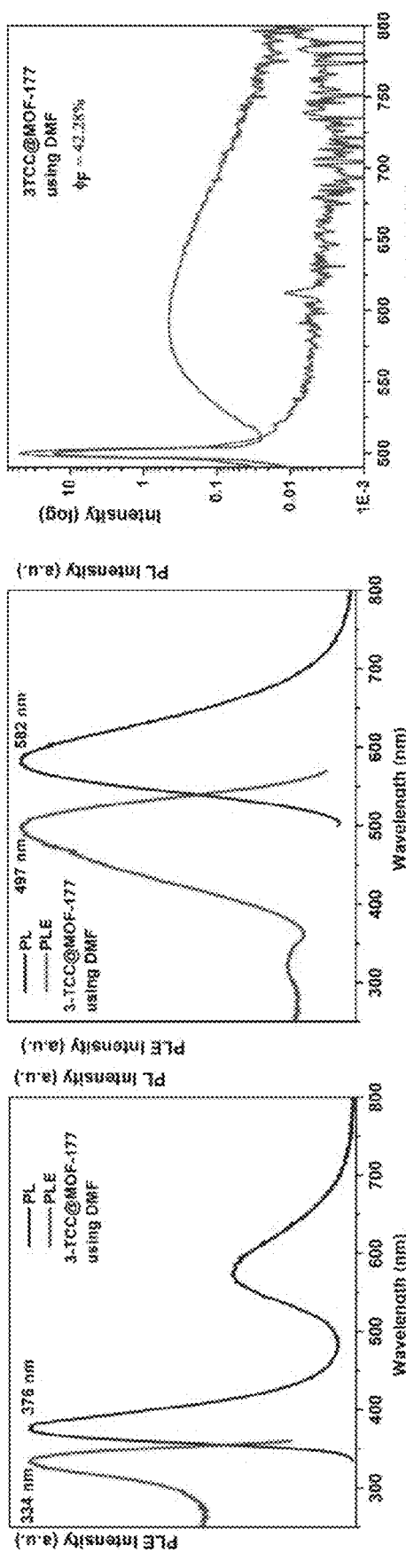
FIG. 23D
FIG. 23E
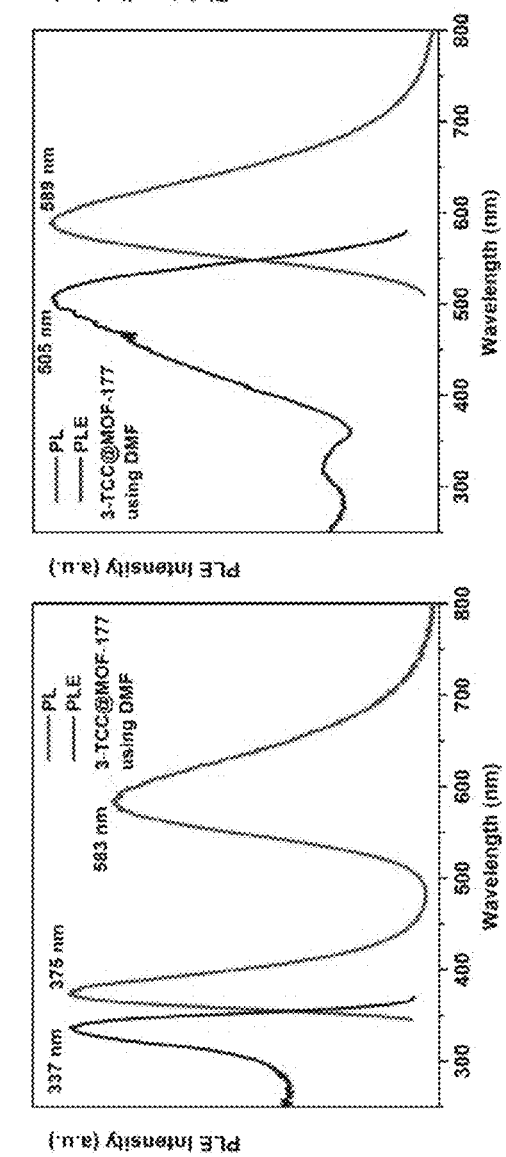
FIG. 23F

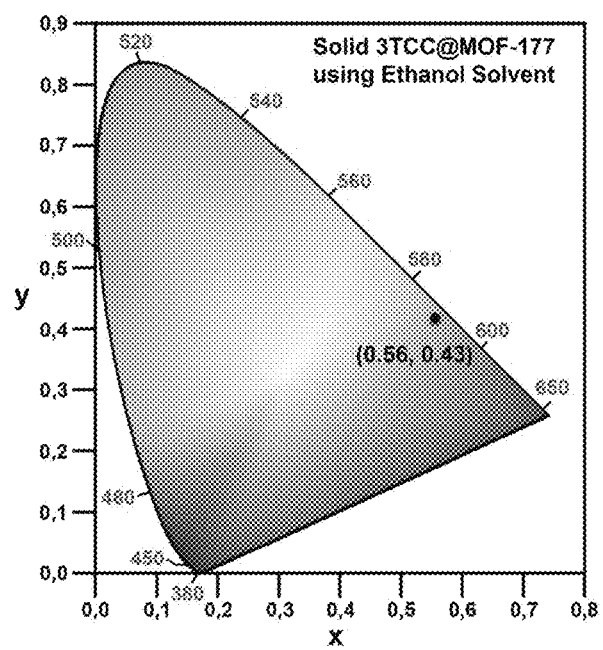 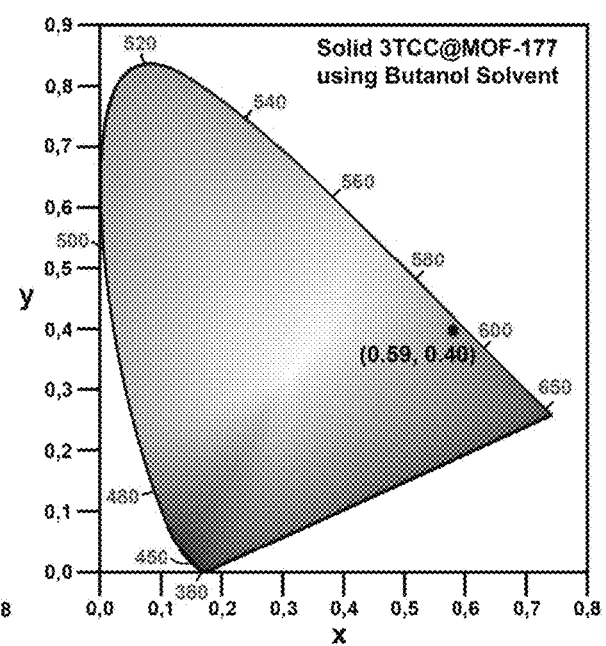
FIG. 27E
FIG. 27F

METHOD OF PREPARING A HYBRID INORGANIC-ORGANIC MOF COMPOUND WITH HIGH PHOTOLUMINESCENCE (PL) QUANTUM YIELDS (PLQY)

FIELD OF THE INVENTION

The invention relates to the field of luminescent materials.

BACKGROUND

The development of solid luminescent architectures incorporating organic, inorganic, and hybrid fluorophores has been a focus of photonics research for several decades due to their potential applications in photonic devices. These materials are prized for their rapid responsiveness and low detection limits, making them ideal for the fabrication of miniature photonic devices. Such devices boast advantages including non-invasiveness, precision, quick response time, high spatial resolution, and suitability for electronic and electromagnetic measurements in dynamic environments. Efforts to engineer solids with exceptional properties have often focused on embedding small synthetic organic chromophores within the matrices of metal-organic frameworks (MOFs), which are characterized by their synthetic cage-like structures and large void spaces. There have been endeavours to integrate specific chromophores with twisted intramolecular charge transfer (TICT) capabilities as guest molecules in MOF matrices. However, even with direct modification of the MOF matrices, the photoluminescence quantum yield (PLQY) has not surpassed a 25% enhancement. Having a high PLQY yield will enable more diverse usages in the fields mentioned above.

There exists a need to prepare a modified MOF matrix with high PLQY, surpassing 25% enhancement with easy preparation methods.

SUMMARY OF THE INVENTION

According to one aspect of the invention, there is provided a method of preparing a hybrid inorganic-organic MOF compound with high photoluminescence quantum yields (PLQY) comprising providing a dye, providing a metal organic framework, providing a solvent, mixing the dye with the metal organic framework in the solvent to form a solvent mixture and heating the solvent mixture to obtain the hybrid inorganic-organic MOF compound.

The dye may be 1-cyano-2-[α-terthiophen-2-yl]-vinyl) carboxylic acid (3TCC).

The metal organic framework (MOF) may be Zn 4 O (—COO) 6 and triangular 1,3,5-benzenetribenzoate (BTB) (MOF-177).

The solvent may be selected from any of or a combination of methanol, ethanol, butanol, dimethylformamide (DMF) and glycerol in water.

The hybrid inorganic-organic MOF compound may be 3TCC@MOF-177 solids.

In a preferred embodiment, the step of mixing the dye, the metal organic framework and the solvent to form a solvent mixture includes mixing the solution of dye, the metal organic framework and the solvent by stirring for about 24 hours. The stirring of the solvent mixture may be continuous stirring or intermittent stirring.

In a preferred embodiment, when the solvent is selected from methanol, ethanol, butanol, and glycerol in water, and combination thereof, the step of heating the solvent mixture is carried out at a temperature of about 80° C. until the solvent has evaporated from the solvent mixture thereby leaving behind dry hybrid inorganic-organic MOF compound.

In another preferred embodiment, when the solvent is selected as DMF, the step of heating the solvent mixture comprises heating the solvent mixture at a temperature of about 120° C. until the solvent has evaporated thereby leaving behind dry hybrid inorganic-organic MOF compound In a preferred embodiment, the step of mixing the dye, the metal organic framework and the solvent involves mixing the dye and metal organic framework in 1 ml of the solvent in the ratio 1% dye to the metal organic framework.

The high photoluminescence (PL) quantum yields (PLQY) of the hybrid inorganic-organic MOF compound prepared by this method is enhanced by more than 25%.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further features of the invention are described hereinafter by way of a non-limiting example of the invention, with reference to and as illustrated in the accompanying schematic drawings. In the drawings:

FIG. 6A to 6L shows photos in daylight (A) and dark (B) upon exposure to commercial UV lamp set at 365 nm and commercial white LED (D) equipped with a band pass filter (BPF) at 450±50 nm of the 3TCC@MOF-177 compound in different solvents;

FIG. 7A illustrates the Fourier-transform infrared spectroscopy (FTIR) spectra of 3TCC (red), MOF-177 (blue), and 3TCC@MOF-177 (green; 90 wt % of 3TCC in MOF-177 prepared using methanol) in KBr;

FIG. 7B illustrates a graph or Power X-ray diffraction (PXRD) data for MOF-177 and 3TCC@MOF-177 (10 wt % of 3TCC in MOF-177 prepared using methanol) powders;

FIG. 7C illustrates the thermal decomposition data showing mass reduction of 3-TCC and 3-TCC@MOF-177 (40 wt % of 3TCC in MOF-177 prepared using methanol) under N2 atmosphere at a heating rate of 5° C./min;

FIGS. 17A and 17B provides the DRS spectra (Kubelka-Munk function) and corresponding Tauc plots of MOF-177; FIGS. 17C and 17D provide DRS spectra (Kubelka-Munk function) and corresponding Tauc plots of 3TCC@MOF-177 solids (1 wt % of 3TCC in MOF-177 prepared from methanol) at 298 K utilizing direct optical band gaps;

FIGS. 20A-20L Illustrates the PLE (blue) and PL (red) spectra of 3TCC@MOF-177 solids (1 wt % 3TCC) at room temperature;

FIGS. 21A to 21L illustrates PL decays (red) and the non-exponential fit (blue) of 3TCC@MOF-177 (1 wt % 3TCC) solids at room temperature;

FIGS. 23A to 236C illustrates the PLE, PL, and PLQY spectra of 3TCC@MOF-177 solids at 0.5 wt % and FIGS. 23D to 236F illustrates the PLE, PL, and PLQY spectra of 2 wt % of 3TCC in MOF-177 prepared using DMF at room temperature;

FIGS. 27A to 27F illustrate the chromaticity plot of 3TCC@MOF-177 solids emission in CIE 1931 color space

DETAILED DESCRIPTION

Figure 1:
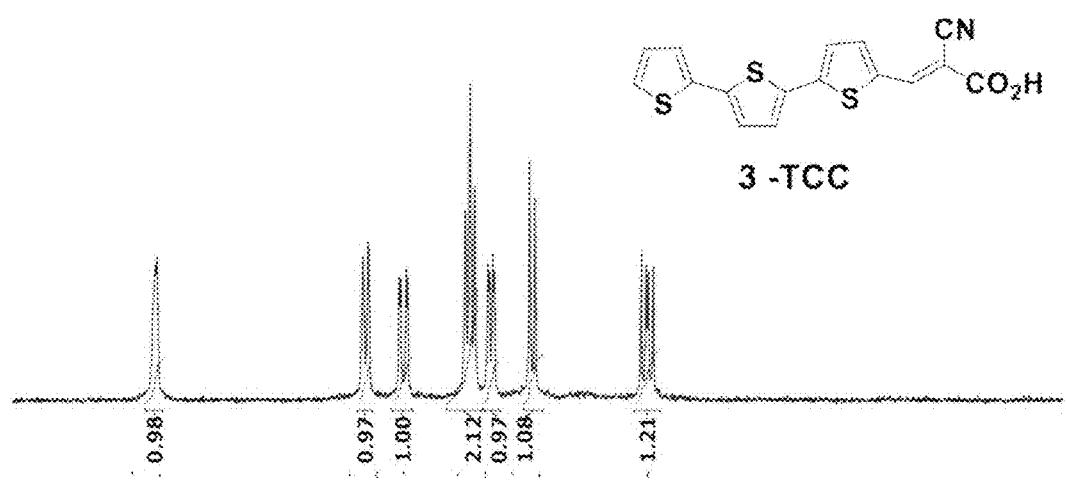
FIG. 1 shows the H NMR of dye 3-TCC (2 mM) in DMSO-d6 at room temperature.

This invention provides a method of preparing a hybrid inorganic-organic MOF compound with high photoluminescence (PL) quantum yields. The hybrid inorganic-organic MOF compound prepared by the method of the invention has over 25% increase in its PL quantum yields.

The invention relies on a simplified process which involves mixing a dye with a MOF, followed by solvent evaporation which enables the production of a hybrid inorganic-organic MOF compound with increased PLQY The process of preparing the hybrid inorganic-organic MOF compound is as follows:

Materials

All solvents (purity >99.9%)—toluene, dichloromethane, THF, methanol, ethanol, butanol, acetone, acetonitrile, butyl nitrile, chlorobenzene, chloroform, dimethylformamide (DMF), dimethyl sulfoxide (DMSO), ethyl acetate, and glycerol were obtained from Sigma-Aldrich (St. Louis, MO) and used as received. All reagents and the deuterated solvent (DMSO-d6) in the synthesis procedure were obtained from Sigma Aldrich and used without further purification.

Preparation of the 3TCC and MOF-177

Synthesis of 1,3,5-benzenetribenzoic acid (H3BTB)

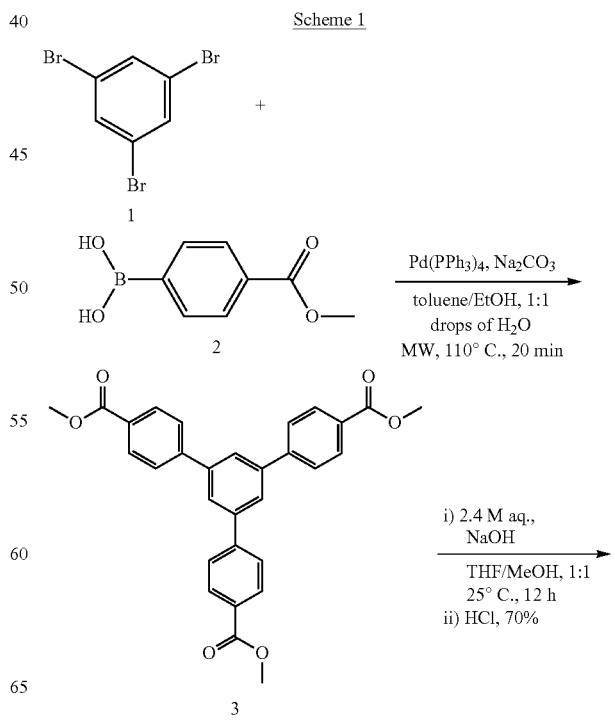

Scheme 1

-continued

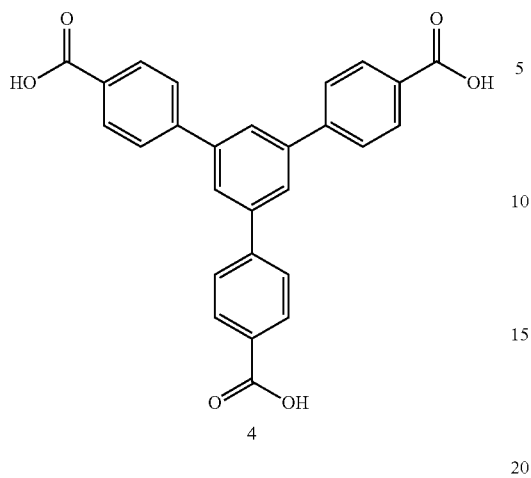

4

Synthesis of MOF-177

Scheme 2

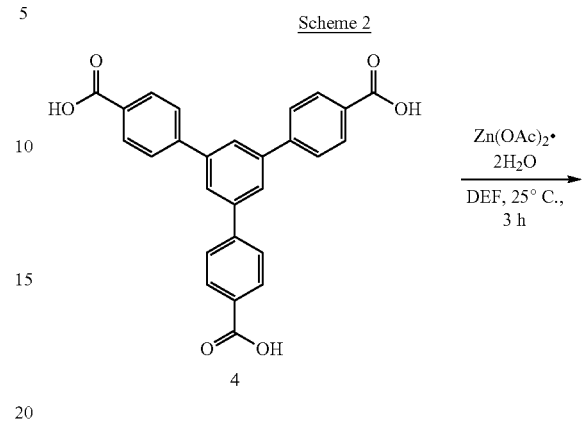

A synthetic method of manufacturing H3BTB is provided in Scheme 1.

In a 35 mL microwave flask, Na2CO3 (0.505 g, 4.765 mmol), 1,3,5-tribromobenzene 1 (250 mg, 0.795 mmol), 4-methoxycarbonylphenylboronic acid 2 (0.64 g, 3.57 mmol), and [Pd(PPh3)4](93 mg, 0.080 mmol) were mixed and dissolved in a combination of toluene/EtOH (1:1, 15 mL). The mixture was irradiated in a microwave oven operating medium power (250 watts) at 110° C. for 20 min after 5 minutes of stirring. Progress of the reaction was monitored by thin-layer chromatography using ethyl acetate:hexane (2:8) solvent system. The resultant solution was diluted with CH2Cl2, the organic phase was extracted using water and brine, and the next steps were to dry, filter, and concentrate the mixture. The residue was purified using silica gel column chromatography, yielding 47% of compound 3 as a white solid. Compound 3 (185 mg, 0.385 mmol) was then dissolved in THF/MeOH (1:1, 7 mL), and a 2.4 M aq. A solution of NaOH (0.672 g, 16.8 mmol) was added at 0° C. The reaction mixture was stirred overnight at 25° C., after which the solvents were evaporated in vacuo. The residue was dissolved in water, and the resultant solution was then adjusted to a pH of 2 by adding 1 M aqueous solution of HCl. The resultant white precipitate was collected, filtered again, then resuspended in water (5 mL), sonicated, and collected again. Through this procedure, NaCl salts were washed out. A high vacuum was used to collect and dry the white solid; m.p.318° C.; IR (KBr, cm-1): 3041 (—OH), 1688 (COOH), 1568 (C═C); 1H-NMR [DMSO-d6, 400 MHz]: (δ, ppm) 8.06 (s, 3H, CH), 8.06 (s, 12H, CH), 12.98 (brs, 1H, COOH, exchanges with D2O); 13C-NMR [DMSO-d6, 100 MHz]: (δ, ppm) 167.7, 144.2, 141.1, 130.5, 130.4, 127.9, 126.1.

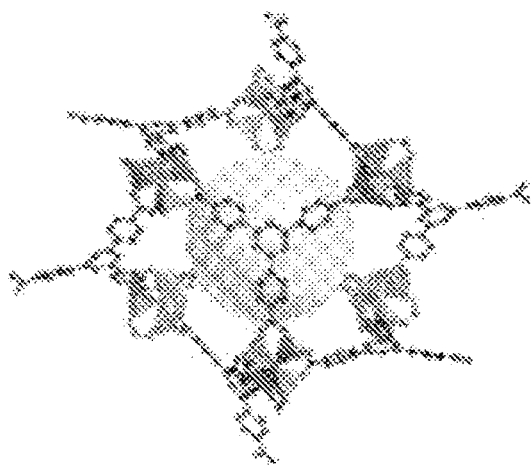

A synthetic method of manufacturing MOF-177 is provided in Scheme 2.

The MOF-177 powder was created by stirring a known quantity of benzene tribenzoic acid (626 mg, 1.43 mmol) and zinc acetate dihydrate (2.51 g, 11.4 mmol) for three hours in 50 ml of diethyl formamide at 25° C. The product was filtered and collected before being submerged in 40 mL of chloroform to eliminate the contaminants. The solvent was replenished three times after one day, four days, and five days. The bulk of the solvent was decanted, and the product was activated under vacuum at 120° C. for 12 h.

Scheme S3

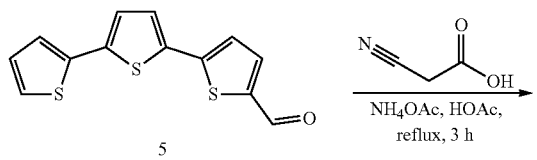

5

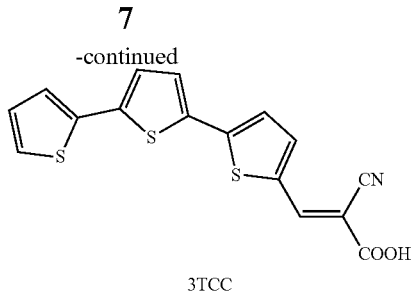

3TCC

A method for synthesis of (1-Cyano-2-[α-terthiophen-2-yl]-vinyl)carboxylic Acid (3TCC) is provided in Scheme 3.

3TCC was synthesized from (α-terthiophen-2-yl)carboxaldehyde 5, which was condensed with cyanoacetic acid via an ammonium acetate catalyzed Knoevenagel reaction. A mixture of α-terthiophen-2-yl-carboxaldehyde (497 mg, 1.8 mmol), 2-cyanoacetic acid (463 mg, 5.4 mmol), and ammonium acetate (55 mg, 1.2 mmol) in glacial acetic acid (10 mL) was refluxed for three hours under argon. The resultant suspension was concentrated under reduced pressure, and the residue was thoroughly washed with DCM (10 mL) and diethyl ether (20 mL). The recovered solid was recrystallized from methanol and THF, affording the product as a purple solid (84%); 1H-NMR [DMSO-d6, 400 MHz]: (δ, ppm) 8.01 (s, 1H), 7.62 (d, J=3.8 Hz, 1H), 7.55 (d, J=5.1, 1.1 Hz, 1H), 7.43 (t, J=3.5 Hz, 2H), 7.39 (d, J=3.6 Hz, 1H), 7.31 (d, J=3.9 Hz, 1H), 7.11 (dd, 1H, J1=4.8, J2=3.9 Hz).

FIG. 1 provides H NMR of dye 3-TCC (2 mM) in DMSO-d6 at room temperature. The compound has a very low emission, and no meaningful PLQY could be extracted upon the excitation at both wavelengths of 320 and 520 nm.

Figure 2:
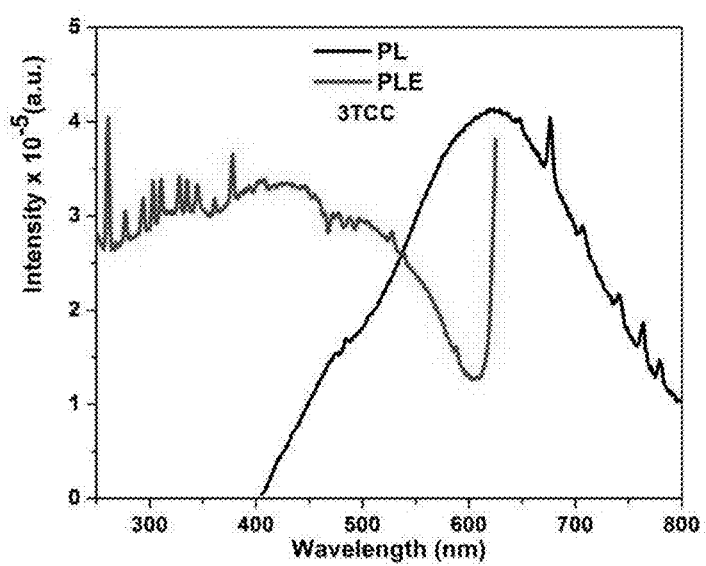
FIG. 2 illustrates the PLE (blue) and PL (red) spectra of 3TCC solids at room temperature.

FIG. 2 illustrates the PLE (blue) and PL (red) spectra of 3TCC solids at room temperature. The monitoring excitation and emission wavelengths are at the maxima.

Preparation of the Hybrid Inorganic-Organic MOF Compound

Example 1 Preparation of Hybrid Inorqanic-Orqanic MOF Compound in Accordance with One Aspect of the Invention The hybrid inorganic-organic MOF compound was prepared by soaking a given weight percentage of the dye and a MOF in a solvent. During soaking, the solvent mixture was continuously stirred for 24 hours. It is noted that although continuous stirring is preferably, stirring can also be performed intermittently. After 24 hours, the hybrid inorganic-organic MOF compounds were formed as solids. The solids were decanted. Following the decantation, the solids were thoroughly washed and repeatedly rinsed in the same solvent that the dye and MOF were mixed in. In cases wherein the solvent used is glycerol-water mixture, wherein the solids were washed in water alone.

The solids are washed so as to remove any un-interacted dye. Preferably, the solids are washed in the solvent for about seven times. The solvent washings were analyzed for presence of dye using UV-visible absorption spectroscopy. When no dye was detected in the solvent, the solids were decantation. Following decantation, the residual solids were activated overnight at a temperature of about 80° C. to about 1200° C.

Example 2: Preparation of 3TCC@MOF-177 Compound in a Second Aspect of the Invention The 3TCC@MOF-177 solids were prepared by soaking a known quantity of 3TCC and MOF-177 in a given solvent. During soaking, the solvent mixture comprising 3TCC and MOF-177 were continuously stirred for 24 hours. It is noted that although continuous stirring is preferably, stirring can also be performed intermittently. After 24 hours, the hybrid inorganic-organic MOF compound was formed as solids. The solids were decanted. Following the decantation, the solids were thoroughly washed and rinsed in the same solvent that the dye and MOF were mixed in. In cases wherein the solvent used is glycerol-water mixture, wherein the solids were washed in water alone.

The solids are washed so as to remove any un-interacted 3TCC. Preferably, the solids are washed in the solvent for about seven times. The solvent washings were analyzed for 3TCC using UV-visible absorption spectroscopy. When no 3TCC was detected in the solvent, the solids were decantation. Following decantation, the residual solids were activated overnight at 80° C. In case where the solvent was DMF the activation was carried out at the temperature of about 120° C.

Example 3: Preparation of 3TCC@MOF-177 Compound in a Third Aspect of the Invention The 3TCC@MOF-177 solids were prepared by soaking 3TCC and MOF-177 in the ration ~0.01 mol/1 wt % in 1 ml of solvent. During soaking, the mixture was continuously stirred for 24 hours. It is noted that although continuous stirring is preferably, stirring can also be performed intermittently. After 24 hours, the 3TCC@MOF-177 compound was formed as solids. The solids were decanted. Following the decantation, the solids were thoroughly washed and repeatedly rinsed in the same solvent that the 3TCC and MOF-177 were mixed in. In cases wherein the solvent used is glycerol-water mixture, wherein the solids were washed in water alone.

The solids are washed so as to remove any un-interacted 3TCC. Preferably, the solids are washed in the solvent for about seven times. The solvent washings were analyzed for 3TCC using UV-visible absorption spectroscopy. When no 3TCC was detected in the solvent, the solids were decantation. Following decantation, the residual solids were activated overnight at 80° C. In case where the solvent was DMF the activation was carried out at the temperature of about 120° C.

Figure 3:
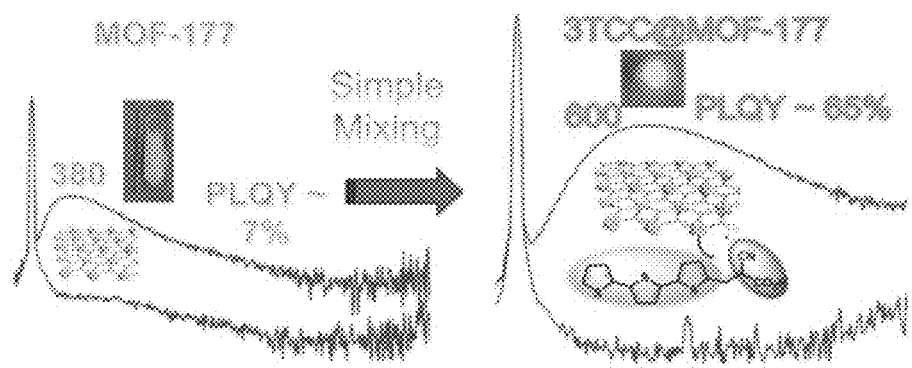
FIG. 3 illustrates the method of the invention for manufacturing a highly luminescent hybrid solids.
Figures 4A, 4B:
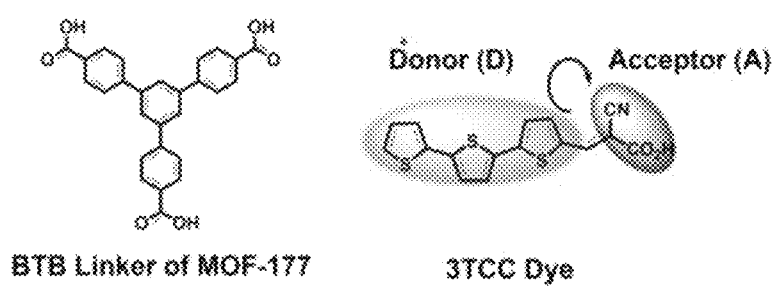
FIG. 4A illustrates the chemical structures of H3BTB linker (in MOF-177) and TICT dye (3TCC)
FIG. 4B illustrates the donor (D) moiety thiophene and acceptor (A)/anchoring group cyanoacetic acid of the 3TCC dye.

FIG. 3 illustrates a simple pathway for manufacturing a highly luminescent hybrid inorganic-organic MOF compound solids by mixed-solvent evaporation of (1-cyano-2-[α-terthiophen-2-yl]-vinyl)carboxylic acid (3TCC) dye in the cages of the metal organic framework MOF-177. It is seen that the photoluminescence quantum yields (PLQY) were increased by 2 to 40-fold, correlating with solvent-induced anisotropic rotational times of the final solids The formation of 3TCC@MOF-177 solids is facilitated by the complexation of 3TCC to Zn and hydrogen bonding between 3TCC and BTB linker. FIG. 4A illustrates the chemical structures of H3BTB linker (in MOF-177) and TICT dye (3TCC). FIG. 4B illustrates the donor (D) moiety thiophene and acceptor (A)/anchoring group cyanoacetic acid of the 3TCC dye.

Figure 5A:
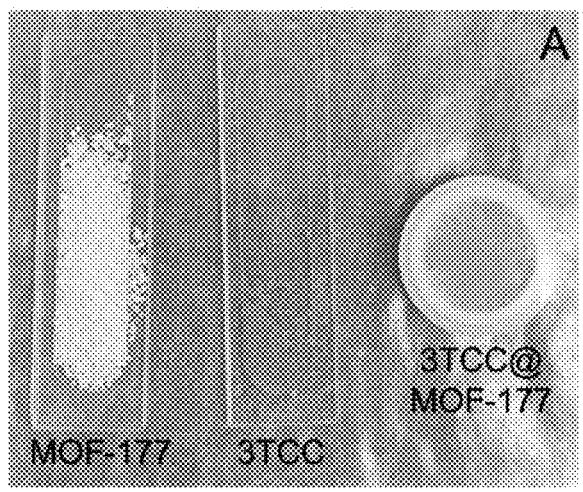
FIGS. 5A and 5B shows photos in daylight and dark respectively upon exposure to commercial UV lamp set at 365 nm and commercial white LED (D) equipped with a band pass filter (BPF) at 450±50 nm of the MOF, the dye and 3TCC@MOF-177 compound.
Figure 5B:
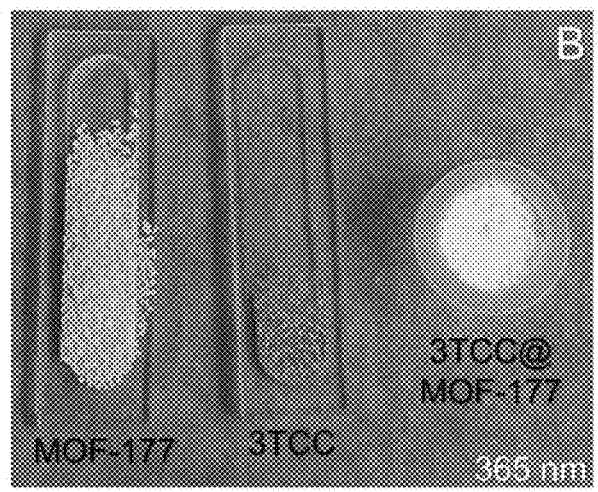

FIG. 5A and FIG. 5B shows photos in daylight and dark respectively upon exposure to commercial UV lamp set at 365 nm and commercial white LED (D) equipped with a band pass filter (BPF) at 450±50 nm of the MOF, the dye and 3TCC@MOF-177 compound. The weakly emissive off-white MOF-177 and non-emissive brown 3TCC, as compared to brightly emissive solids of 3TCC@MOF-177 compound are seen in FIGS. 5A and 5B.

FIG. 6A to 6L shows photos in daylight (A) and dark (B) upon exposure to commercial UV lamp set at 365 nm and commercial white LED (D) equipped with a band pass filter (BPF) at 450±50 nm of the 3TCC@MOF-177 compound in different solvents. 3TCC@MOF-177 compound formed in solvent 0.75% MeOH, 2% MeOH, 5% MeOH are shown in FIG. 6A to FIG. 6C, 3TCC@MOF-177 compound formed in solvent 0.5% DMF, 1% DMF, 2% DMF are shown in FIG. 6D to FIG. 6F, 3TCC@MOF-177 compound formed in solvent 2% MeOH, 50% glycerol, 70% glycerol, 1% DMF, 1% Ethanol, butanol are shown in FIG. 6G to FIG. 6I; and 3TCC@MOF-177 compound formed in solvents EtoAc, ChCl3, hexane, ACN, Acetone and MOF 177 alone are shown in FIGS. 6J to FIG. 6L.

Characterisation of MOF, the Dye and 3TCC@MOF-177
Analytical Techniques:

Thin-layer chromatography was performed on silica gel glass plates (Silica gel, 60 F254, Fluka, Merck, Darmstadt, Germany). Column chromatography was performed on Kieselgel S (silica gel S, 0.063-0.1 mm, Merck, Darmstadt, Germany). Melting points were recorded on a Gallenkamp apparatus (Toledo, OH, USA) and corrected. Microwave synthesis was performed using the CEM microwave system (Matthews, USA).

Thermogravimetric Analysis (TGA)

TGA analyses were conducted using Shimadzu thermogravimetric analysis equipment. A 0.01 g sample was heated at a rate of 5° C./min from 35° C. to 600° C.

X-Ray Diffraction (XRD)

The XRD investigation was conducted using a Shimadzu-6100 powder XRD diffractometer with Cu—K radiation set to λ=1.542 A. Diffraction data were gathered in the range of 2-80° a rate of 1°/minute.

Scanning Electron Microscopy (SEM)

The internal morphology of the solid samples after gold coating was deduced from the SEM images, which were taken using an electron microscope (Inca Energy EDS System, Oxford, United Kingdom) equipped with an energy-dispersive X-ray (EDX) detector operating at a high vacuum and a 30 kV accelerating voltage.

Nuclear Magnetic Resonance (NMR) Spectroscopy

NMR spectra were recorded using a Varian-400 MHz spectrometer (1H-NMR at 400 MHz and 13C-NMR at 100 MHz; Agilent Technologies, Santa Clara, CA, USA) using dimethyl sulfoxide-d6 (DMSO-d6) as a solvent. Tetramethylsilane (TMS) was used as an internal reference, and chemical shifts were measured as part-permillion; (δ, ppm).

Fourier Transform Infrared (FTIR) Spectroscopy

Infrared spectra were measured using KBr pellets on a Thermo Nicolet model 470 FT-IR spectrophotometer and processed with Spectrum IR software. Solid samples were mixed with dry KBr (FT-IR grade Sigma-Aldrich, St. Louis, MO) in a ratio of 1:100 and compressed into pellets using a hydraulic press. The transmittance of the resulting pellets was recorded within a range of 4000-450 cm$^{-1}$ with 32 scans.

Diffuse Reflectance Spectroscopy (DRS)

Absorption spectra of the solid samples were obtained using the Kubelka-Munk conversion (K–M=$(1-R)^2/2R$) of the recorded diffusive-reflectance spectra at room temperature on an FS5 spectrometer (Edinburgh, UK) equipped with an SC-30 (integrating sphere) as the sample holder. A polytetrafluoroethylene (PTFE) polymer was used as a reference. The bandgap energies (Eg) of the solid samples from the DRS spectra were calculated using $E_g$=1240 eV nm l$^{-1}$, where l is the absorption edge (nm).

Photoluminescence (PL) and photoluminescence excitation (PLE) measurements PL spectra of the solid samples were recorded using an FS5 spectrofluorometer (Edinburgh instrument, Livingston, UK), with a xenon lamp to excite the samples.

Absolute PL Quantum Yield (QY) Measurements

Absolute QY for the solid samples was approximated on the FS5 spectrometer by utilizing an integrating sphere (SC-30) and comparing the measured direct and indirect emissions from the sample to those generated from the PTFE reference through direct excitation. The error was 2% of the estimated experimental value.

Excited-State PL Lifetime and Time-Resolved PL (TRPL) Measurements

PL decay measurements were collected using the time-correlated single-photon counting (TCSPC)-based Edinburgh Instrument (LifeSpec II spectrometer, Livingston, UK). The source was a picosecond diode laser with a $\lambda_{ex}$ of 375 nm for the liquid samples, and a laser diode of 320 nm for the solid samples, with instrument functions of approximately 30 and 90 ps, respectively. A repetition rate of 20 MHz was used for both sources. A red-sensitive high-speed photomultiplier tube detector (Hamamatsu, H5773-04) with a total count rate of 10,000/s was utilized, and the data were convoluted with an instrument response function (IRF) using the Levenberg-Marquardt algorithm to minimize $\chi^2$. Fluorescence decay was analyzed in terms of the multiexponential model to calculate the average lifetime value as $$\bar{\tau} = \Sigma_i f_i \tau_i \quad (1)$$

The contribution of each component to the steady-state intensity was obtained by $$f_i = \frac{\alpha_i \tau_i}{\sum_j \alpha_j \tau_j} \quad (2)$$

where $\tau_i$ are lifetimes with amplitudes $\alpha_i$ and $\Sigma_i$=1.0. The denominator of Equation 2 represents the sum for all decay times and amplitudes. The estimated experimental error was 2% for <1 ns and 20% for a lifetime of approximately 5 ns. Cell holders with front-face geometries maintained the emission polarizer at a magic angle of 54.7° to the vertically polarized excitation beam. In the solution experiments, the IRF was determined by measuring the scattering of a LUDOX solution. In all experiments, a desired temperature was maintained by a Peltier system with an accuracy of ±0.1° C.

Time-Resolved Fluorescence Anisotropy Measurements

Measurements were performed every 10 seconds using a LifespecII apparatus fitted with an automatic set of polarizers. PL decay was measured for parallel (Iv) and perpendicular ($I_{VH}$) to measure the G factor. All cases of anisotropy decay were best-fit by single-exponential decay curves. Goodness-of-fit was approximated by reduced $\chi^2$ values and the distribution of weighted residuals among the data channels. The estimated experimental error was 2%.

Characterization of 3TCC@MOF-177 Solids

FIG. 7A shows the Fourier-transform infrared spectroscopy (FTIR) spectra of 3TCC (red), MOF-177 (blue), and 3TCC@MOF-177 (green; 90 wt % of 3TCC in MOF-177 prepared using methanol) in KBr.

The FTIR peaks are provided in the below Table 1

TABLE 1

| Compound | FTIR Peak | Peak Assignment |
|---|---|---|
| 3-TCC@MOF-177 | 3380 | —OH stretching of carboxylic group |
| | 2223 | —CN stretching in 3-TCC dye |
| | 1603 | —CO stretching of carboxylic group |
| | 1536 | —O—C—O— functional group |
| | 1404 | —C=C— functional group |
| | 1024 | —C—H in-plane bending |
| | 768 | —C—H out-of-plane bending |
| | 484 | stretching mode of Zn—O |
| MOF-177 | 3388 | —OH stretching of carboxylic group |
| | 1612 | —CO stretching of carboxylic group |
| | 1542 | —O—C—O— functional group |
| | 1401 | —C=C— functional group |
| | 1015 | —C—H in-plane bending |
| | 768 | —C—H out-of-plane bending |
| | 494 | stretching mode of Zn—O |
| 3-TCC | 3448 | —OH stretching of carboxylic group |
| | 2208 | —CN stretching |
| | 1685 | —CO stretching of carboxylic group |
| | 1568 | —C=C— functional group |
| | 1408 | —C=C— functional group |
| | 787 | —C—S bond of thiophene in 3TCC |

The peak at approximately 3388 $cm^{-1}$ can be attributed to the hydroxyl group (—OH) stretching vibration in MOF-177, whereas that at approximately 3450 $cm^{-1}$ corresponds to the same group in 3TCC. The former peak shifted to 3380 $cm^{-1}$ following the introduction of 3TCC. The flow of 3TCC into the pores of MOF-177 also shifted the sharp CN peak from 2208 $cm^{-1}$ to 2223 $cm^{-1}$. Owing to the confinement of 3TCC in the pores of MOF-177, peaks corresponding to the symmetric and asymmetric vibrations of carboxyl groups (—COOH) and the double bond of benzene rings present in the organic ligands of MOF-177 shifted from 1612 and 1401 $cm^{-1}$ (with a shoulder at 1542 $cm^{-1}$) to 1603 (with a shoulder at 1536 $cm^{-1}$) and 1404 $cm^{-1}$, respectively. The same functional groups appeared at 1685, 1568, and 1408 cm-1 in 3TCC prior to incorporation. Moreover, the peak corresponding to the C—H in-plane bending vibration of the benzene ring of BTB in MOF-177 at 1015 $cm^{-1}$ shifted to 1024 $cm^{-1}$ in the final solid. Noticeably, the vibrational stretching mode of Zn—O shifted from 494 to 484 $cm^{-1}$ upon incorporating 3TCC inside the pores of MOF-177. These results demonstrate that the flow of 3TCC into the pores of MOF-177 weakens the interactivity between the Zn node and organic linker moieties.

The results also imply a possible hydrogen bonding interaction between the CN group in 3TCC and the hydroxyl group in MOF-177, and that 3TCC binds Zn through its carboxylic group.

The formation of pure MOF-177 crystals is confirmed by power X-ray diffraction (PXRD). FIG. 7B indicates a graph or Power X-ray diffraction (PXRD) data for MOF-177 and 3TCC@MOF-177 (10 wt % of 3TCC in MOF-177 prepared using methanol) powders. In FIG. 7B, the texture properties changed and some fine peaks were broadened, presumably owing to the interaction of the anchoring group of 3TCC with the metal center in MOF-177, changing the orientation of the crystals. The framework of the new solids did not change, as the strongest peaks at 2θ=5.2 and 10.8 remained intact. Consequently, it is challenging to draw additional evidence for the entrapment of 3TCC by MOF-177.

Figure 8A:
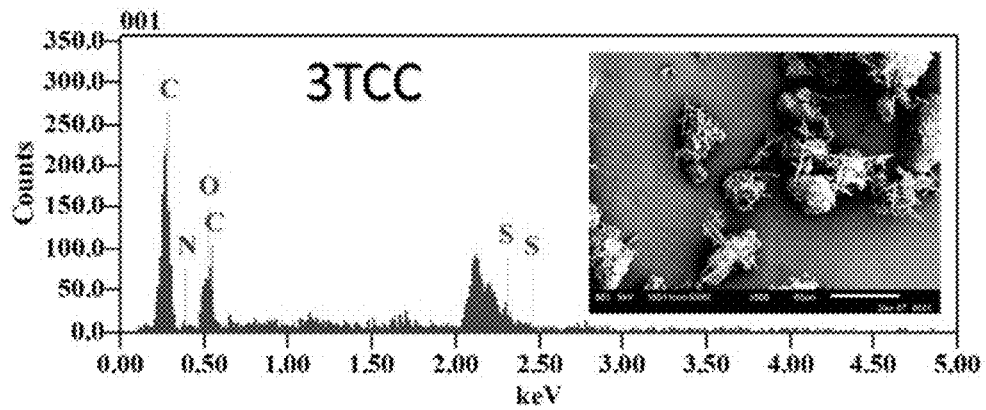
FIG. 8A to 8C provide SEM images and the corresponding EDX spectrum of 3TCC, MOF-177 and 3TCC@MOF-177 compound.
Figure 8B:
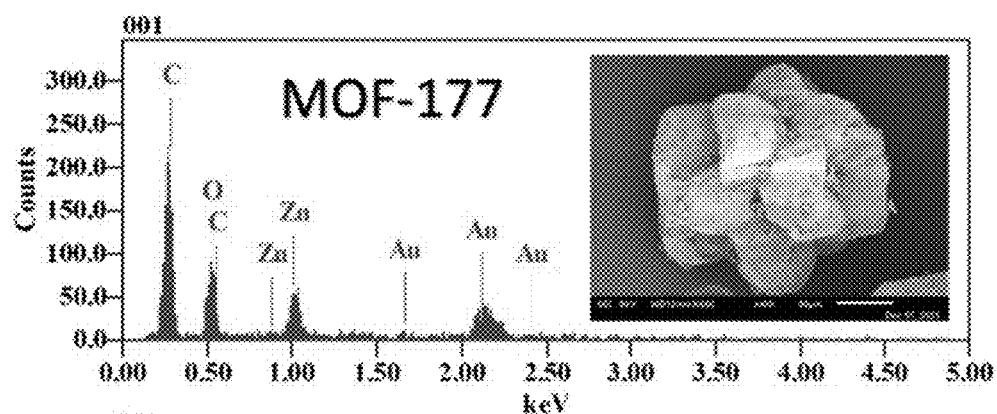
Figure 8C:
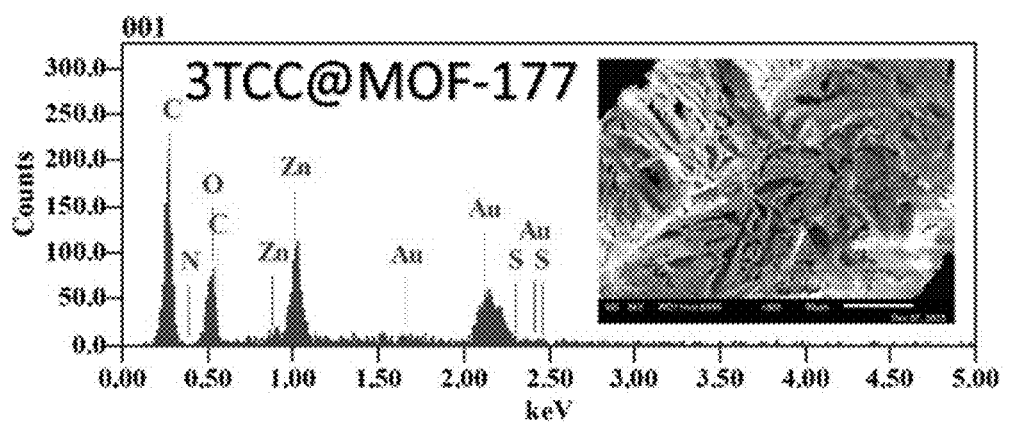

FIG. 8A to 8C provide SEM images and the corresponding EDX spectrum of 3TCC, MOF-177 and 3TCC@MOF-177 compound. The EDX data confirm the inclusion of 3TCC in the pores of MOF-177, indicating the appearance of sulfur peaks from 3TCC in the final solid.

FIG. 7C shows the thermal decomposition data showing mass reduction of 3-TCC and 3-TCC@MOF-177 (40 wt % of 3TCC in MOF-177 prepared using methanol) under N2 atmosphere at a heating rate of 5° C./min. The TGA traces in FIG. 7C provide information pertaining to the composition and thermal decomposition of the new solid. The mass reduction percentages were calculated from the TGA curves for all samples to estimate the concentration % of 3TCC in the final product.

Table 2 provides thermal decomposition data of the two solids 3-TCC and 3-TCC@MOF-177 (40 wt % of 3TCC prepared from methanol) under N2 atmosphere at a 5° C./min heating.

TABLE 2

| Sample | No. of Transition | Transition temperature (° C.) T min | T max | Weight loss at transition (%) | MW (g · mol−1) | n(mol) | Residual weight (%) at 600° C. |
|---|---|---|---|---|---|---|---|
| MOF-177 | 1 | 42 | 80 | 4 | 119.38 | 0.003 | 44 |
| | 2 | 343 | 504 | 46 | 1148 | 0.366 | |
| 3TCC@ MOF-177 | 1 | 38 | 75 | 4 | 32 | 0.005 | 37 |
| | 2 | 217 | 352 | 6 | 343 | 0.0174 | |
| | 3 | 356 | 502 | 48 | 1148 | 0.0418 | |

Figure 9A:
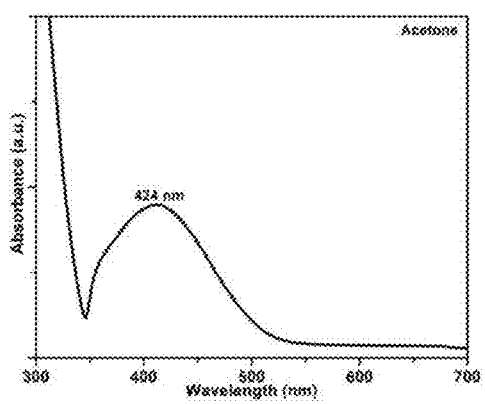
FIGS. 9A to 9O illustrate the spectroscopic, and photophysical of 3TCC in neat solvents.
Figure 9B:
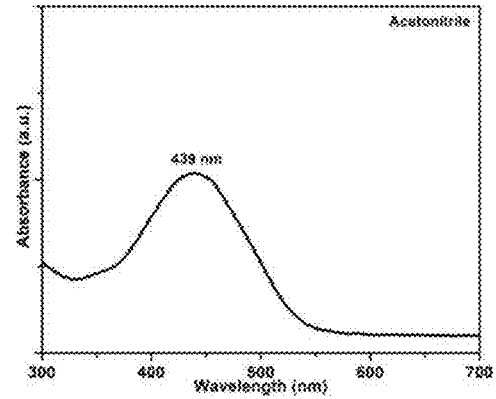
Figure 9C:
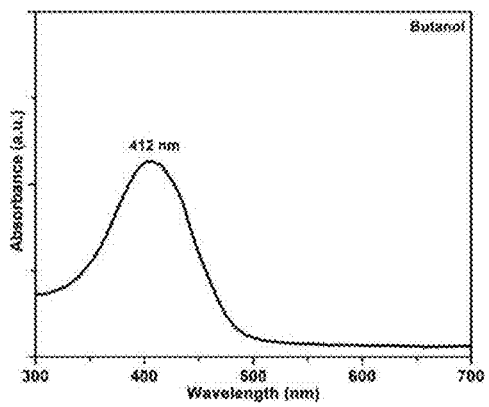
Figure 9D:
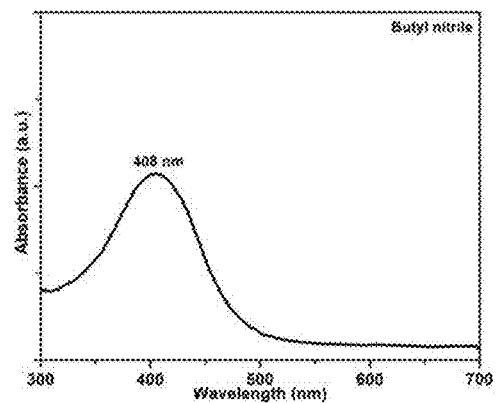
Figure 9E:
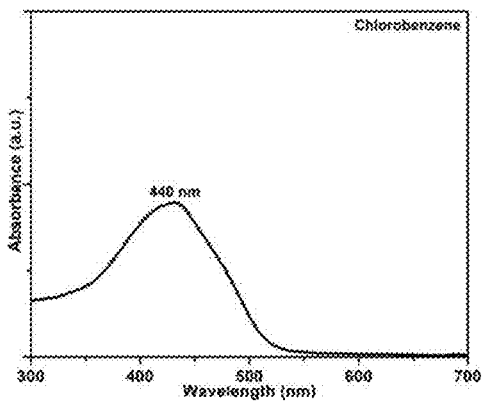
Figure 9F:
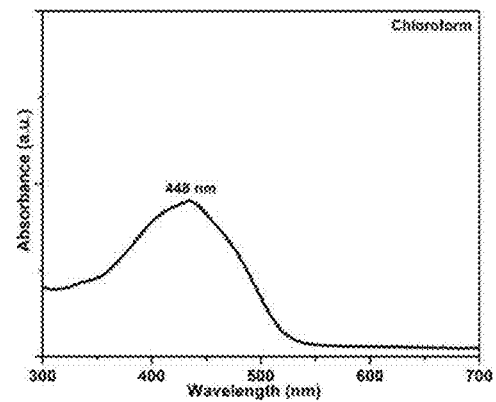
Figure 9G:
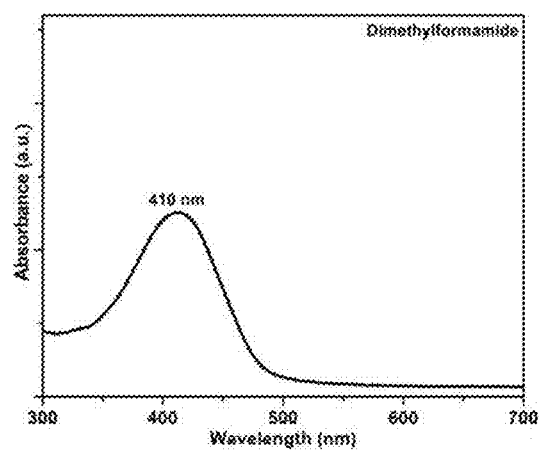
Figure 9H:
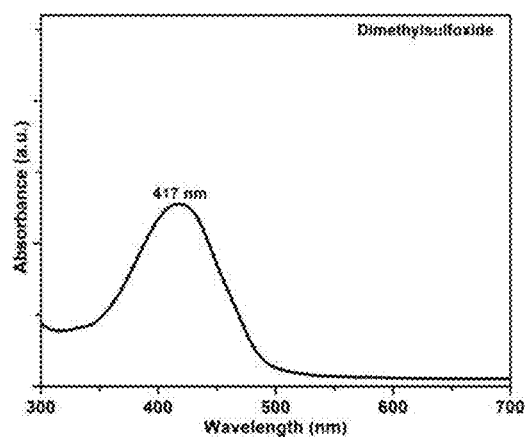
Figure 9I:
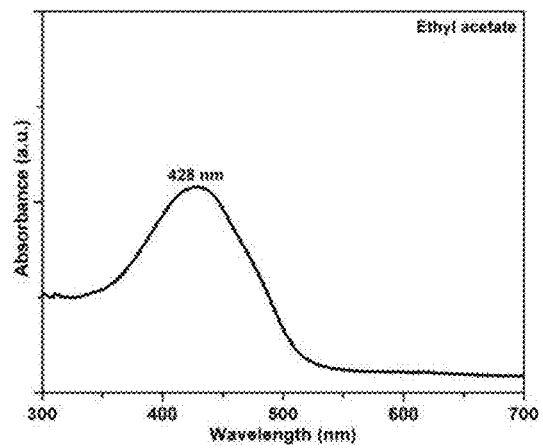
Figure 9J:
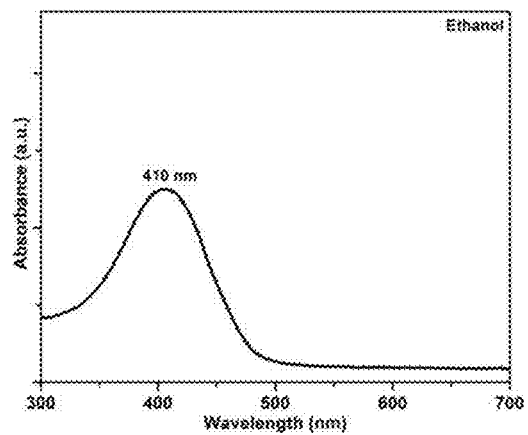
Figure 9K:
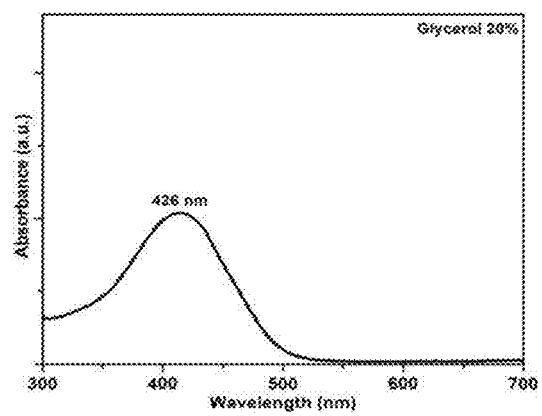
Figure 9L:
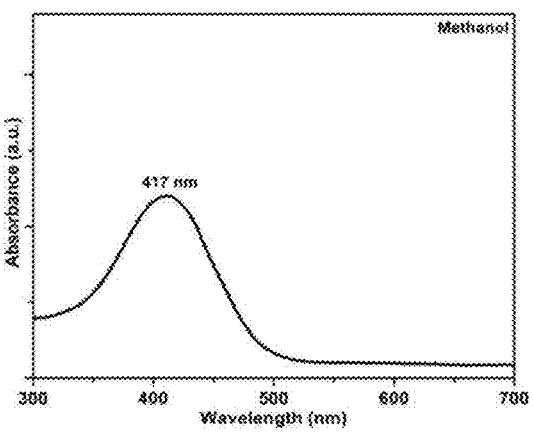
Figure 9M:
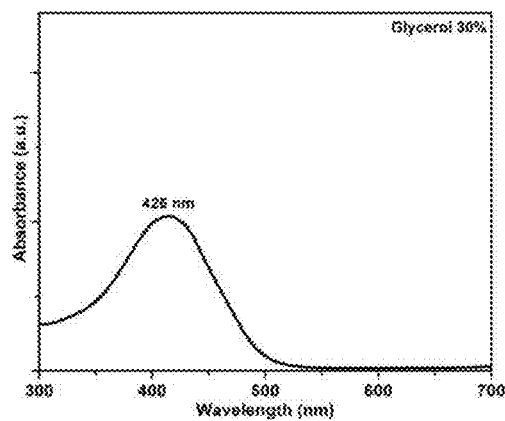
Figure 9N:
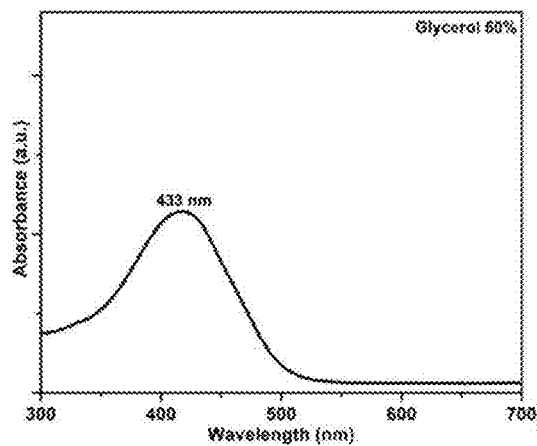
Figure 9O:
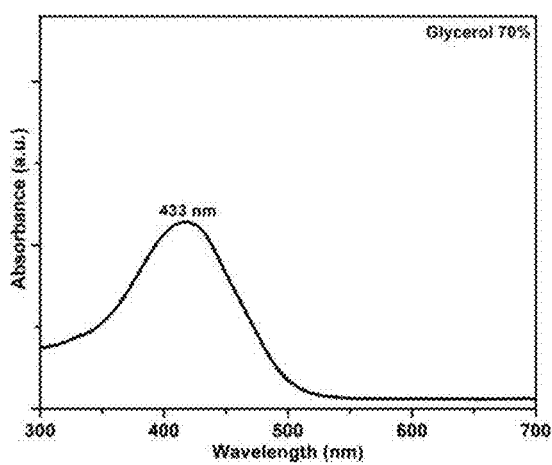

Spectroscopic and photophysical properties of 3TCC@MOF-177 solids Results corresponding to the spectroscopic, and photophysical of 3TCC in neat solvents are provided in FIGS. 9A to 9O.

The spectroscopic and photophysical data for 5 μM 3TCC in different solvents are provided in Table 3 as follows:

TABLE 3

| Solvents | λa/ nm | λf/ nm | Δv (cm−1) | τ(rot)/ ns | ΦF | τ/ ns | kr/ 107 s−1 | knr/ 107 s−1 | CIE |
|---|---|---|---|---|---|---|---|---|---|
| Acetone | 424 | 562 | 5791 | 0.35 | 4.05 | 0.42 | 9.64 | 228.45 | 0.37421 0.48333 |

TABLE 3-continued

| Solvents | λa/ nm | λf/ nm | Δv (cm−1) | τ(rot)/ ns | ΦF | τ/ ns | kr/ 107 s−1 | knr/ 107 s−1 | CIE |
|---|---|---|---|---|---|---|---|---|---|
| Acetonitrile | 439 | 591 | 5858 | 0.29 | 3.55 | 0.73 | 4.86 | 132.12 | 0.37925 0.49968 |
| Butanol | 412 | 517 | 4929 | 0.94 | 3.55 | 0.57 | 6.23 | 169.21 | 0.28081 0.46046 |
| Butyl nitrile | 408 | 519 | 5241 | 0.33 | 3.8 | 0.4 | 9.5 | 240.5 | 0.31127 0.48195 |
| Chlorobenzene | 440 | 550 | 4545 | 0.45 | 3.89 | 0.45 | 9.05 | 223.5 | 0.36572 0.51706 |
| Chloroform | 448 | 563 | 4559 | 0.47 | 4.7 | 0.75 | 6.26 | 127.1 | 0.42847 0.52130 |
| DMF | 410 | 522 | 5233 | 0.29 | 5.21 | 1.02 | 5.11 | 92.93 | 0.28738 0.49434 |
| DMSO | 417 | 525 | 4933 | 0.63 | 3.79 | 1.28 | 2.96 | 75.16 | 0.31028 0.49885 |
| Ethyl acetate | 428 | 548 | 5116 | 0.45 | 2.9 | 0.42 | 6.9 | 231.19 | 0.35577 0.49853 |
| Ethanol | 410 | 524 | 5306 | 0.62 | 2.22 | 0.68 | 3.26 | 143.8 | 0.29276 0.47374 |
| Methanol | 417 | 555 | 5962 | 0.39 | 1.57 | 1.27 | 1.24 | 77.5 | 0.37925 0.49968 |
| Glycerol 20% in water | 426 | 583 | 6321 | 0.65 | 3.83 | 0.49 | 7.82 | 196.26 | 0.44029 0.46826 |
| Glycerol 30% in water | 426 | 583 | 6321 | 0.78 | 3.68 | 0.52 | 7.05 | 178.38 | 0.45403 0.48667 |
| Glycerol 50% in water | 433 | 583 | 5942 | 1.77 | 5.77 | 0.65 | 8.88 | 177.96 | 0.46414 0.48740 |
| Glycerol 70% in water | 435 | 583 | 5835 | 5.11 | 15 | 0.78 | 19.23 | 108.97 | 0.46483 0.49237 |

Absorption (λa), PL emission (λf) peak positions and PL excited-state average lifetimes τ (Method section) along with stokes shifts (Δv), fluorescence quantum yields (φF), correlation rotational times (τr), radiative rate constants (kr), non-radiative rate constants (knr), and CIE data. Excitation and monitoring emission wavelengths are indicated in FIGS. 10A to 10O, FIGS. 11A to 11O, FIG. 12A to 12O, FIGS. 13A to 13O and FIGS. 14A to 14O. All measurements were conducted at room temperature.

Figure 10A:
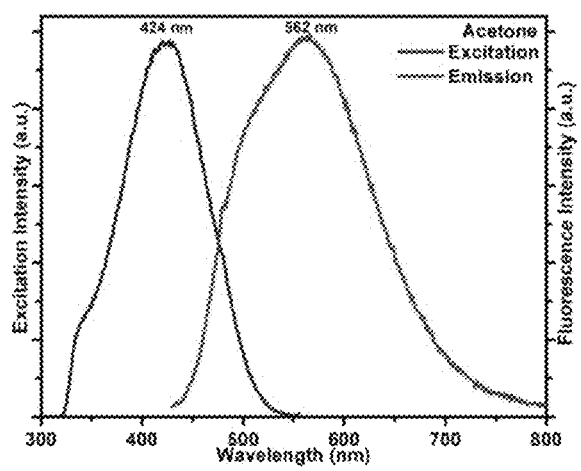
FIGS. 10A to 10O illustrate the photoluminescence excitation (PLE) (blue) and Photoluminescence (PL) (red) of 5 µM 3TCC in different solvents at room temperature.
Figure 10B:
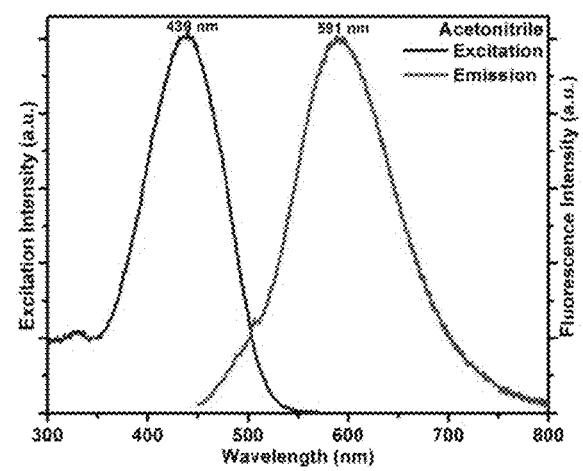
Figure 10C:
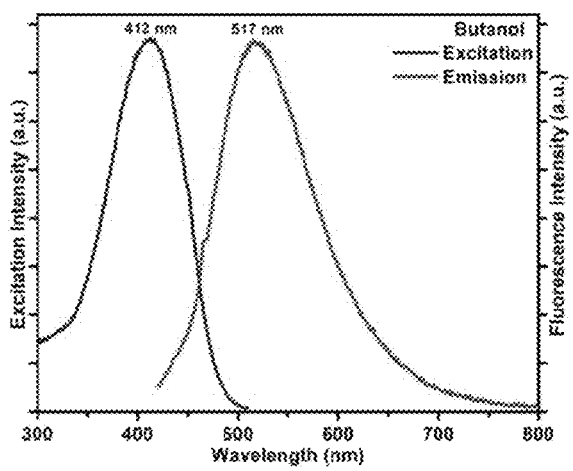
Figure 10D:
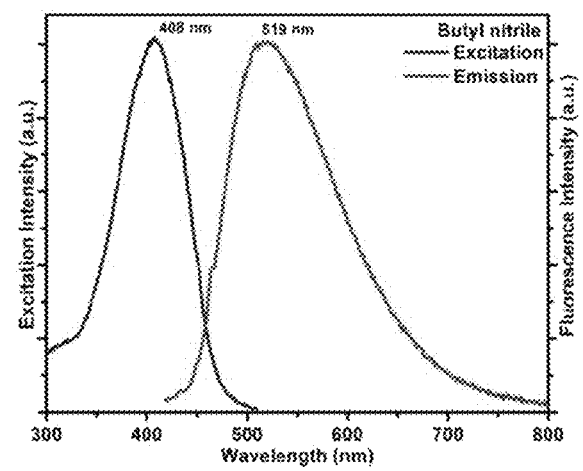
Figure 10E:
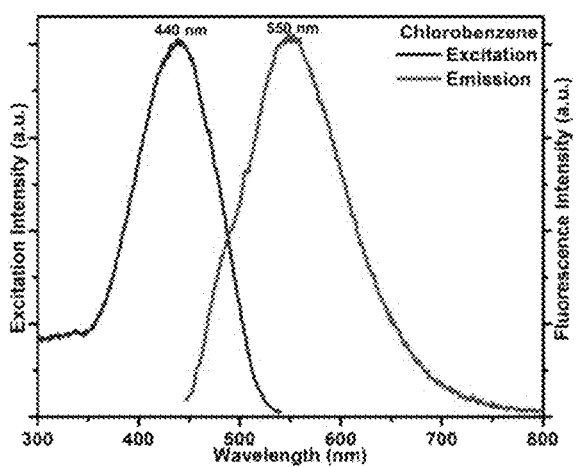
Figure 10F:
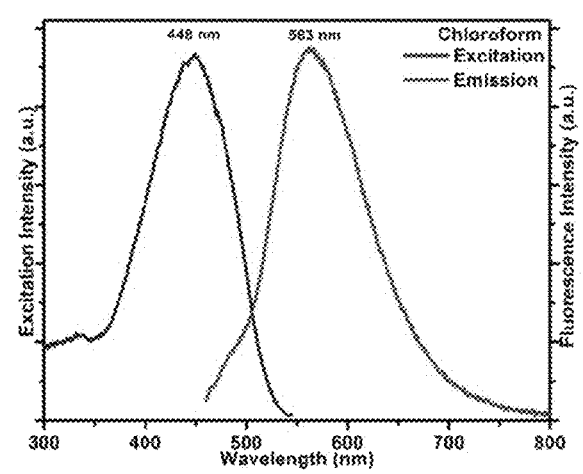
Figure 10G:
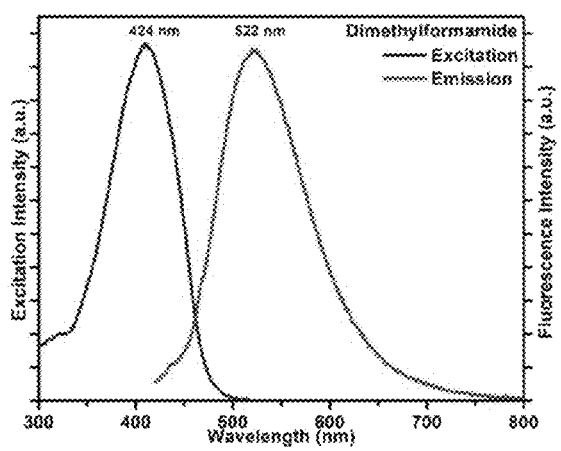
Figure 10H:
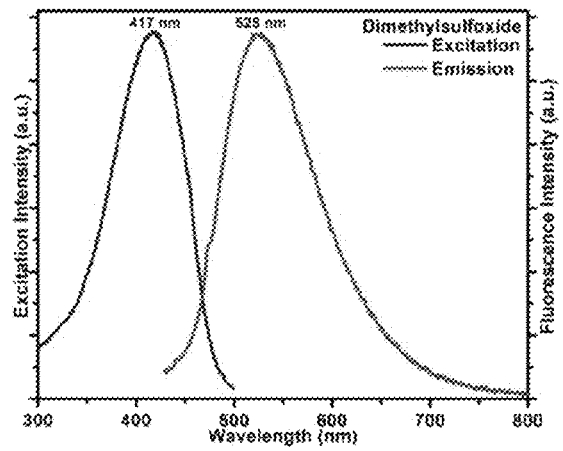
Figure 10I:
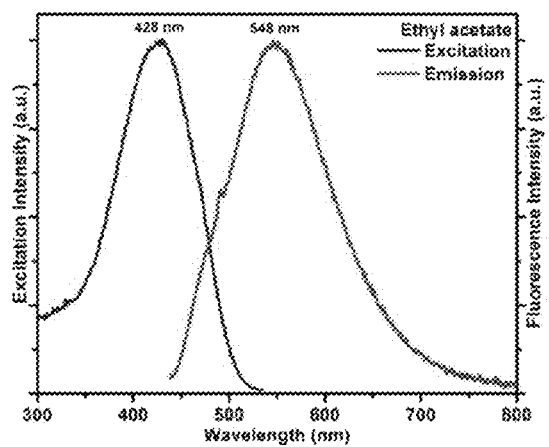
Figure 10J:
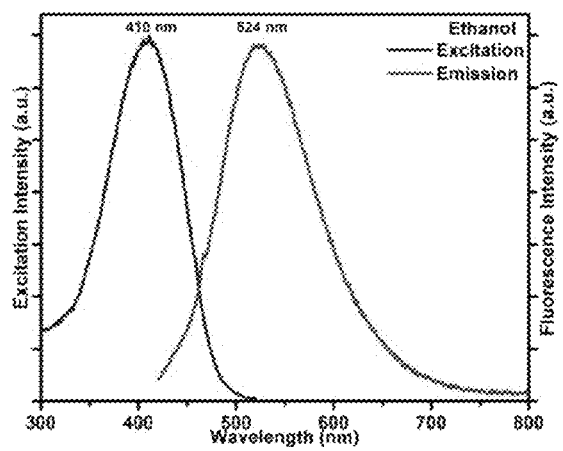
Figure 10K:
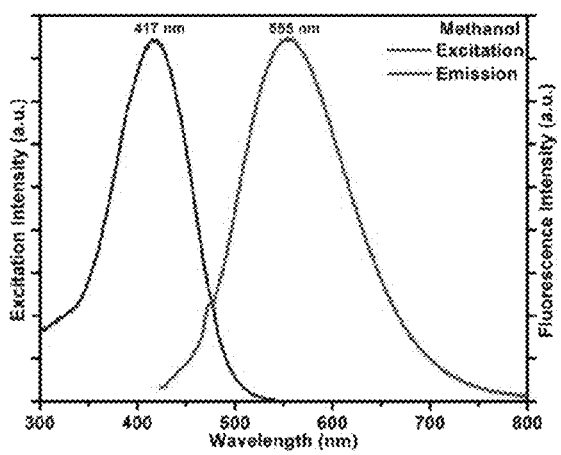
Figure 10L:
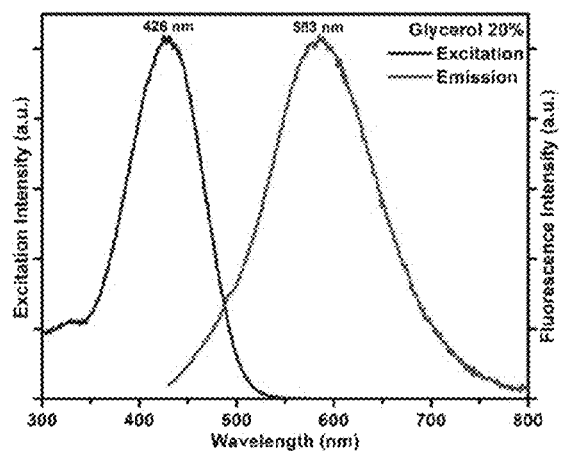
Figure 10M:
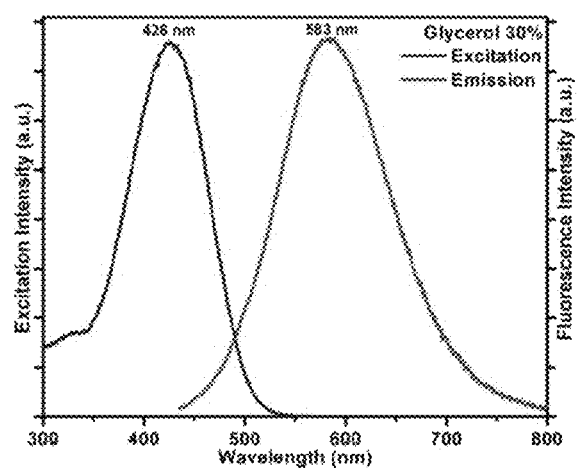
Figure 10N:
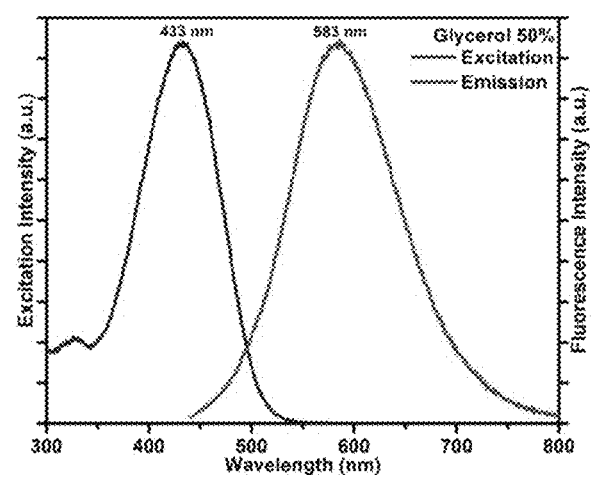
Figure 10O:
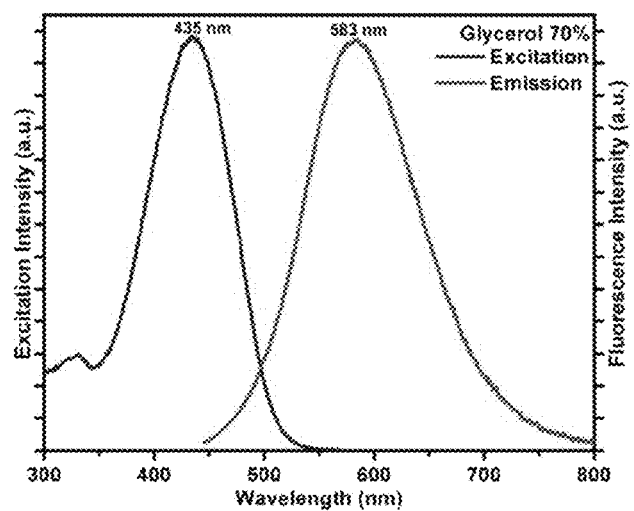

Photoluminescence excitation (PLE) (blue) and Photoluminescence (PL) (red) of 5 μM 3TCC in different solvents at room temperature are provided in FIGS. 10A to 10O.

Figure 11A:
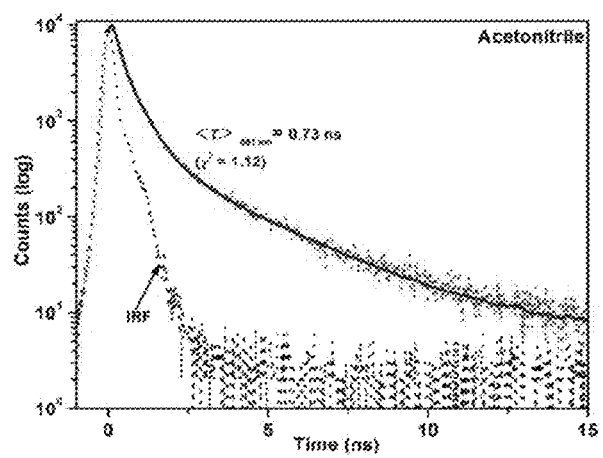
FIGS. 11A to 11O illustrate PL decays (red) and the non-exponential fit (blue) of 5 μM 3TCC in different solvents at room temperature.
Figure 11B:
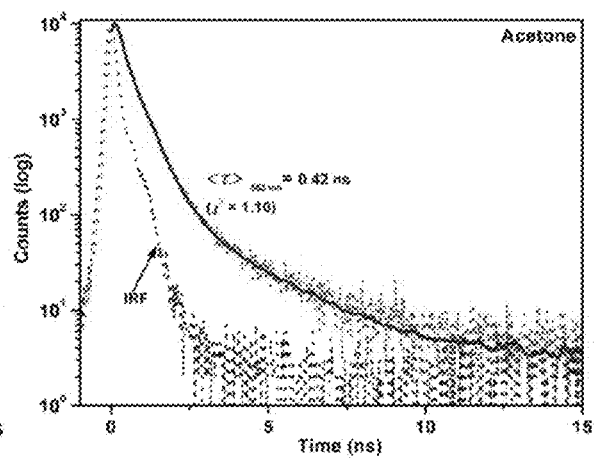
Figure 11C:
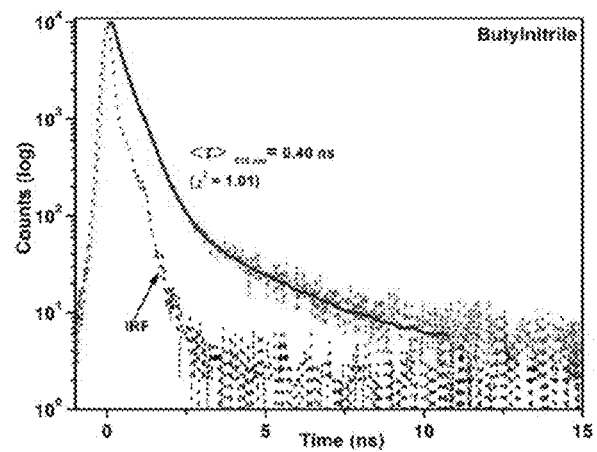
Figure 11D:
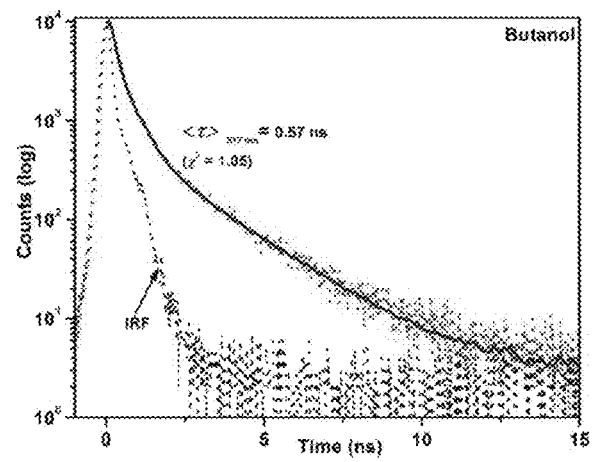
Figure 11E:
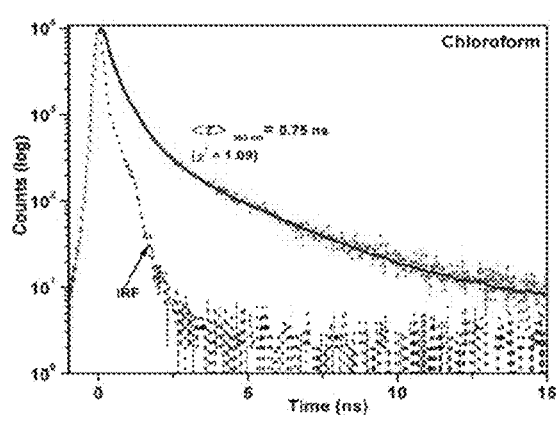
Figure 11F:
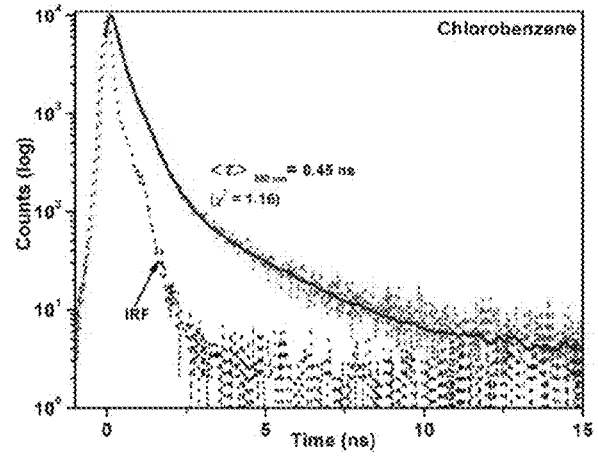
Figure 11G:
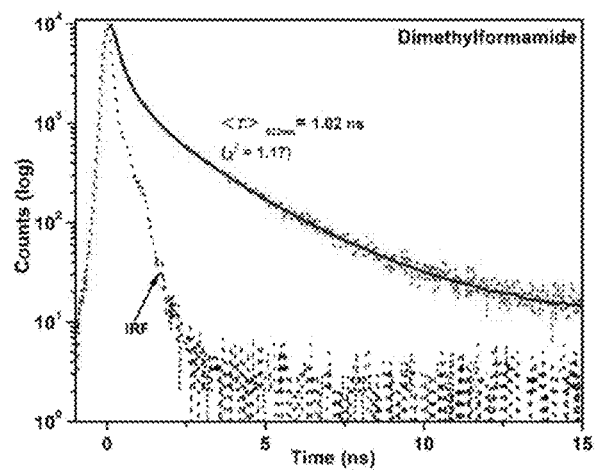
Figure 11H:
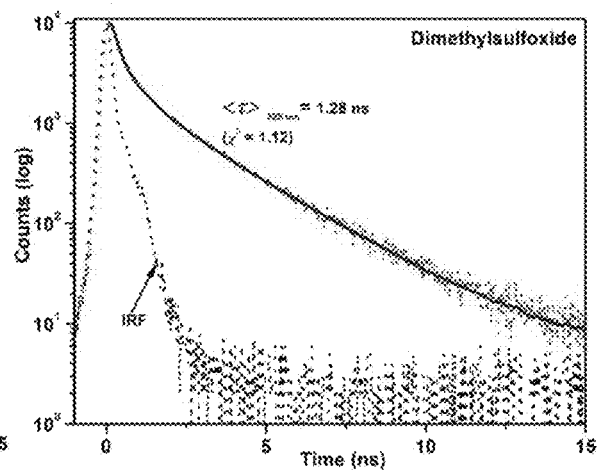
Figure 11I:
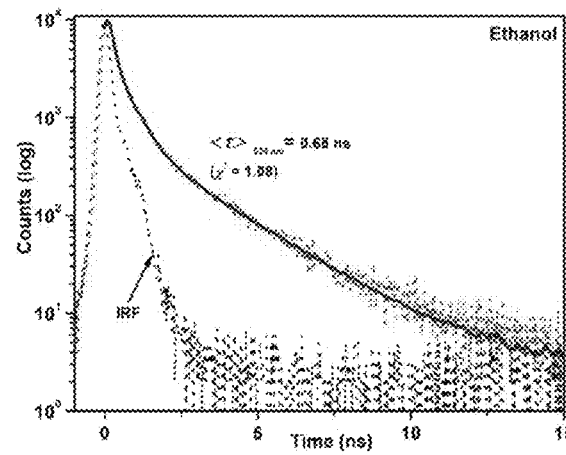
Figure 11J:
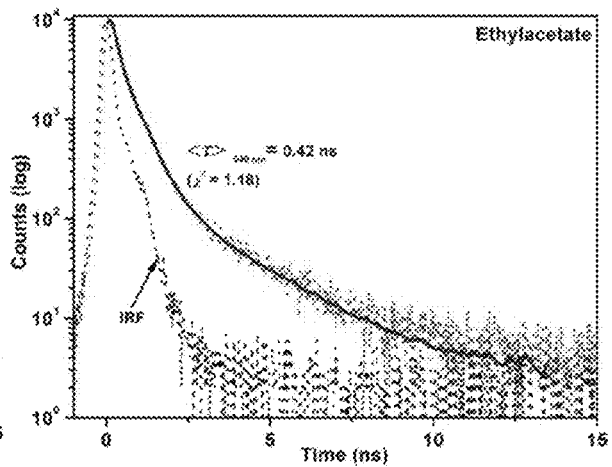
Figure 11K:
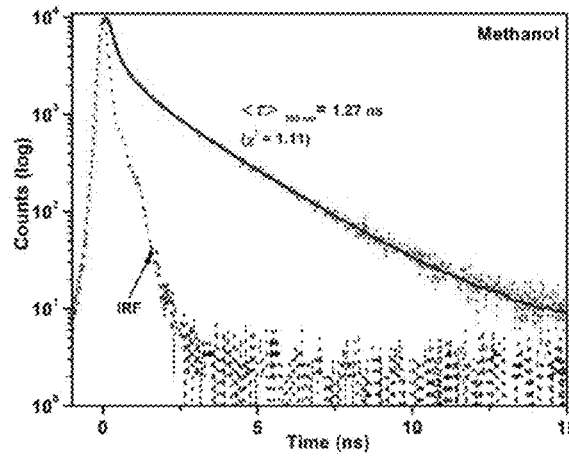
Figure 11L:
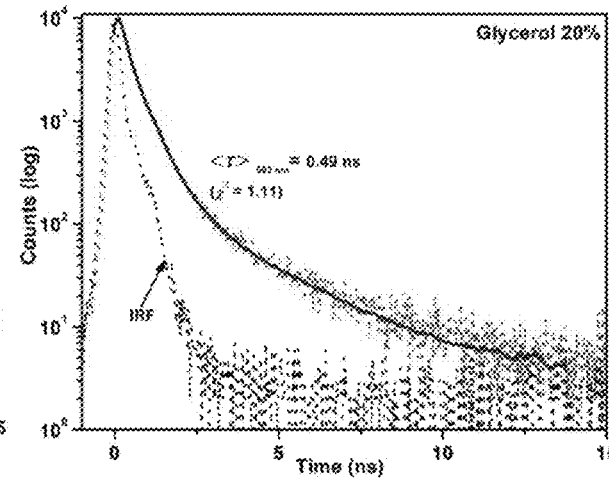
Figure 11M:
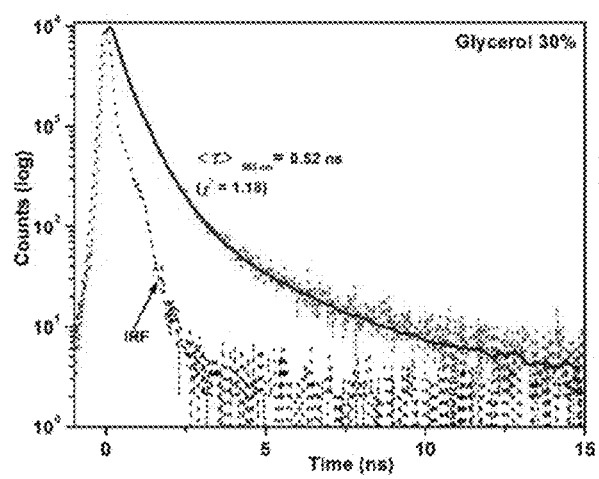
Figure 11N:
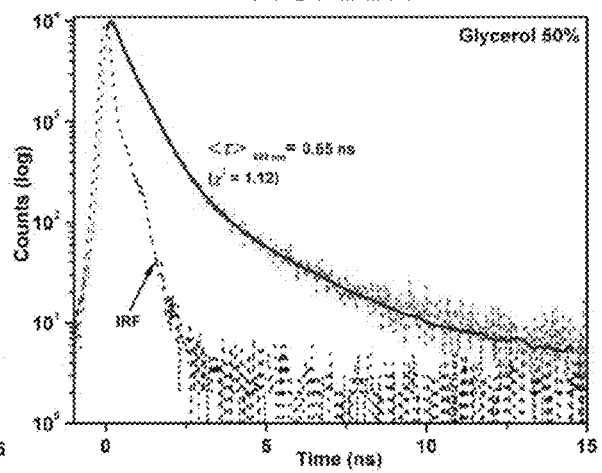
Figure 11O:
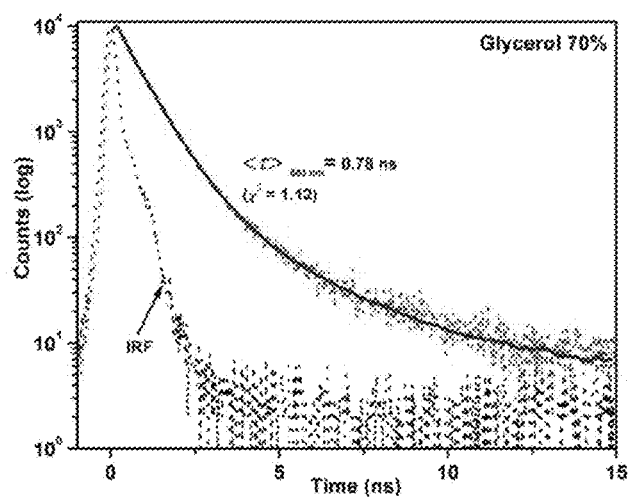

FIGS. 11A to 11O indicate PL decays (red) and the non-exponential fit (blue) of 5 μM 3TCC in different solvents at room temperature. IRF, the monitoring wavelength, and average excited-state lifetime values with the chi-square of the fit are shown directly in the graphs. A diode laser's excitation wavelength was 375 nm with a time resolution of 30 ps.

Figure 12A:
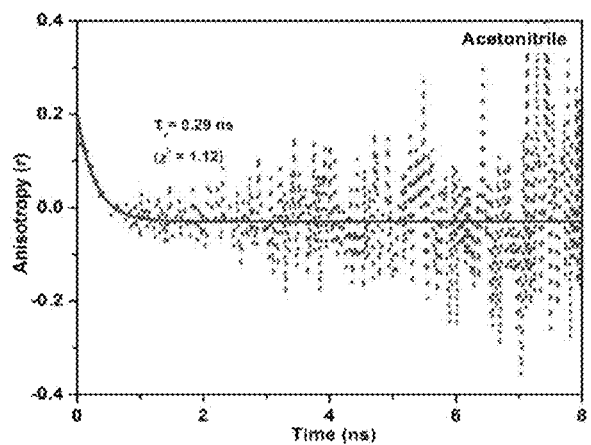
FIGS. 12A to 12O indicate the anisotropy decays (green) and the single-exponential fit (red) to the experimental anisotropy data of 5 μM 3TCC in different solvents at room temperature.
Figure 12B:
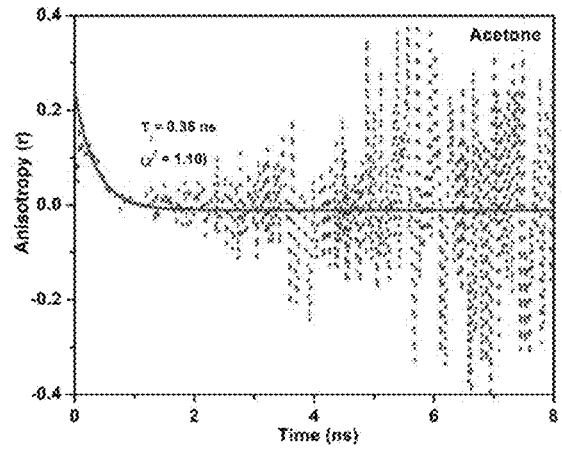
Figure 12C:
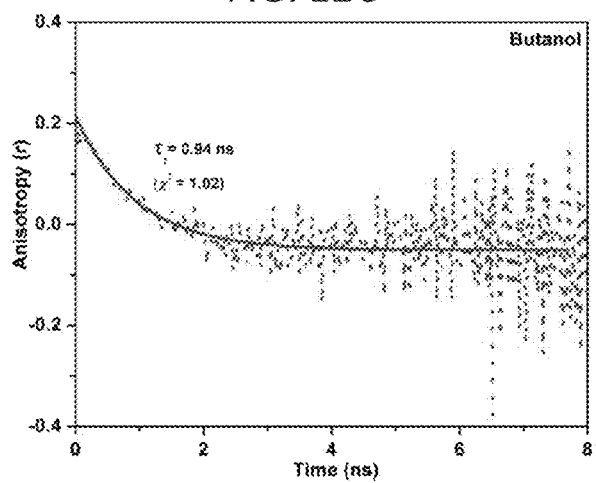
Figure 12D:
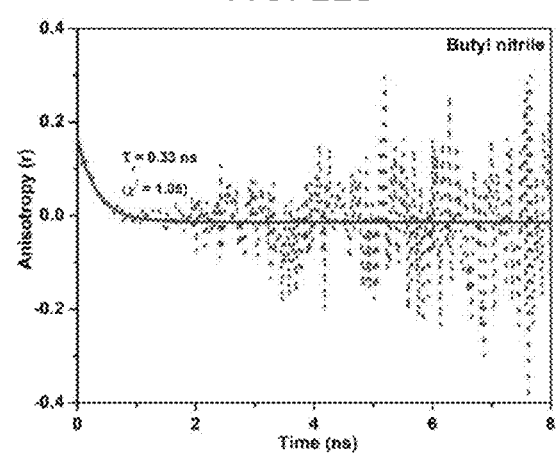
Figure 12E:
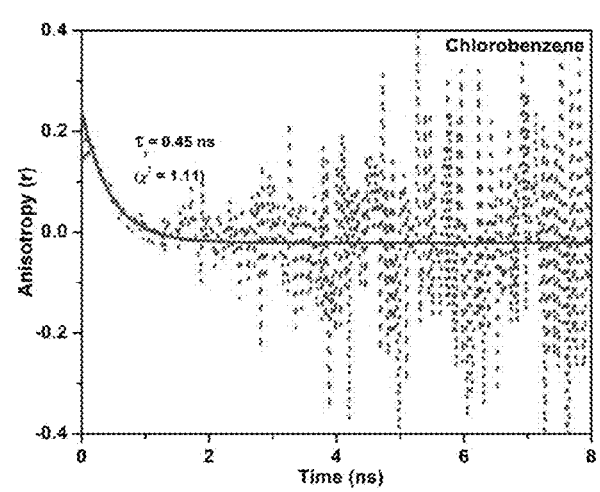
Figure 12F:
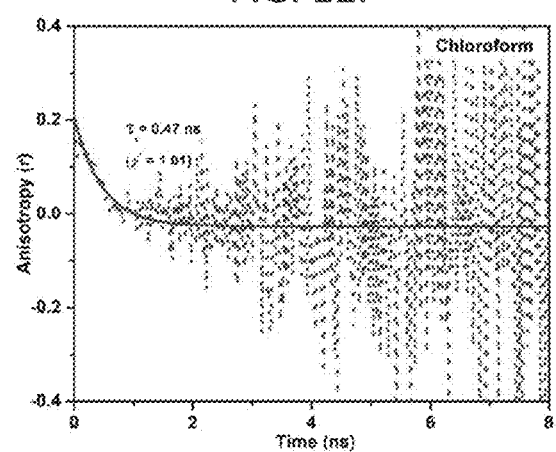
Figure 12G:
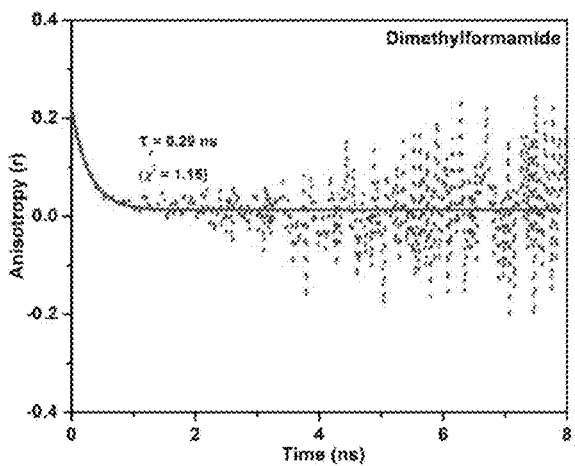
Figure 12H:
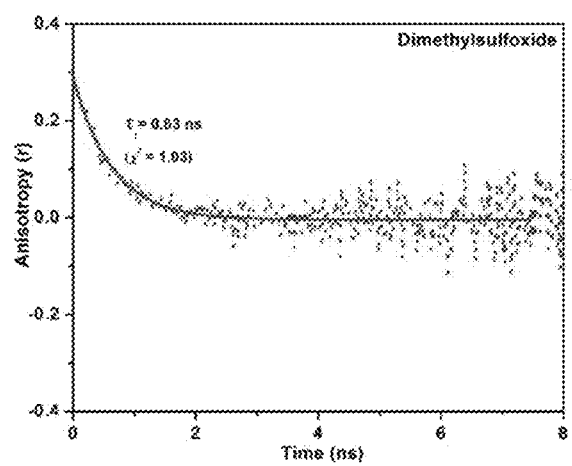
Figure 12I:
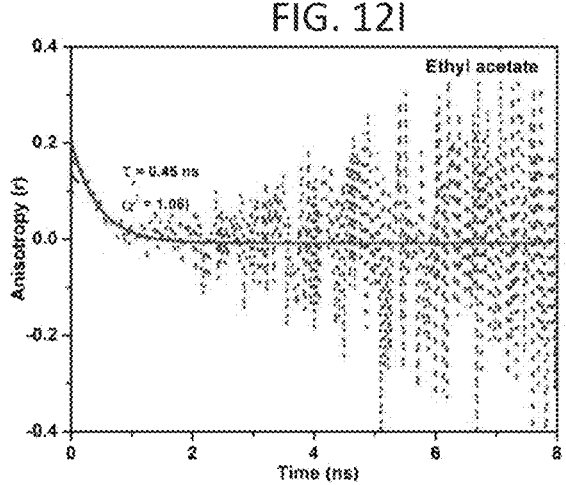
Figure 12J:
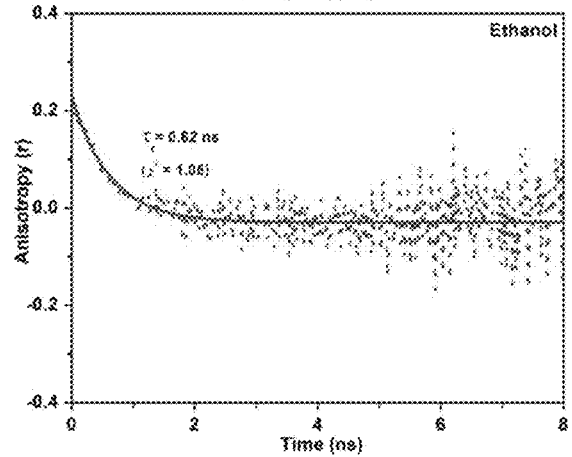
Figure 12K:
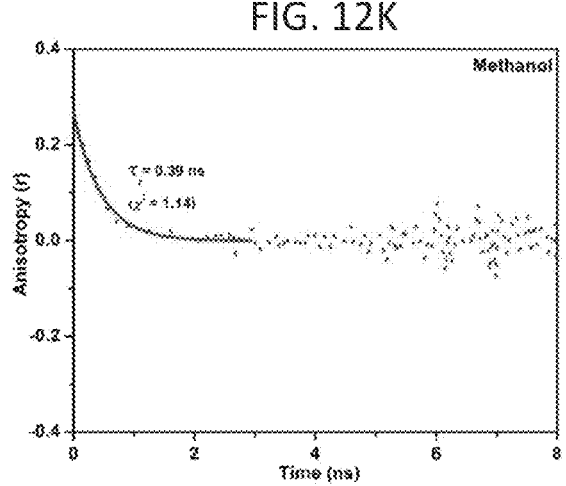
Figure 12L:
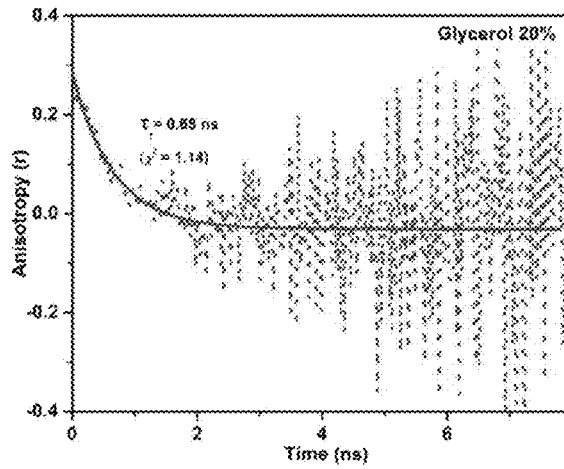
Figure 12M:
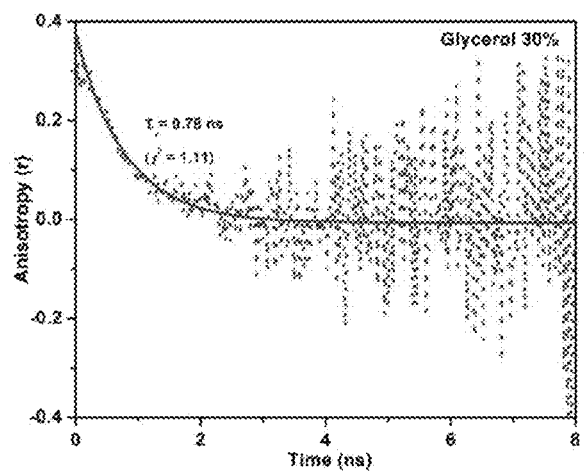
Figure 12N:
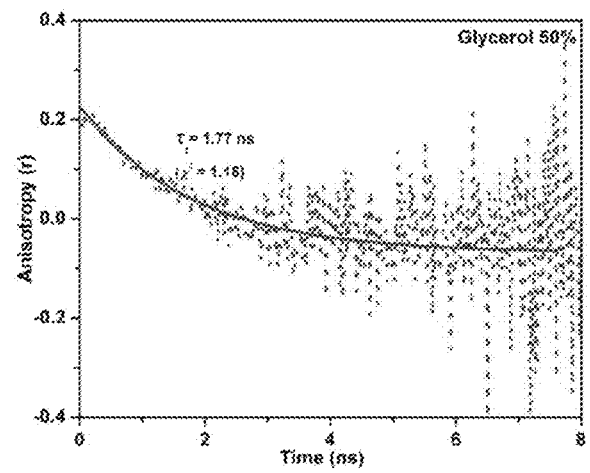
Figure 12O:
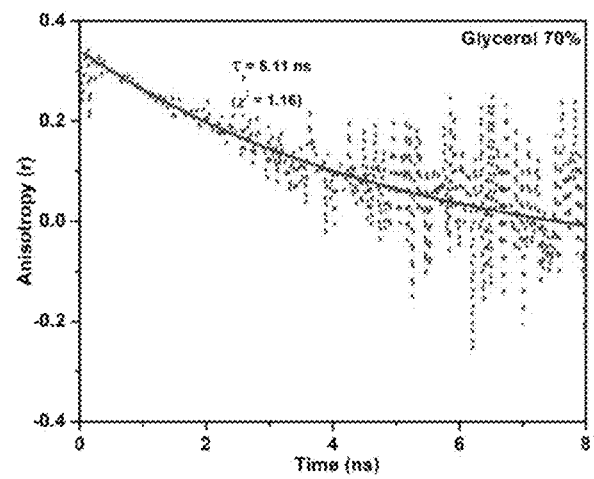

FIGS. 12A to 12O indicate the anisotropy decays (green) and the single-exponential fit (red) to the experimental anisotropy data [r(t)=r0 exp(−t/τ_r)] of 5 μM 3TCC in different solvents at room temperature. The monitoring wavelength is taken from FIGS. 10A to 10O. The rotational correlation times with the chi-square of the fit are shown in the graphs. A diode laser's excitation wavelength was 375 nm with a time resolution of 30 ps.

Figure 13A:
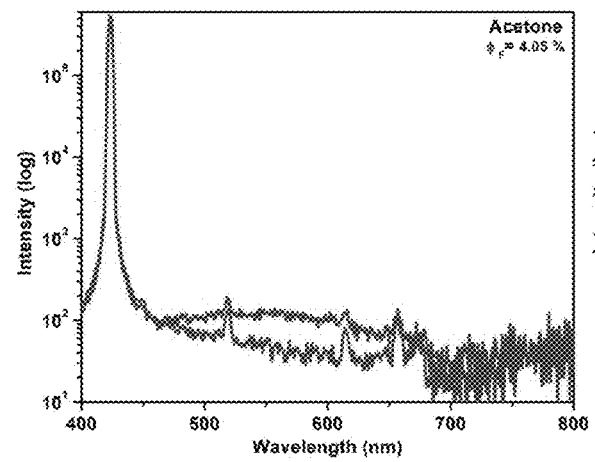
FIGS. 13A to 13O indicates the PLQY of 5 μM 3TCC in different solvents at room temperature.
Figure 13B:
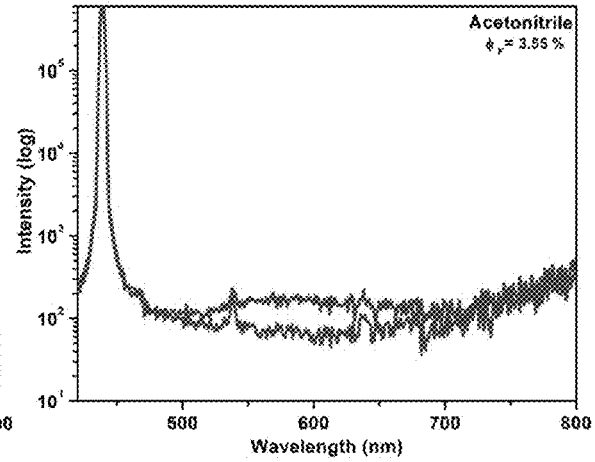
Figure 13C:
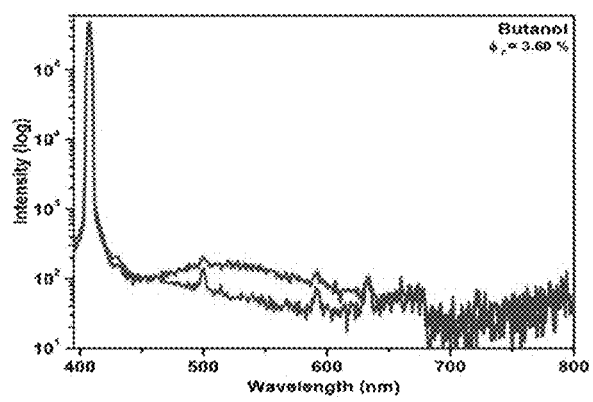
Figure 13D:
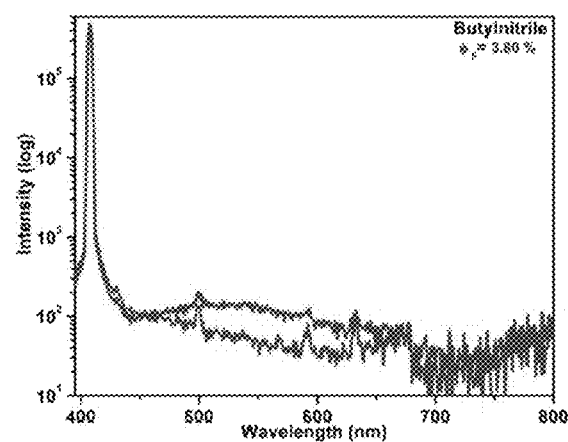
Figure 13E:
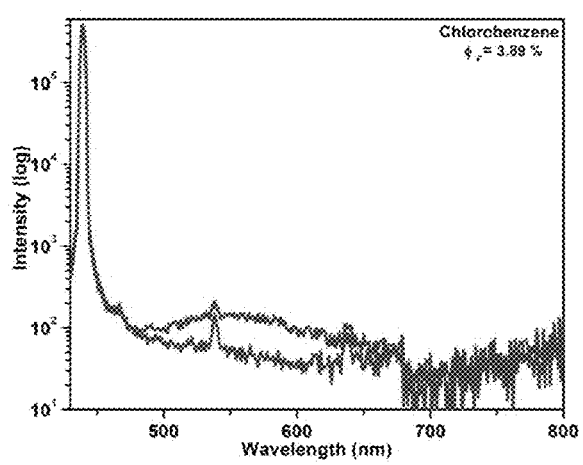
Figure 13F:
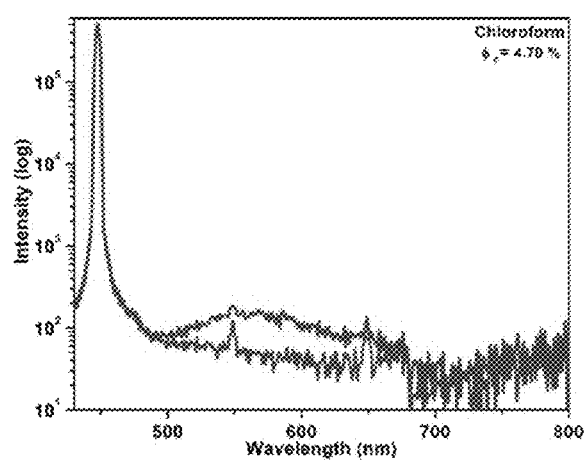
Figure 13G:
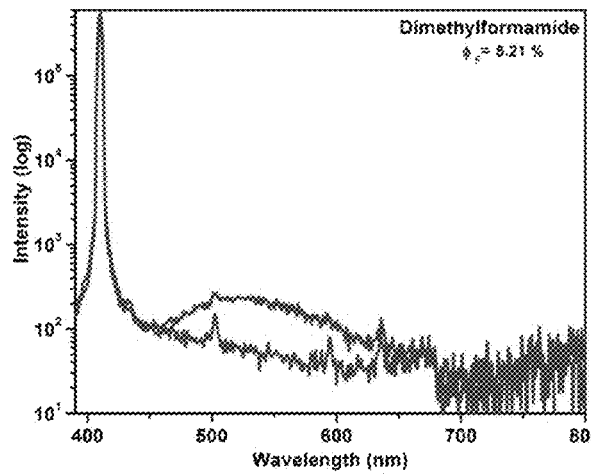
Figure 13H:
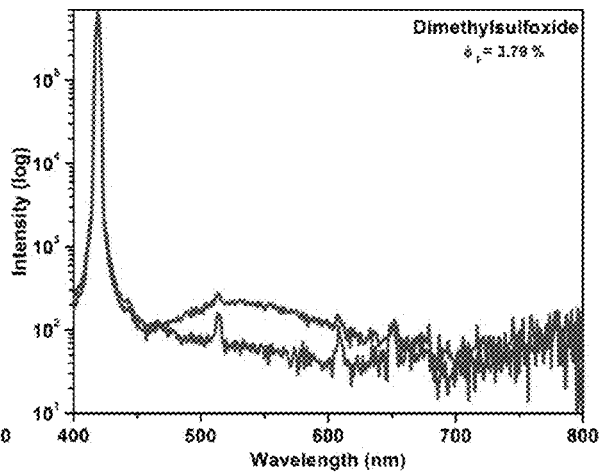
Figure 13I:
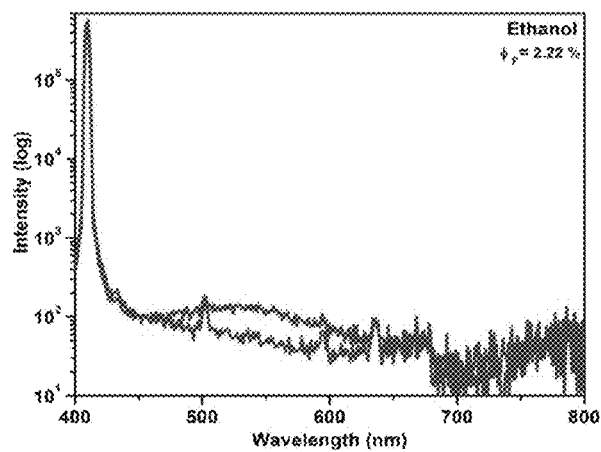
Figure 13J:
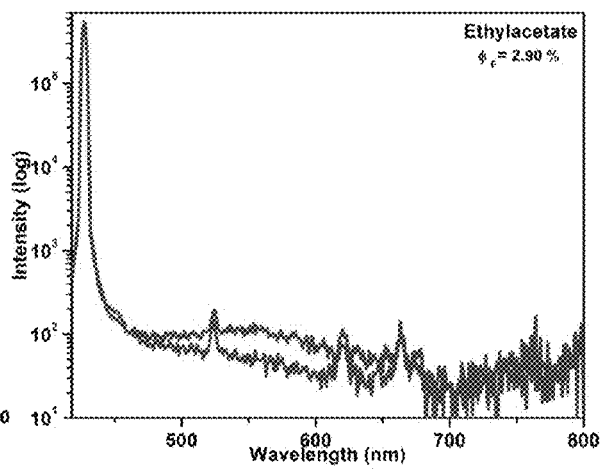
Figure 13K:
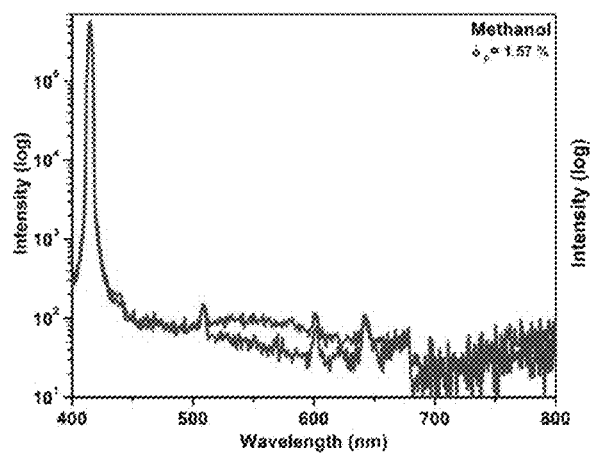
Figure 13L:
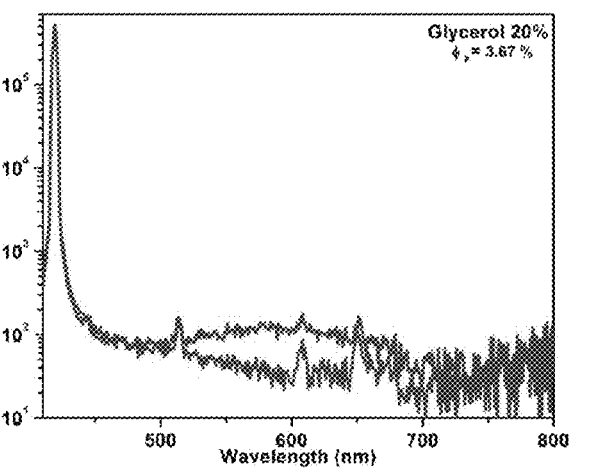
Figure 13M:
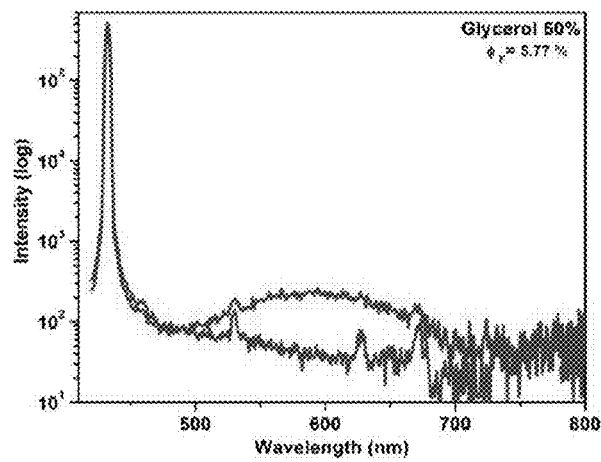
Figure 13N:
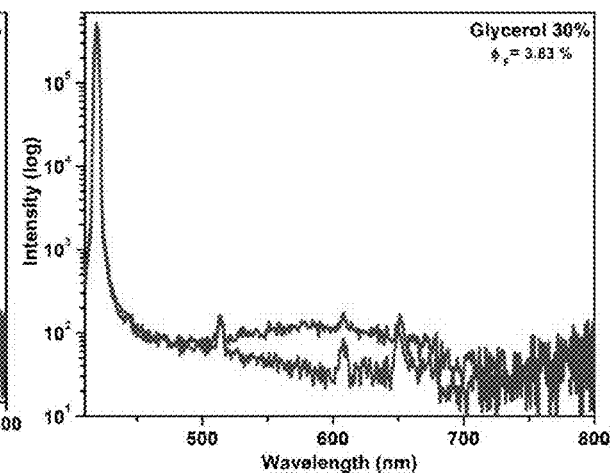
Figure 13O:
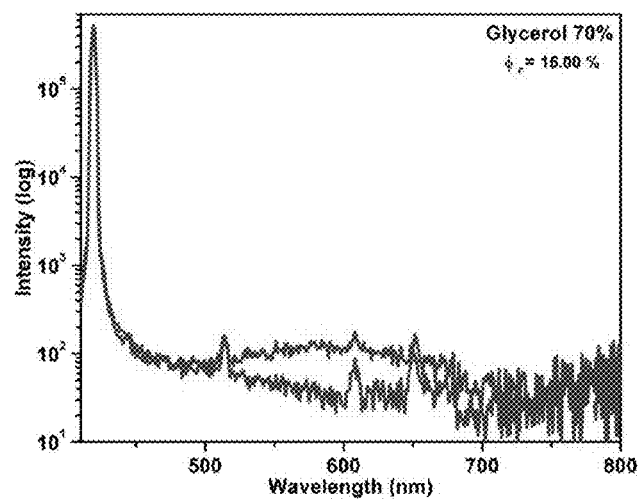

FIGS. 13A to 13O indicates the PLQY of 5 μM 3TCC in different solvents at room temperature. The name of the solvent and the absolute quantum yield (QY) values are shown in the graphs. The excitation wavelength is taken from FIGS. 10A to 10O.

Figure 14A:
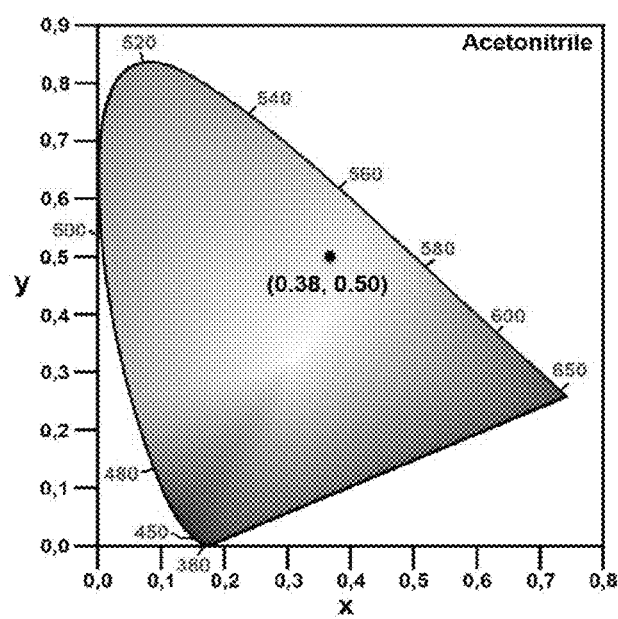
FIGS. 14A to 14O indicate the chromaticity plot of 5 μM 3TCC emission in CIE 1931 color space, calculated using Fluoracle from the emission spectrum in FIG. 10A to 10O.
Figure 14B:
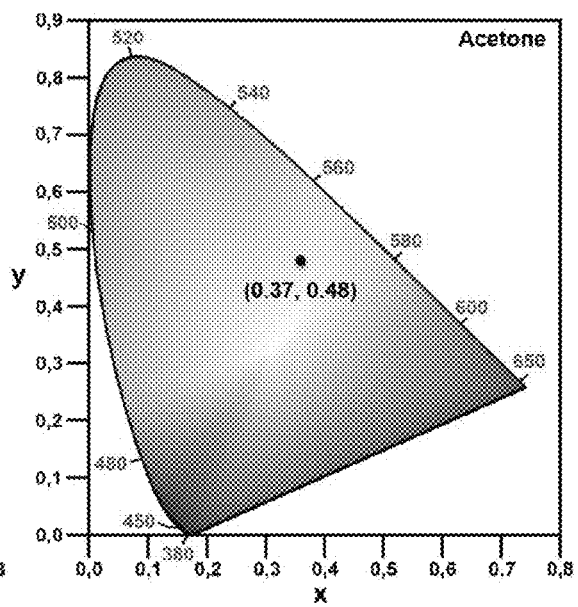
Figure 14C:
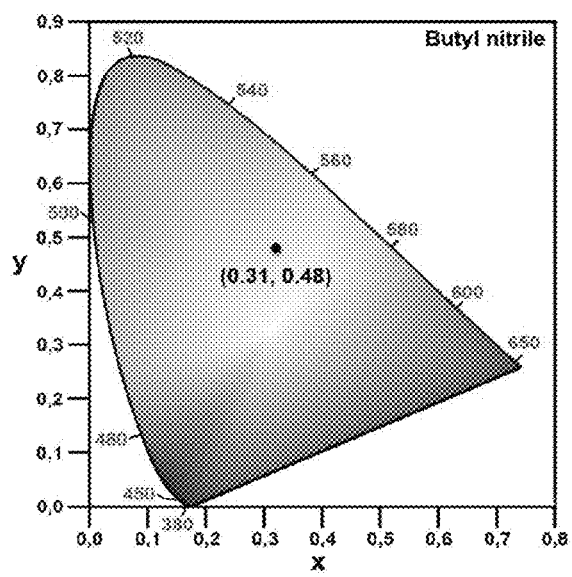
Figure 14D:
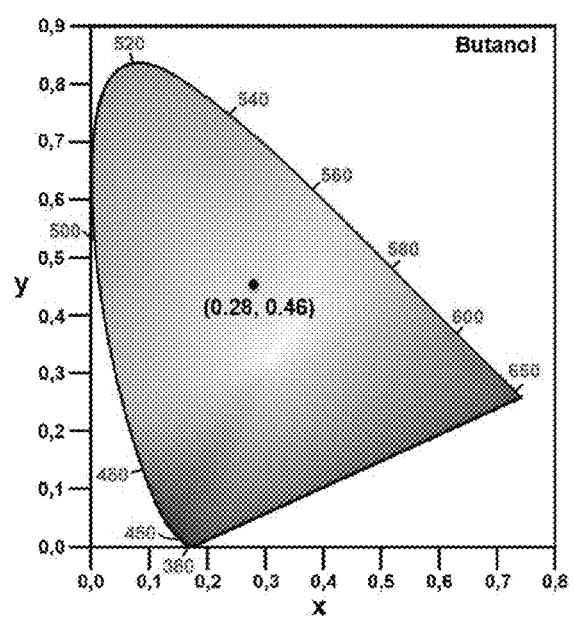
Figure 14E:
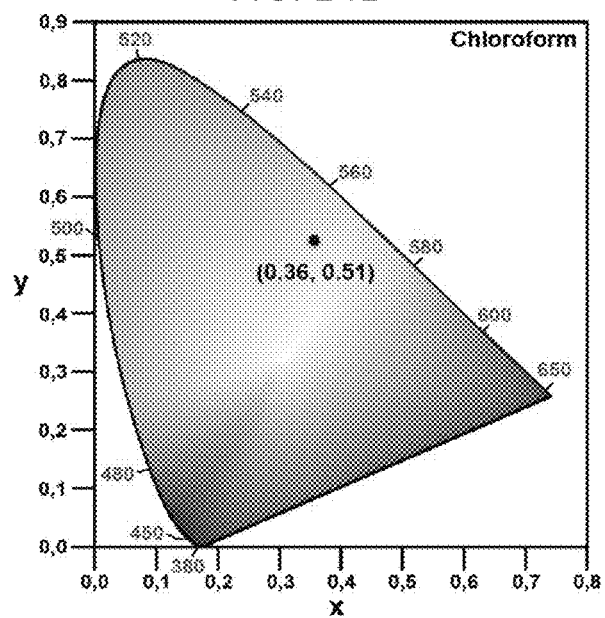
Figure 14F:
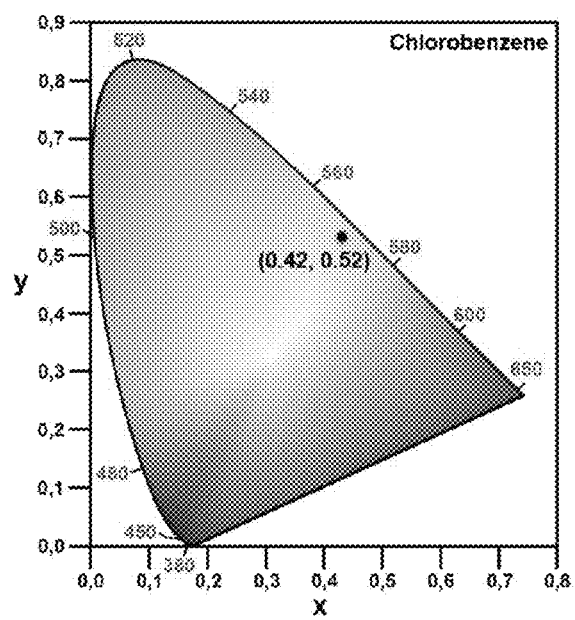
Figure 14G:
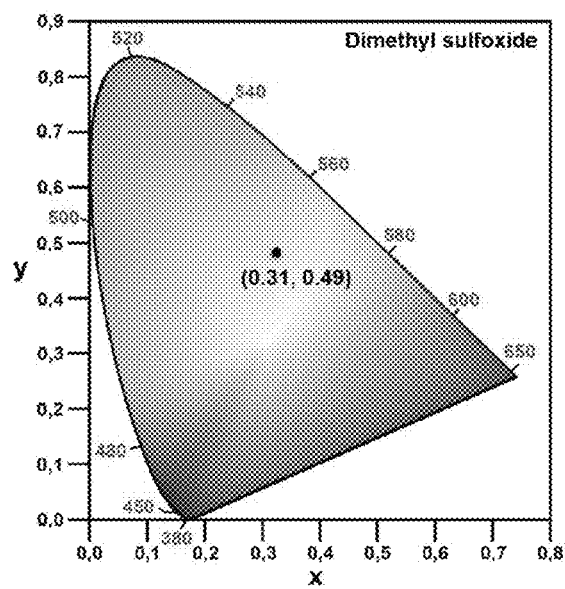
Figure 14H:
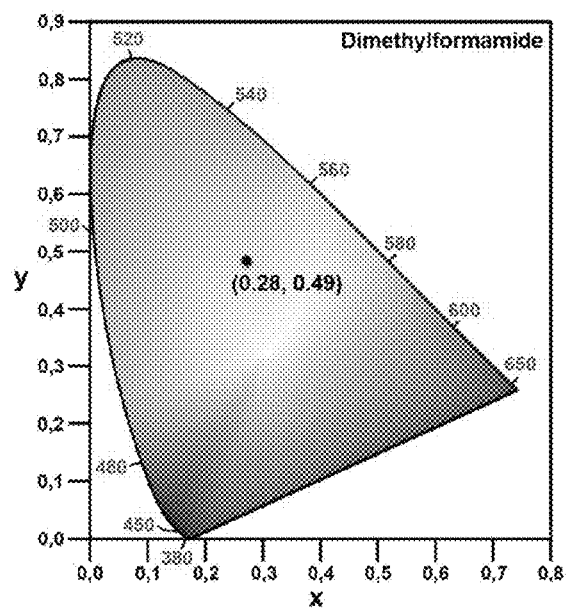
Figure 14I:
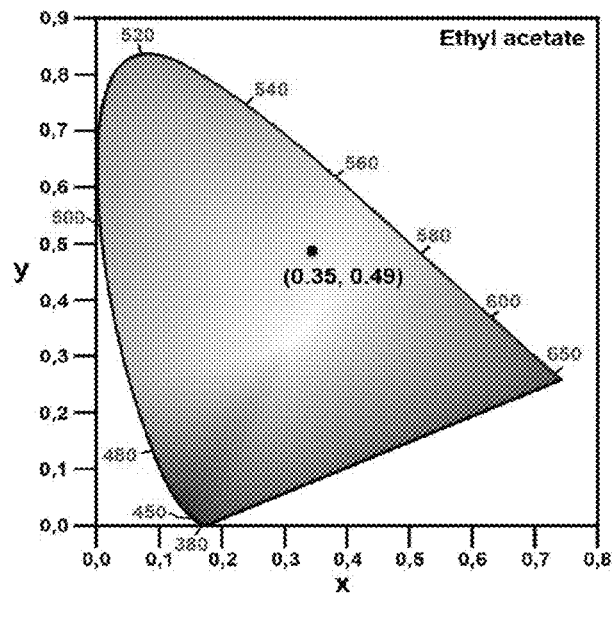
Figure 14J:
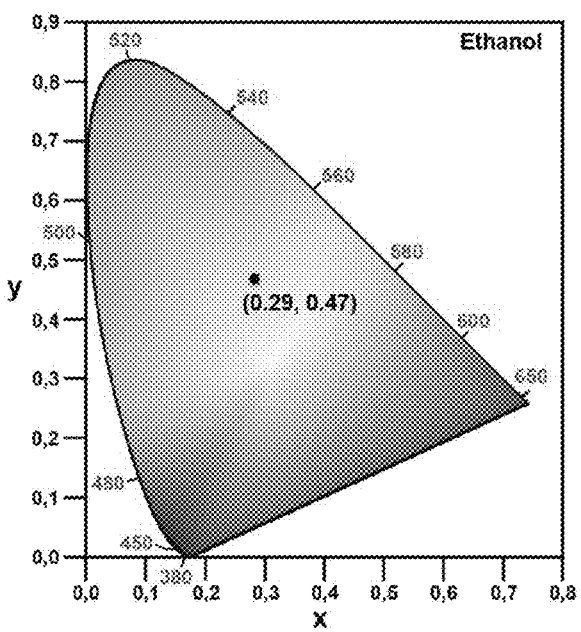
Figure 14K:
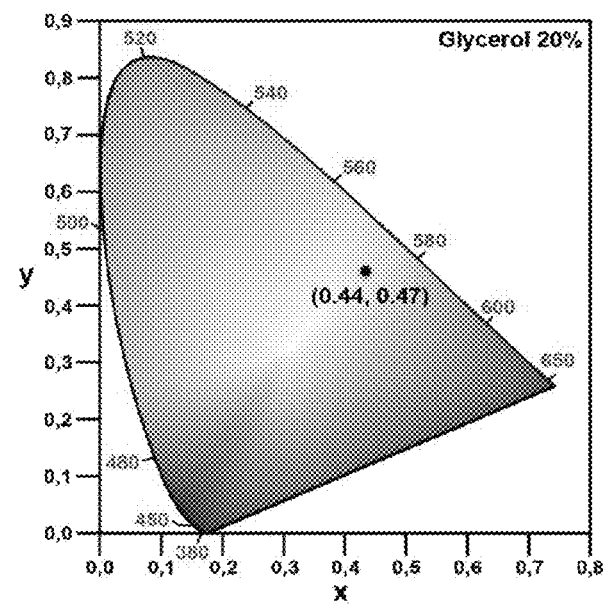
Figure 14L:
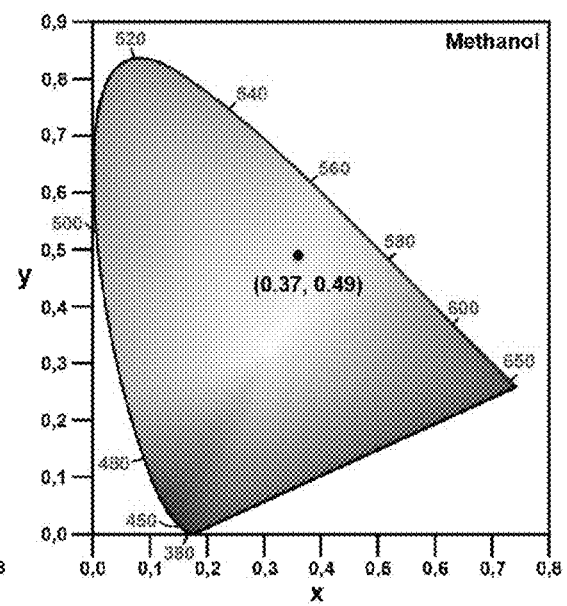
Figure 14M:
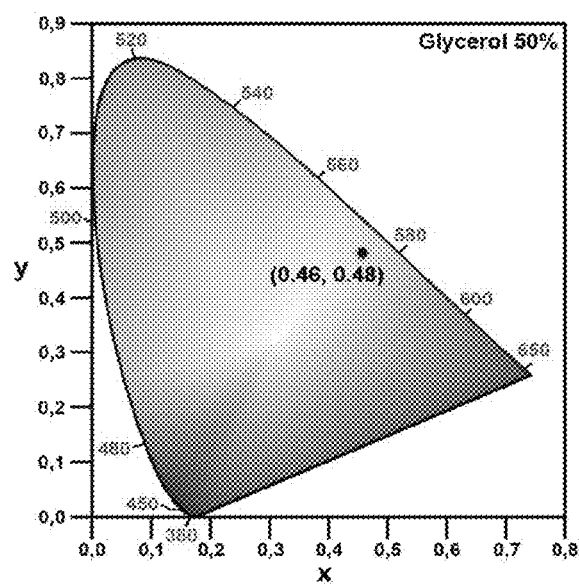
Figure 14N:
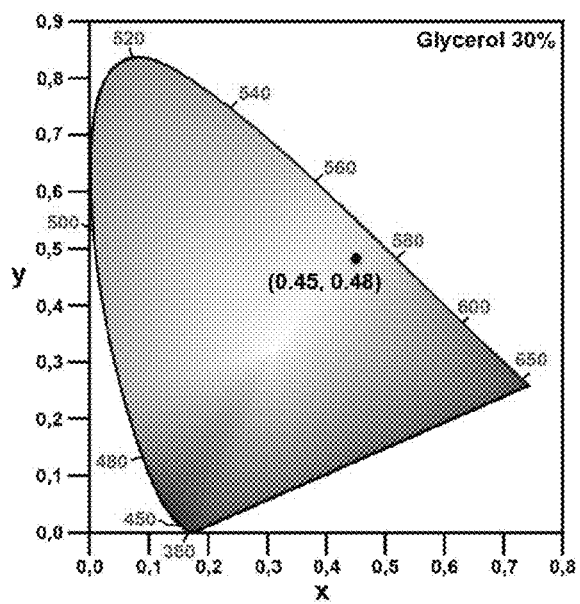
Figure 14O:
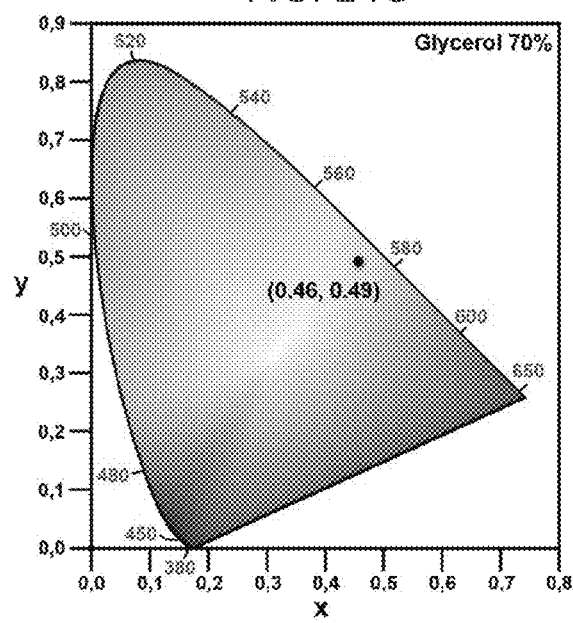

FIGS. 14A to 14O indicate the chromaticity plot of 5 μM 3TCC emission in CIE 1931 color space, calculated using Fluoracle from the emission spectrum in FIGS. 10A to 10O. The white point (0.33, 0.33) is shown as a reference.

Table 4 provides the solvent properties for the solvents that may be used in the method of the invention as follows.

TABLE 4

| Solvents | n | ε | Δf | η/cP |
|---|---|---|---|---|
| Acetone | 0.36 | 15.4 | 0.28 | 0.36 |
| Acetonitrile | 1.344 | 37.5 | 0.31 | 0.34 |
| Butanol | 1.394 | 17.85 | 0.27 | 2.57 |
| Butyl nitrile | 1.368 | 10.7 | 0.25 | 0.87 |
| Chlorobenzene | 1.524 | 5.6 | 0.14 | 7.68 |
| Chloroform | 1.446 | 4.81 | 0.15 | 0.57 |
| DMF | 1.435 | 37.6 | 0.28 | 0.92 |
| DMSO | 1.479 | 48.9 | 0.26 | 1.99 |
| Ethyl acetate | 1.37 | 6 | 0.2 | 0.45 |
| Ethanol | 1.364 | 25.07 | 0.29 | 0.98 |
| Methanol | 1.328 | 32.7 | 0.31 | 0.54 |
| Glycerol | 1.46 | 46.5 | 0.27 | 954 |

Figure 15:
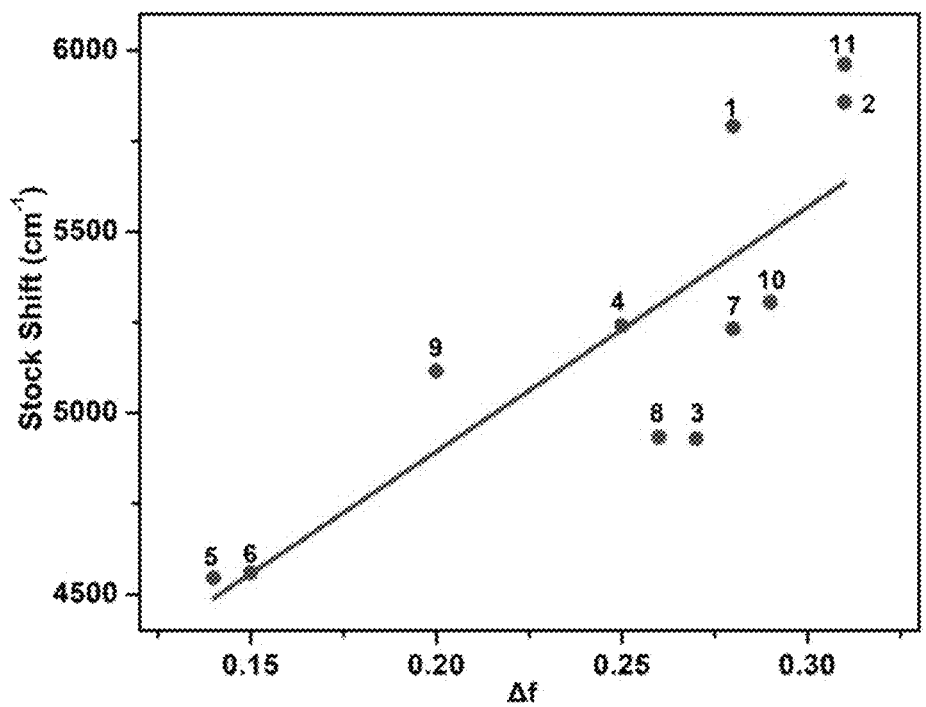
FIG. 15 indicates the plot of Stokes shift (taken from Table 3) of 5 μM 3TCC versus Δf (taken from Table 4) in (1) acetone, (2) acetonitrile, (3) butanol, (4) butyl nitrile, (5) chlorobenzene, (6) chloroform, (7) dimethylformamide, (8) dimethyl sulfoxide, (9) ethyl acetate, (10) ethanol, and (11) methanol.

FIG. 15 indicates the plot of Stokes shift (taken from Table 3) of 5 μM 3TCC versus Δf (taken from Table 4) in (1) acetone, (2) acetonitrile, (3) butanol, (4) butyl nitrile, (5) chlorobenzene, (6) chloroform, (7) dimethylformamide, (8) dimethyl sulfoxide, (9) ethyl acetate, (10) ethanol, and (11) methanol.

Figure 16:
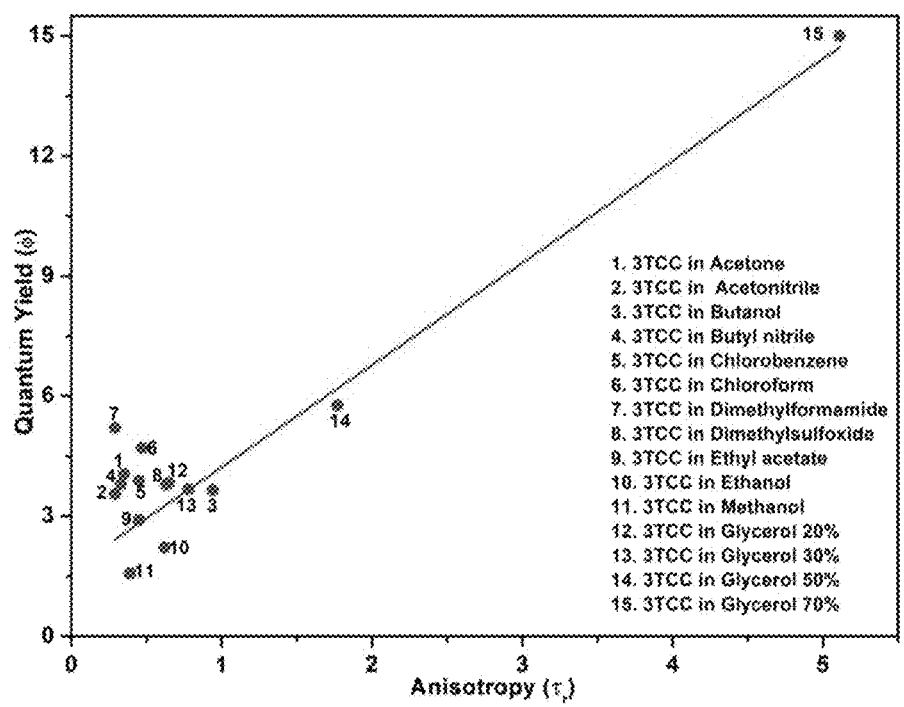
FIG. 16 indicates a plot of the PLQY versus rotational time of 5 μM 3TCC (taken from Table 4); (1) acetone, (2) acetonitrile, (3) butanol, (4) butyl nitrile, (5) chlorobenzene, (6) chloroform, (7) dimethylformamide, (8) dimethyl sulfoxide, (9) ethyl acetate, (10) ethanol, (11) methanol, (12) 20% glycerol in water, (13) 30% glycerol in water, (14) 50% glycerol in water, and (15) 70% glycerol in water.

FIG. 16 indicates a plot of the PLQY versus rotational time of 5 μM 3TCC (taken from Table 4); (1) acetone, (2) acetonitrile, (3) butanol, (4) butyl nitrile, (5) chlorobenzene, (6) chloroform, (7) dimethylformamide, (8) dimethyl sulfoxide, (9) ethyl acetate, (10) ethanol, (11) methanol, (12) 20% glycerol in water, (13) 30% glycerol in water, (14) 50% glycerol in water, and (15) 70% glycerol in water.

Results corresponding to the spectroscopic, photophysical, and chromatic properties of 3TCC in solvent mixtures confirm that changing the solvent modulates electronic-state mixing and coupling on the charge transfer states of 3TCC molecules, which form due to twisting of the single bond linking the thiophene donor and cyanoacetate acceptor moieties. Following intramolecular twisting, the TICT state returns to the ground state through red-shifted emission or nonradiative relaxation. Because the emission properties potentially depend on the environment, TICT-based 3TCC fluorophores are applied as sensors for solvents, (micro) viscosity, and chemical species, as well as in organic optoelectronics, non-linear optics, and solar energy conversion.

The DRS spectra was measured for all new solids and MOF-177 to verify the effects of infiltration with the TICT probe on the band gap of MOF-177 at 298 K without changing the linkers or metal clusters. The results of the DRS spectra are provided in FIGS. 17A to 17D and FIGS. 18A to 18H.

FIGS. 17A to 17D shows the DRS spectra (Kubelka-Munk function) and corresponding Tauc plots of MOF-177 FIGS. 3A and 3B and 3TCC@MOF-177 solids in FIGS. 3C and 3D. The 3TCC@MOF-177 solids used in this experiment was made using 11 wt % of 3TCC in MOE-177 prepared from methanol at 298 K utilizing direct optical band gaps.

FIG. S12 shows DRS spectra (Kubelka-Munk function) and the corresponding tauc plots of 3TCC@MOF-177 solids (1 wt % of 3TCC) at 298 K utilizing direct optical band gaps in different solvents.

TABLE 5

Figure 18A:
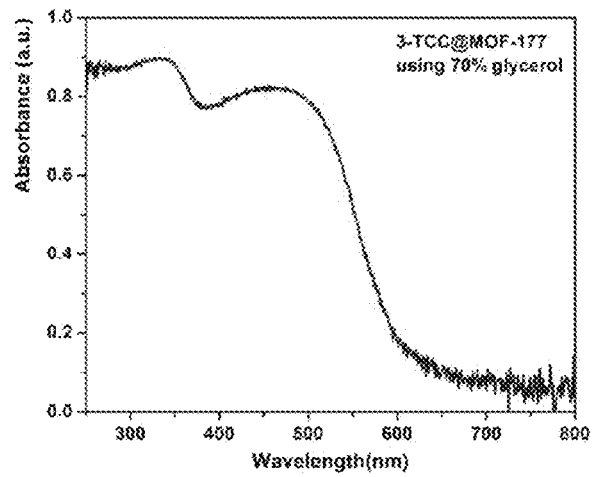
FIGS. 18A to 18H provides DRS spectra (Kubelka-Munk function) (left) and the corresponding tauc plots (right) of 3TCC@MOF-177 solids (1 wt % of 3TCC) at 298 K utilizing direct optical band gaps.
Figure 18B:
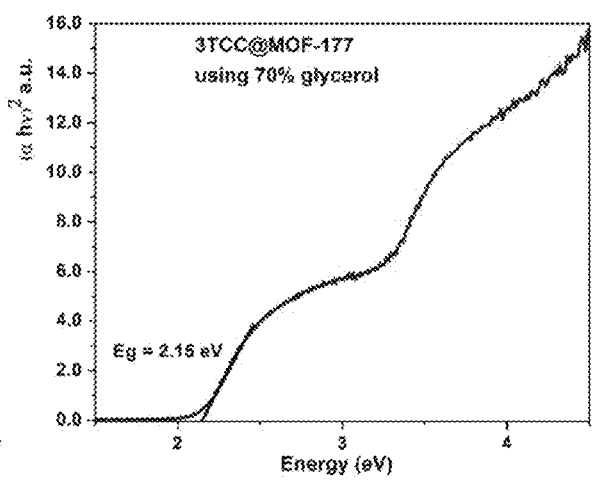
Figure 18C:
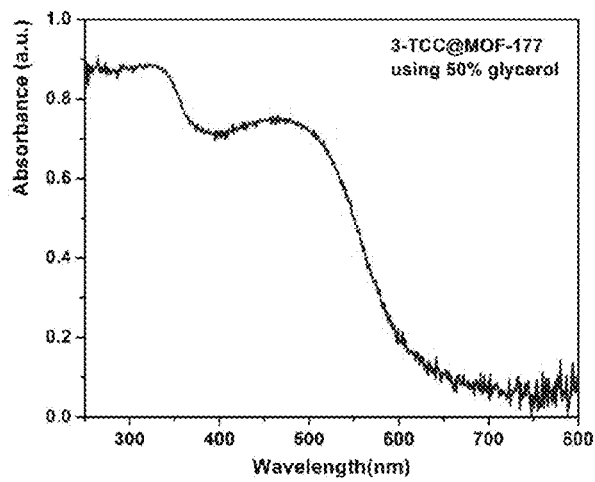
Figure 18D:
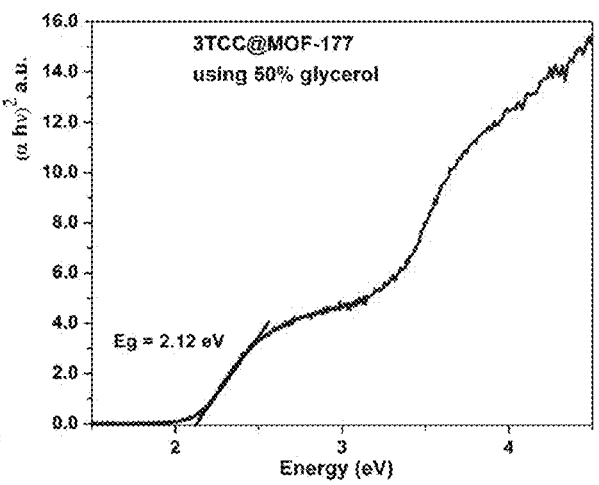
Figure 18E:
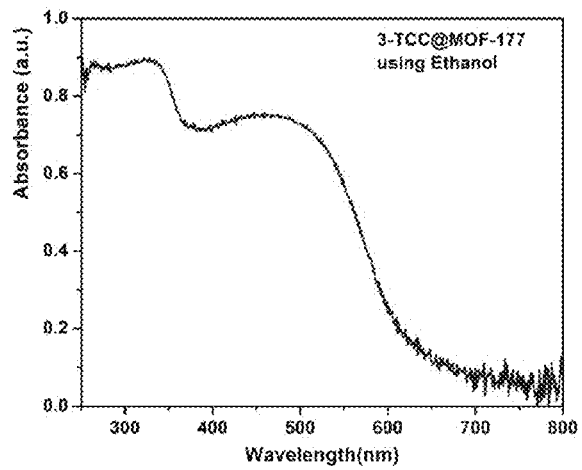
Figure 18F:
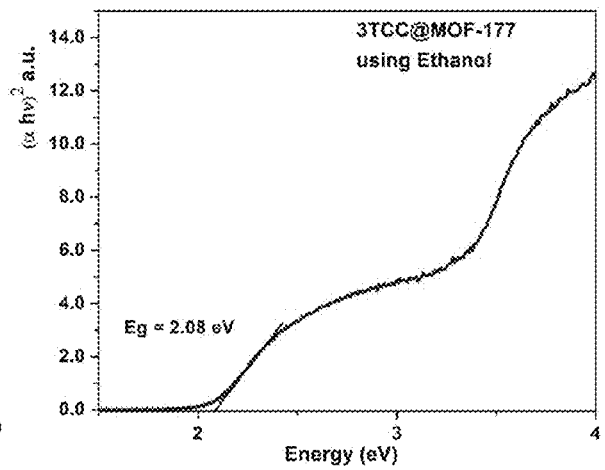
Figure 18G:
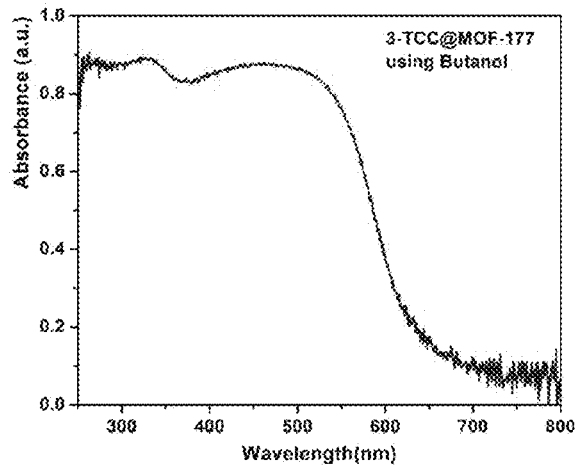
Figure 18H:
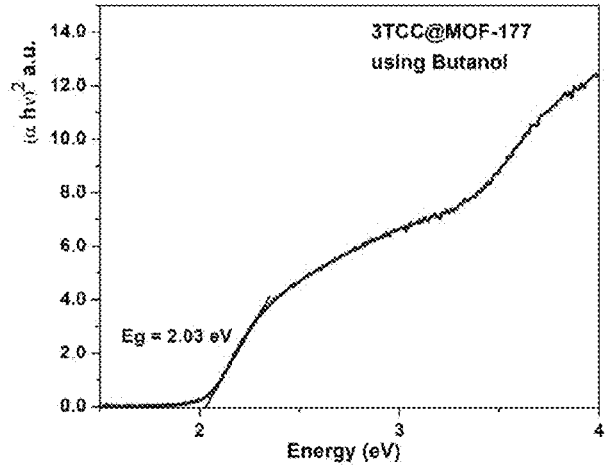

| Solvent | Figure numbers for DRS spectra | Figure numbers for corresponding tauc plots |
|---|---|---|
| 70% Glycerol | FIG. 18A | FIG. 18B |
| 50% Glycerol | FIG. 18C | FIG. 18D |
| Ethanol | FIG. 18E | FIG. 18F |
| Butanol | FIG. 18G | FIG. 18H | provides the Spectroscopic and photophysical data for 3TCC@MOF-177 (1 wt % of 3TCC in MOF-177) solids prepared from different solvents.

TABLE 5

| The solvent used in the preparation step | Eg/ev | PL maximum/ nm | $\tau(rot)$/ ns | $\Phi F$ ±3% | $\tau$/ns | CIE |
|---|---|---|---|---|---|---|
| Methanol | 2.18 | 598 | 0.14 | 65 | 11.2 | 0.57, 0.42 |
| Methanol (10 wt %) | ND | 630 | ND | ND | ND | ND |
| Methanol (40 wt %) | ND | 640 | ND | ND | ND | ND |
| Methanol (90 wt %) | ND | 640 | ND | ND | ND | ND |
| Glycerol 70% in water | 2.15 | 587 | 0.37 | 51 | 7.8 | 0.52, 0.44 |
| Glycerol 50% in water | 2.12 | 593 | 0.34 | 44 | 7.9 | 0.54, 0.42 |
| DMF (0.5 wt %) | ND | 578 | ND | 42 | ND | ND |
| DMF | ND | 580 | 0.38 | 45 | 9.2 | 0.52, 0.47 |
| DMF (2 wt %) | ND | 583 | ND | 52 | ND | ND |
| Ethanol | 2.08 | 597 | 0.41 | 42 | 11.9 | 0.56, 0.43 |
| Butanol | 2.03 | 608 | 0.51 | 32 | 6 | 0.59, 0.40 |

Band gap in electron volts (Eg), PL emission ($\lambda f$) peak positions and PL excited-state average lifetimes $\tau$ (Method section) along with fluorescence quantum yields ($\phi F$), correlation rotational times ($\tau r$), and CIE data.

The estimated energy gap indicated in Table 5 and FIGS. 18A to 18H (band cutoff) dramatically decreased from approximately 3.0 (~380 nm) to 2.2 (~590 nm) electron volts (eV) following the addition of 3TCC.

Figure 19A:
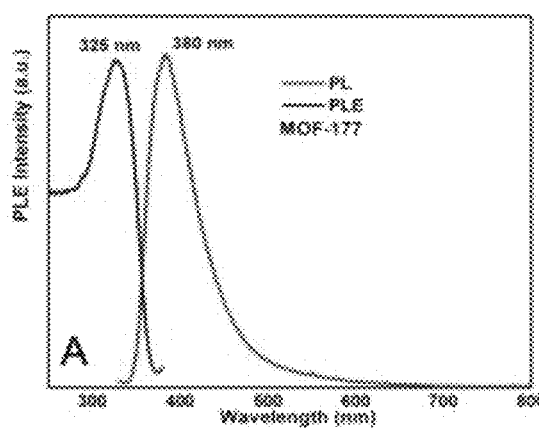
FIGS. 19A and 19B illustrates the PLE (blue) and PL (red) spectra of MOF-177 (FIG. 19A) and 3TCC@MOF-177 (FIG. 19B) solids (1 wt % 3TCC in MOF-177 prepared using methanol) at room temperature.
Figure 19B:
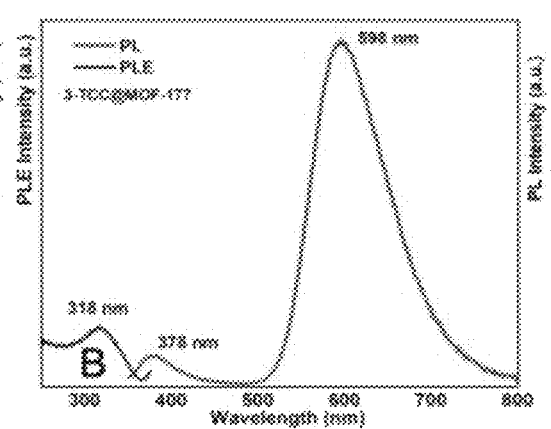
Figure 19C:
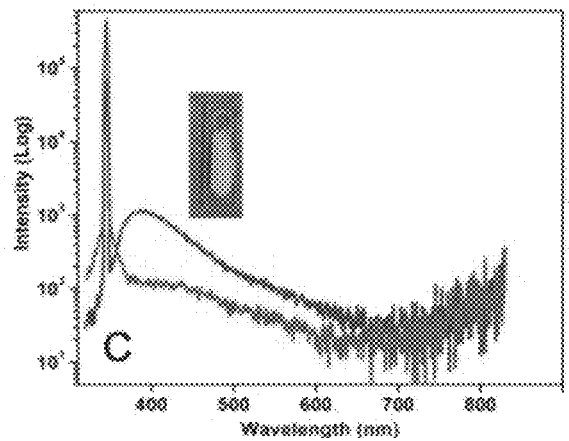
FIG. 19C illustrates the PLQY of MOF-177 and FIG. 19D illustrates the PLQY of 3TCC@MOF-177 solids (1 wt % 3TCC) at room temperature.
Figure 19D:
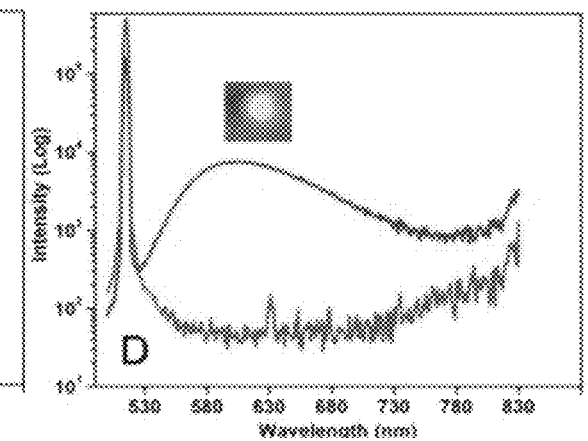
Figures 21C, 21D:
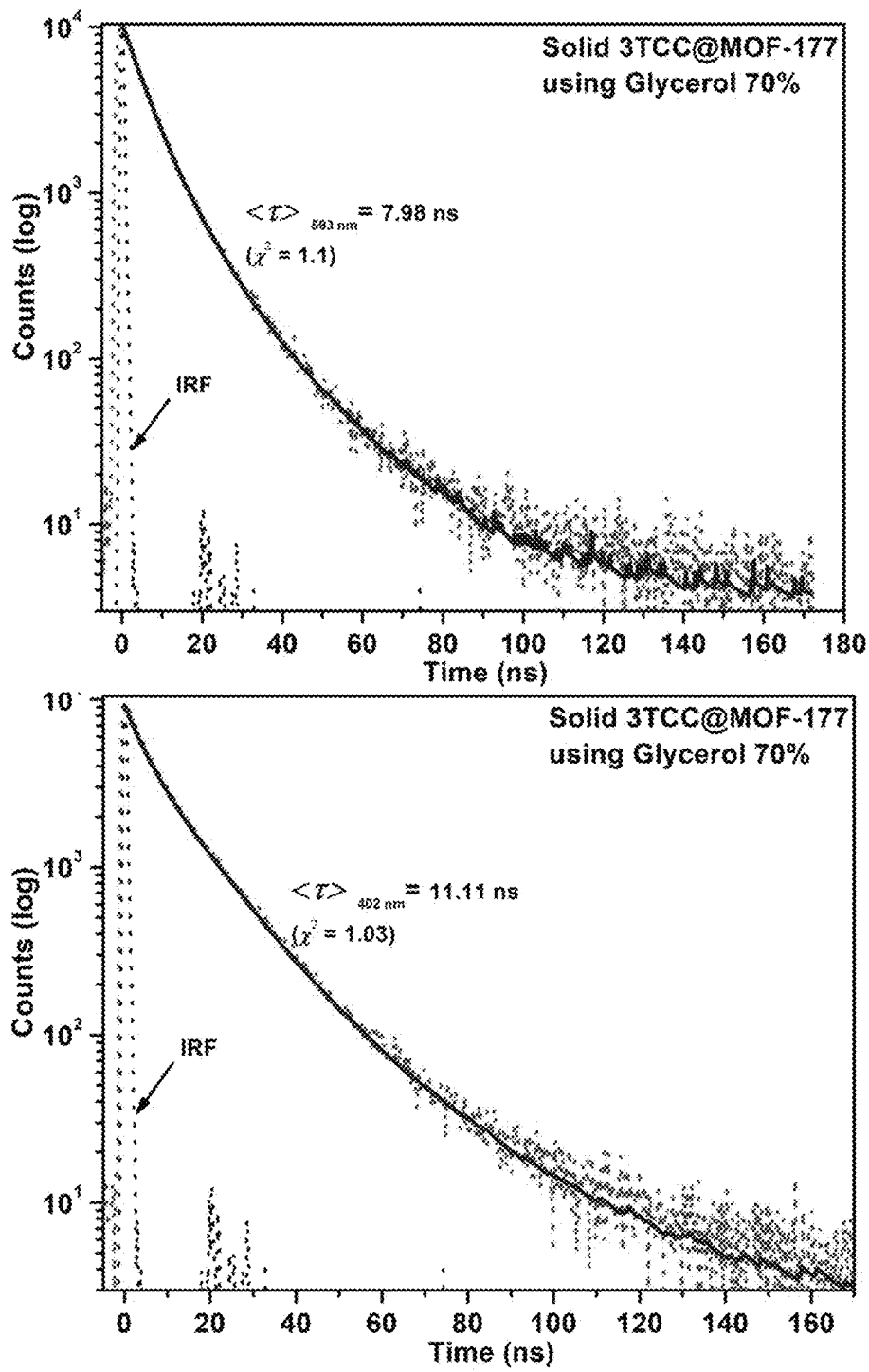
Figure 21I:
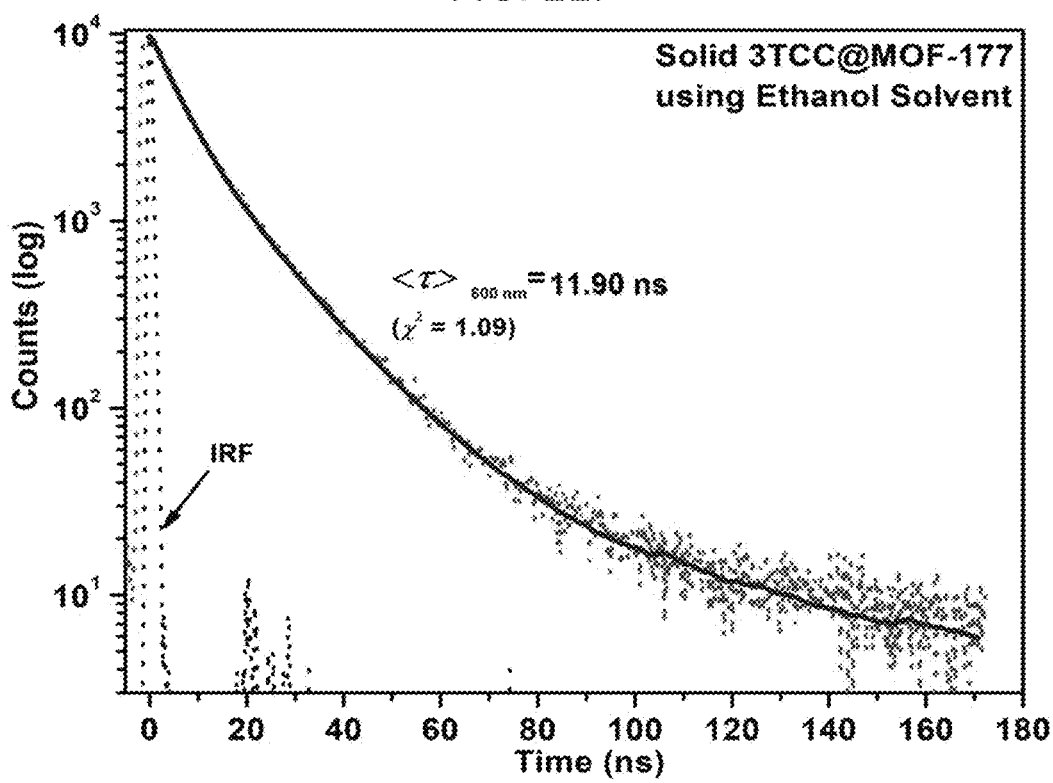
Figure 21J:
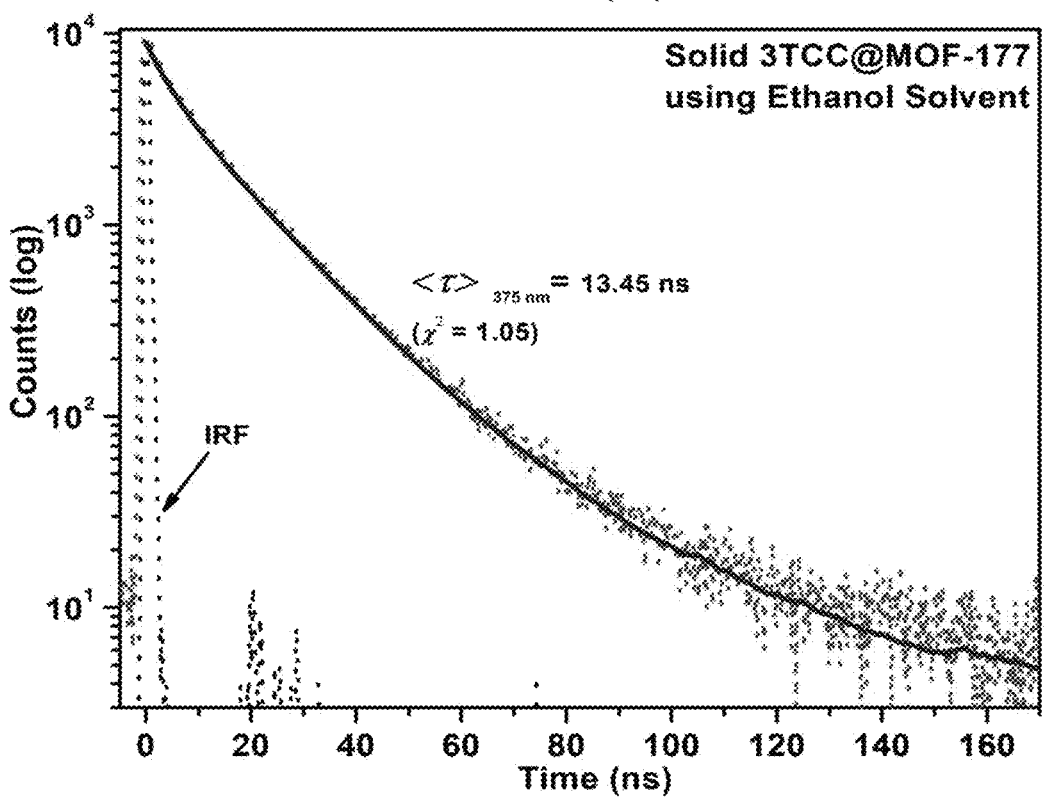
Figure 22A:
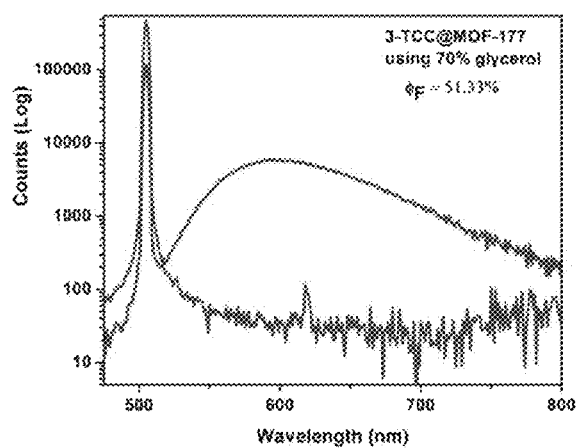
FIGS. 22A-22E illustrate PLQY of 3TCC@MOF-177 solids (1 wt % 3TCC) at room temperature.
Figure 22B:
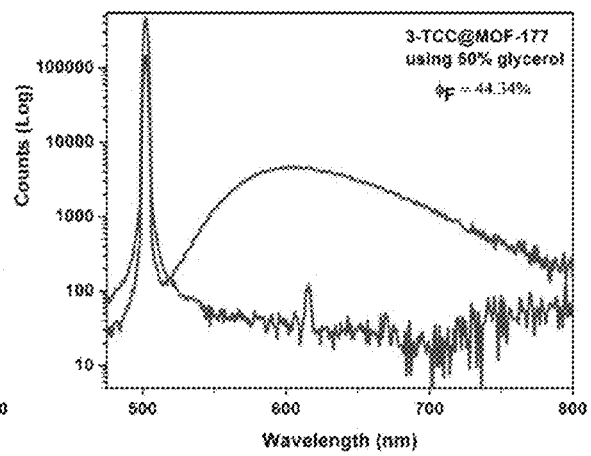
Figure 22C:
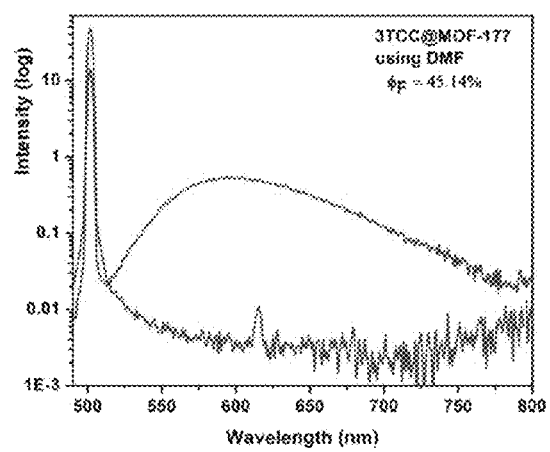
Figure 22D:
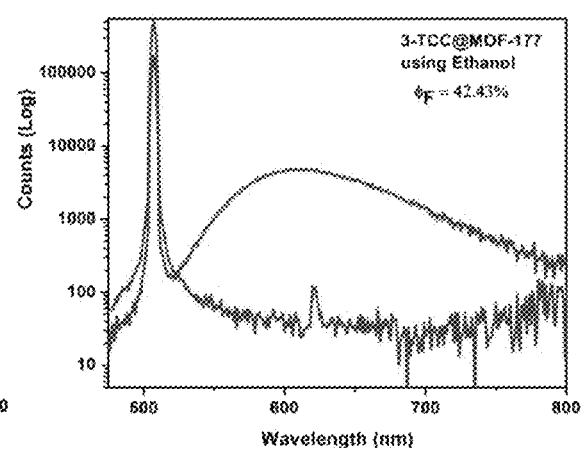
Figure 22E:
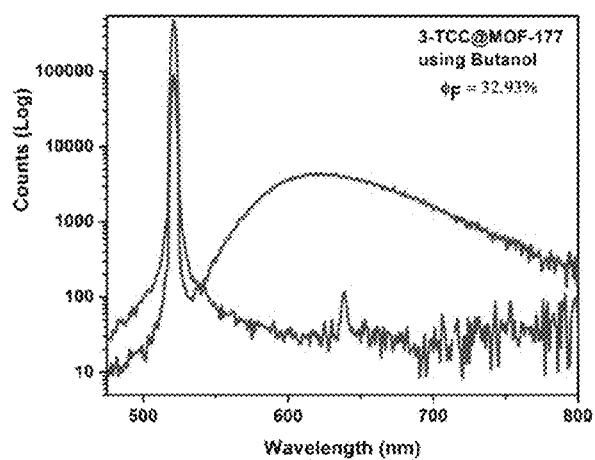

FIGS. 19A and 19B illustrates the PLE (blue) and PL (red) spectra of MOF-177 (FIG. 19A) and 3TCC@MOF-177 (FIG. 19B) solids (1 wt % 3TCC in MOF-177 prepared using methanol) at room temperature. The monitoring excitation and emission wavelengths are shown in the graphs. PLQY of MOF-177 are illustrated in FIG. 19C and 3TCC@MOF-177 are illustrated in FIG. 19D solids (1 wt % 3TCC) at room temperature. The absolute QY values are directly in the graphs.

FIGS. 20A-20L Illustrates the PLE (blue) and PL (red) spectra of 3TCC@MOF-177 solids (1 wt % 3TCC) at room temperature. The monitoring excitation and emission wavelengths and the solvent used in the preparation step are indicated in the graph.

Excitation wavelengths are taken from FIG. 19A for MOF-177 is 345 nm and FIGS. 20A to 20L is 515 nm for 3TCC@MOF-177.

The excitation (PLE) and emission (PL) spectra recorded for all 3TCC@MOF-177 solids in FIGS. 19A to 19D and FIGS. 20A to 20L correlated with all corresponding UV-visible data (onset wavelengths of bands).

Excitation and monitoring emission wavelengths are indicated in FIGS. 20A-20L, FIGS. 21A to 21L, FIGS. 22A to 22E, FIGS. 23A to 23F, FIGS. 25A to 25F, FIGS. 26A and 26B. All measurements were conducted at room temperature.

New emission peaks emerged in the PL spectra of 3TCC@MOF-177 (~600 nm) and MOF-177 (~380 nm), with excitation at ~320 and 345 nm, respectively as indicated in Table 5. The excitation/emission spectra for the new composites unfolded different origins for the new emission band (515/598 nm in FIGS. 19A to 19D). Both PL and PLE measurements confirmed the penetration of 3TCC through MOF-177.

FIGS. 21A to 21L illustrates PL decays (red) and the non-exponential fit (blue) of 3TCC@MOF-177 (1 wt % 3TCC) solids at room temperature. IRF, the monitoring wavelength and average excited-state lifetime values with the chi-square of the fit, and the solvent used in the preparation step are indicated in the graphs. The excitation wavelength was 320 nm by a laser diode with a time resolution of 90 ps.

Table 6 provides the observed PL excited-state lifetimes for different components extracted from the PL decays at around 600 nm*of solid 3TCC@MOF-177 samples (1 wt % of 3TCC prepared from different solvents). The exact excitation and monitoring emission wavelengths around 600 nm are indicated as $\chi 2$=Chi-Square

TABLE 6

| Solvent used | Lifetime components, t (ns) | Percentage of contribution, % | <t> (ns) | $x^2$ |
|---|---|---|---|---|
| Methanol | 6.4 | 54 | 11.2 | 1.15 |
|  | 15.1 | 42 |  |  |
|  | 36.5 | 4 |  |  |
| 70% Glycerol | 5.8 | 60 | 7.8 | 1.1 |
|  | 7.4 | 23 |  |  |
|  | 15.5 | 17 |  |  |
| 50% Glycerol | 4.6 | 65 | 7.9 | 1.02 |
|  | 11.7 | 28 |  |  |
|  | 23.2 | 7 |  |  |

TABLE 6-continued

| Solvent used | Lifetime components, t (ns) | Percentage of contribution, % | <t> (ns) | $x^2$ |
|---|---|---|---|---|
| Dimethylformamide | 5.6 | 57 | 9.2 | 1.15 |
|  | 11.9 | 34 |  |  |
|  | 22.6 | 9 |  |  |
| Ethanol | 5.9 | 44 | 11.9 | 1.09 |
|  | 14.6 | 52 |  |  |
|  | 54 | 4 |  |  |
| Butanol | 2.9 | 58 | 6 | 1.11 |
|  | 7.4 | 31 |  |  |
|  | 19.6 | 11 |  |  |

Table 7 illustrates the observed PL excited state lifetimes for different components extracted from the PL decays at around 380 nm* of solid 3TCC @MOF-177 samples (1 wt % of 3TCC prepared from different solvents)

TABLE 7

| Solvent used | Lifetime components, t (ns) | Percentage of contribution, % | <t> (ns) | $x^2$ |
|---|---|---|---|---|
| Methanol | 2.6 | 12 | 12.7 | 1.15 |
|  | 10.1 | 55 |  |  |
|  | 20.7 | 33 |  |  |
| 70% Glycerol | 4 | 26 | 11.1 | 1.1 |
|  | 11.4 | 61 |  |  |
|  | 23.7 | 13 |  |  |
| 50% Glycerol | 3.1 | 15 | 12.8 | 1.02 |
|  | 10.8 | 53 |  |  |
|  | 20.7 | 32 |  |  |
| Dimethylformamide | 3.2 | 16 | 11.9 | 1.15 |
|  | 10.4 | 59 |  |  |
|  | 21.4 | 25 |  |  |
| Ethanol | 3.7 | 13 | 13.3 | 1.09 |
|  | 12.3 | 68 |  |  |
|  | 24.4 | 19 |  |  |
| Butanol | 2.9 | 20 | 11.5 | 1.11 |
|  | 11.1 | 62 |  |  |
|  | 22.7 | 18 |  |  |

Moreover, the excited-state PL average lifetime values of all solid powders upon insertion of 3TCC into MOF-177 were lower than that of MOF-177 as illustrated in FIGS. 21A to 21L, Table 6, and Table 7. When compared to those of MOF-177, the new 3TCC@MOF-177 powders exhibited distinct photophysical (photonic) properties. These observations correlate with results for infiltrated MOF-177 matrices.

FIGS. 22A to 22E illustrates PLQY of 3TCC@MOF-177 solids (1 wt % 3TCC) at room temperature. The name of the solvent used in the preparation step and the absolute QY values are shown in the graphs. The excitation wavelength is taken from FIGS. 20A to 20L. Very high PLQY values were observed for all 3TCC@MOF-177 solids prepared using different solvents as illustrated in FIGS. 22A to 22E.

FIGS. 23A to 23C illustrates the PLE, PL, and PLQY spectra of 3TCC@MOF-177 solids at 0.5 wt % and FIGS. 23D to 23F illustrates the PLE, PL, and PLQY spectra of 3TCC@MOF-177 solids at 2 wt % of 3TCC in MOF-177 prepared using DMF at room temperature. The name of the solvent used in the preparation step and the absolute QY values are shown in the graphs. The monitoring excitation and emission wavelengths are also shown in the graphs.

Figure 24:
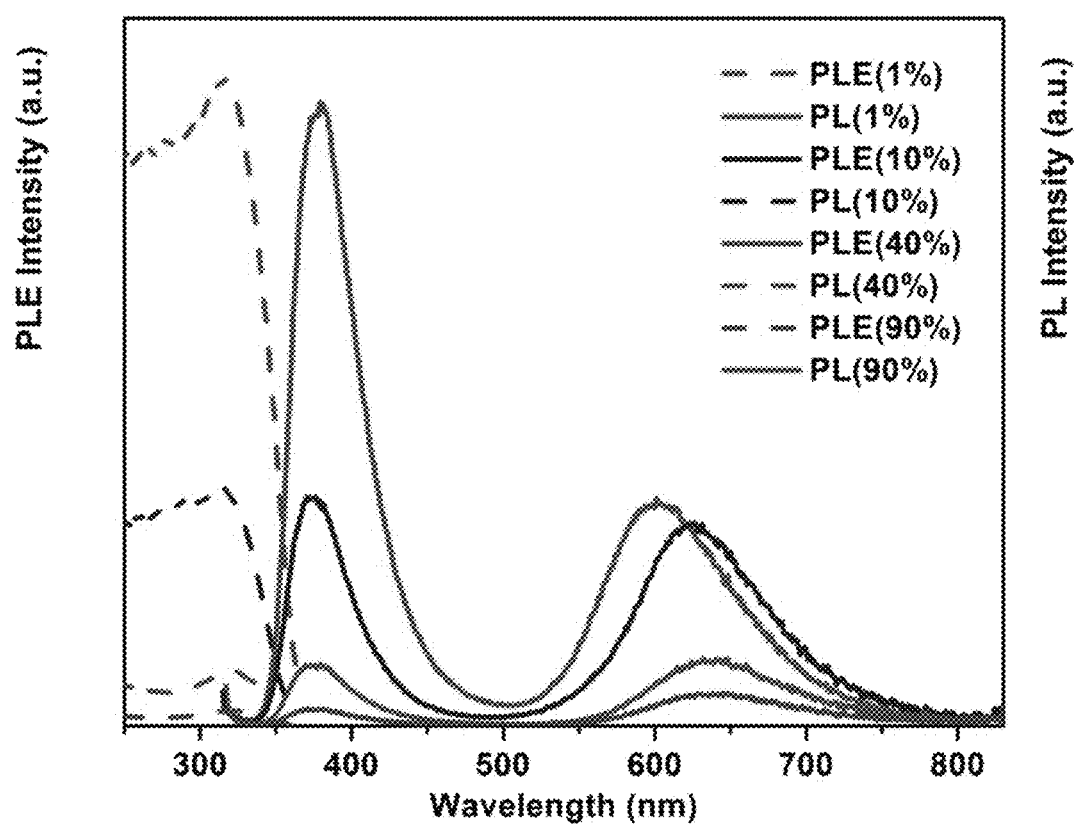
FIG. 24 illustrates that the PLE (dashed lines) and PL (solid lines) spectra of 3TCC@MOF-177 solids at different wt % of 3TCC in MOF-177 prepared using methanol at room temperature.
Figure 25A:
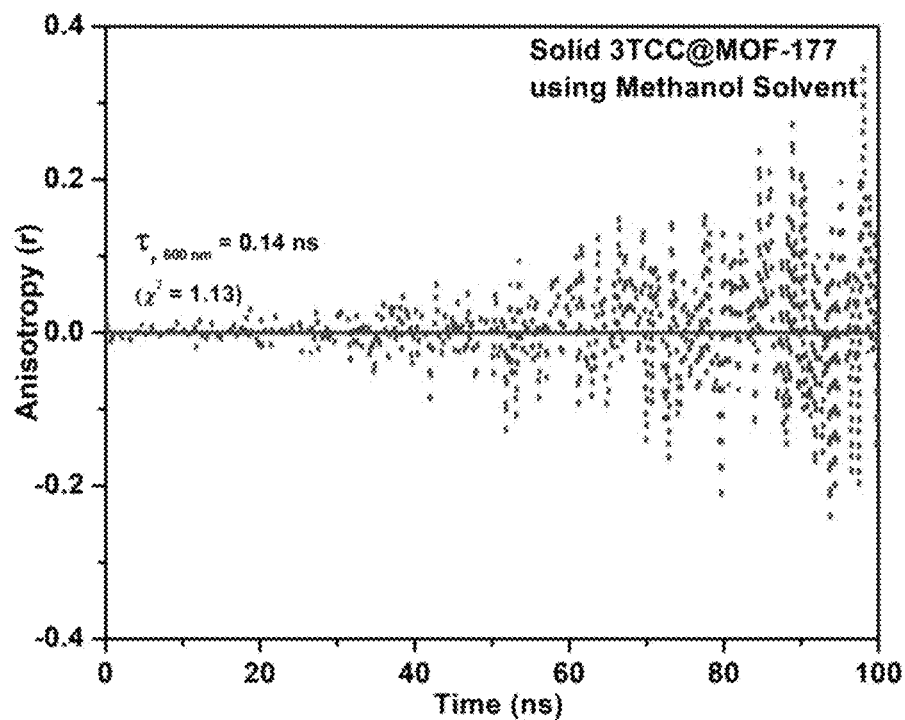
FIGS. 25A to 25F illustrates the anisotropy decays (green) and the single-exponential fit (red) to the experimental anisotropy data of 3TCC@MOF-177 solids (1 wt % 3TCC) at room temperature.
Figure 25B:
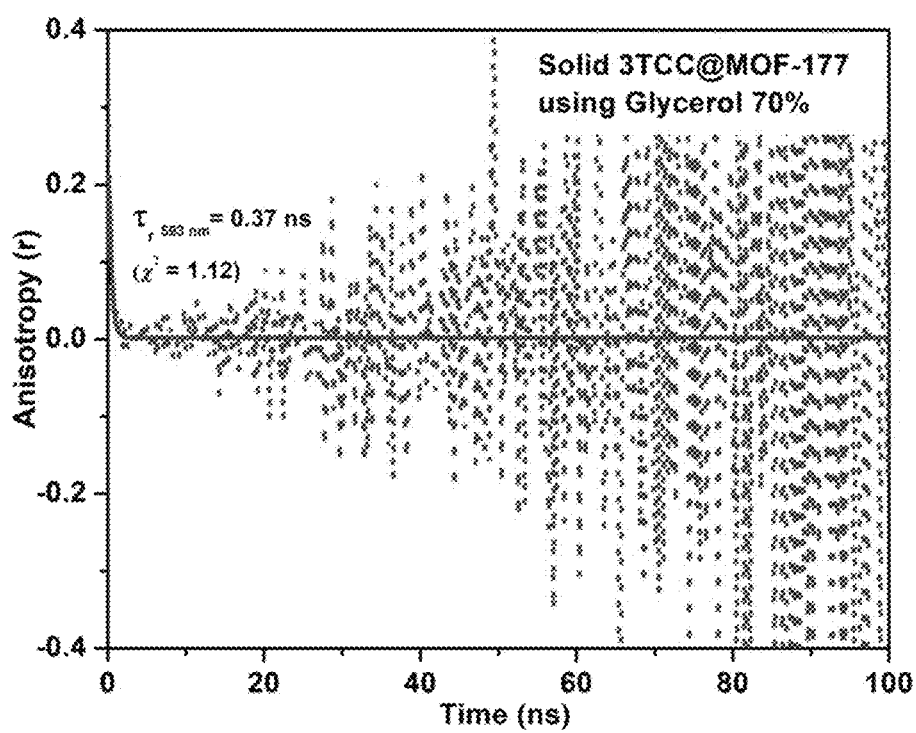
Figure 25C:
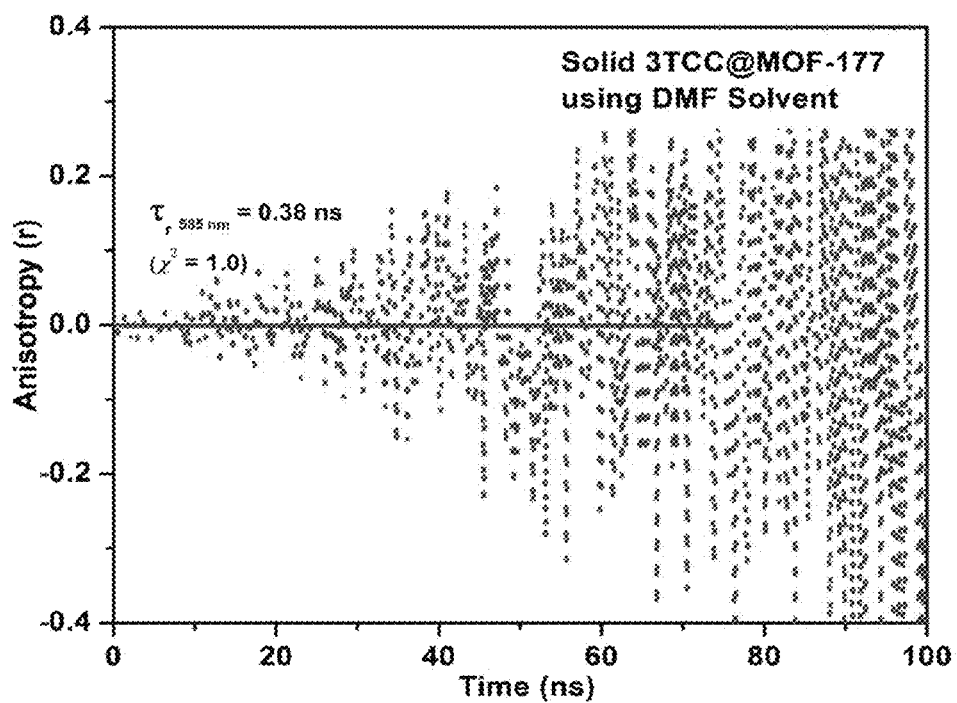
Figure 25D:
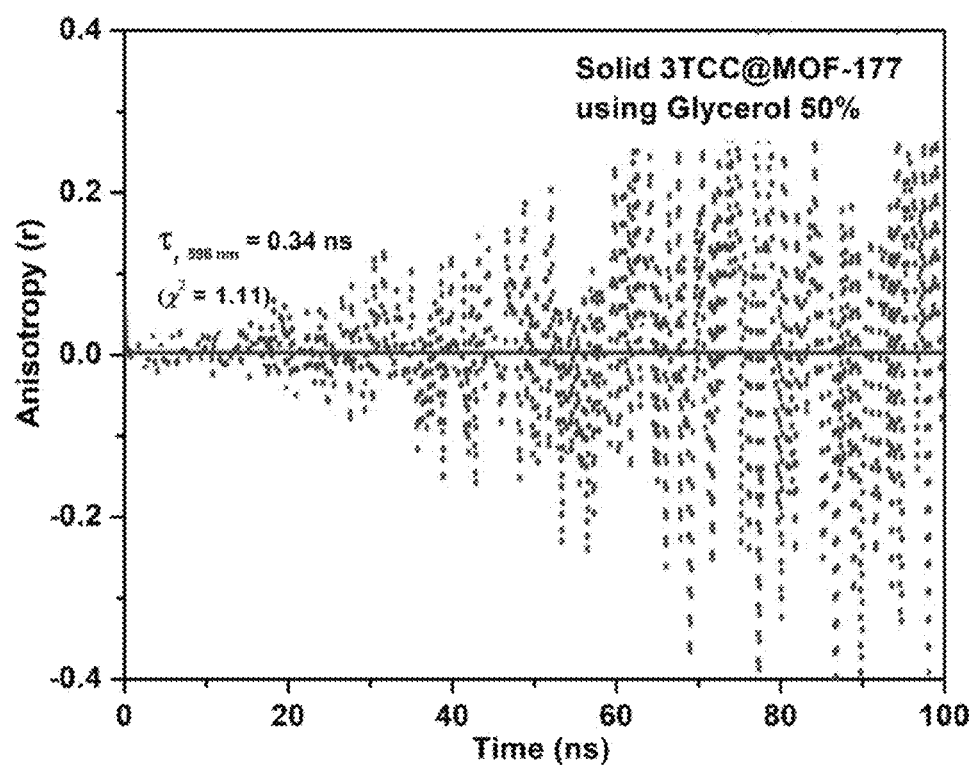
Figure 25E:
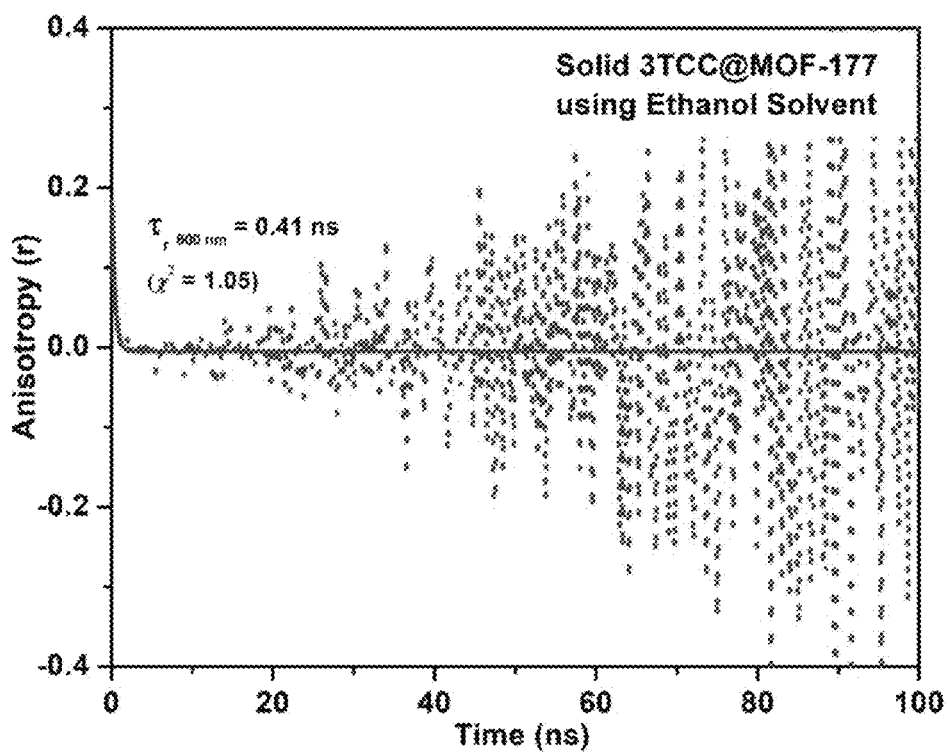
Figure 25F:
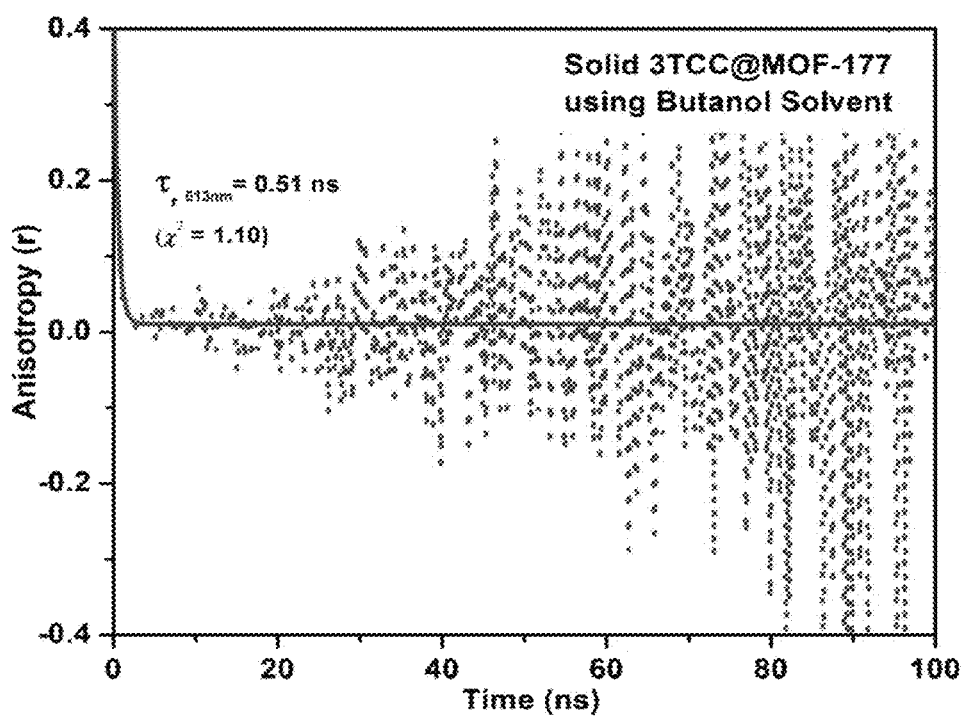

FIG. 24 illustrates that the PLE (dashed lines) and PL (solid lines) spectra of 3TCC@MOF-177 solids at different wt % of 3TCC in MOF-177 prepared using methanol at room temperature. The monitoring excitation and emission wavelengths are at the maxima in the graph.

It was observed that the PLQY values do not depend on the wt % of the dye inside the MOF range from 0.5 to 2% as provided in Table 5 and FIGS. 23A to 23F. It was observed from FIG. 24 and Table 5 that a weight % of 1% produced the highest PL intensity compared to 10%, 40%, and 90% without a significant change in the PL/PLE maxima.

FIGS. 25A to 25F illustrates the anisotropy decays (green) and the single-exponential fit (red) to the experimental anisotropy data [r(t)=r0 exp(-t/τr)] of 3TCC@MOF-177 solids (1 wt % 3TCC) at room temperature. The wavelength is taken from FIGS. 20A to 20L. The rotational correlation times with the chi-square of the fit, the monitoring emission wavelength, and the solvent used in the preparation step are indicated in the graphs. The excitation was 320 nm by a diode laser with a time resolution of 30 ps.

Correlation rotational times were also measured to determine how PLQY excited-state or PL average lifetime values depend on the selected solvent during preparation as indicated in FIGS. 25A to 25F and Table 5.

Figure 26A:
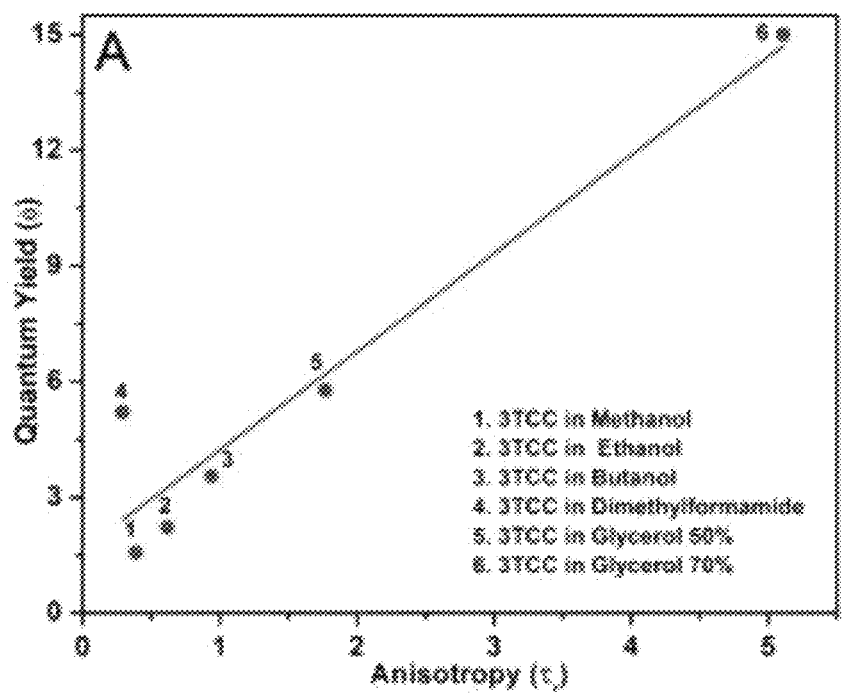
FIG. 26A illustrates a plot of the PLQY versus rotational time for 5 mM 3TCC (taken from Table 4) using solvents (1) methanol, (2) ethanol, (3) butanol, (4) dimethylformamide, (5) 50% glycerol in water, and (6) 70% glycerol in water.

FIG. 26A illustrates a plot of the PLQY versus rotational time for 5 mM 3TCC (taken from Table 4) using solvents (1) methanol, (2) ethanol, (3) butanol, (4) dimethylformamide, (5) 50% glycerol in water, and (6) 70% glycerol in water.

Figure 26B:
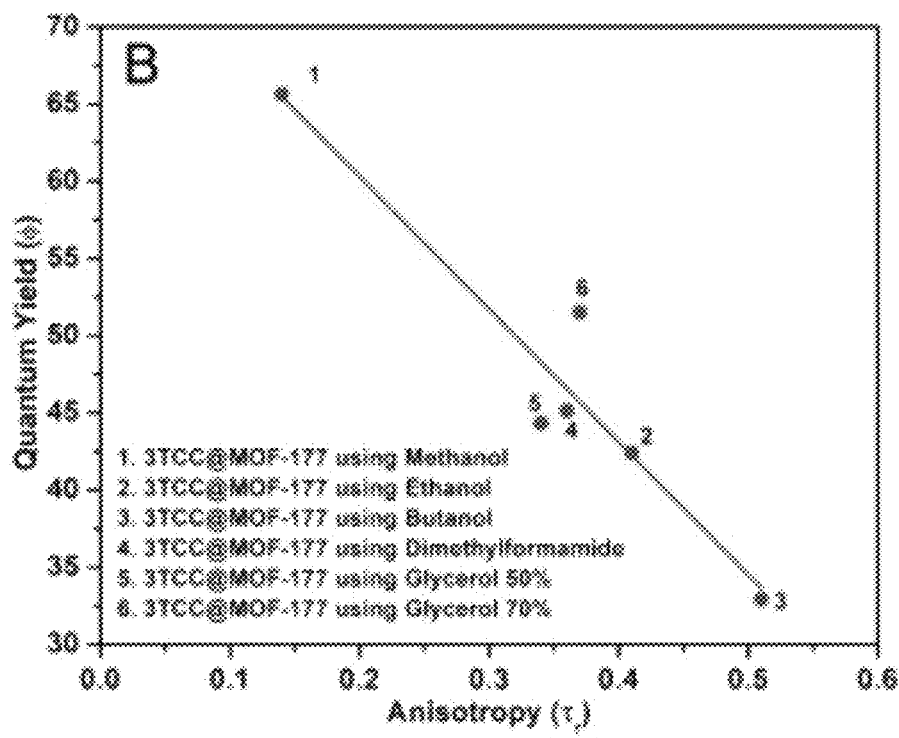
FIG. 26B illustrates a plot of PLQY versus rotational time for 3TCC@MOF-177 (taken from Table 6) prepared with one wt % of 3TCC in MOF-177 using the solvents: (1) methanol, (2) ethanol, (3) butanol, (4) dimethylformamide, (5) 20% glycerol in water, and (6) 70% glycerol in water.
Figure 27A:
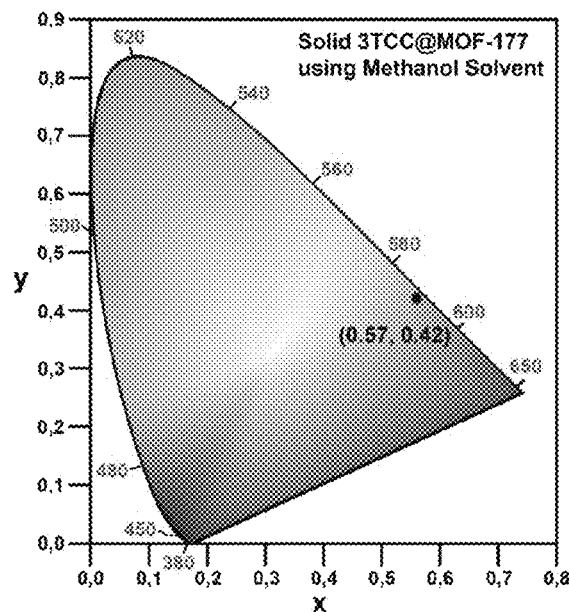
Figure 27B:
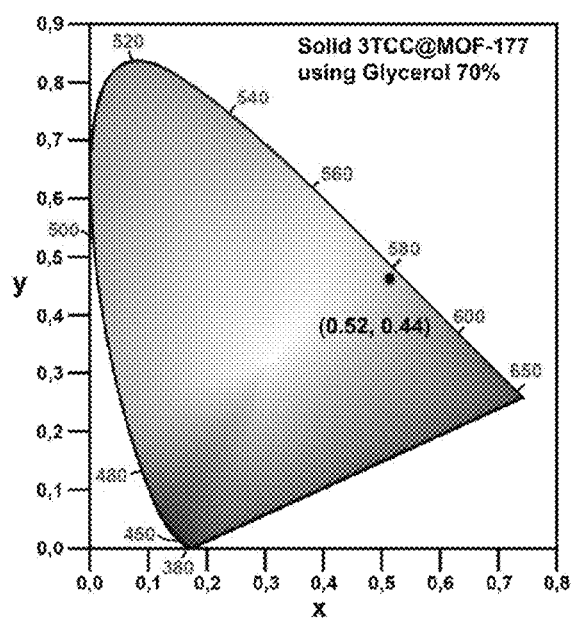
Figure 27C:
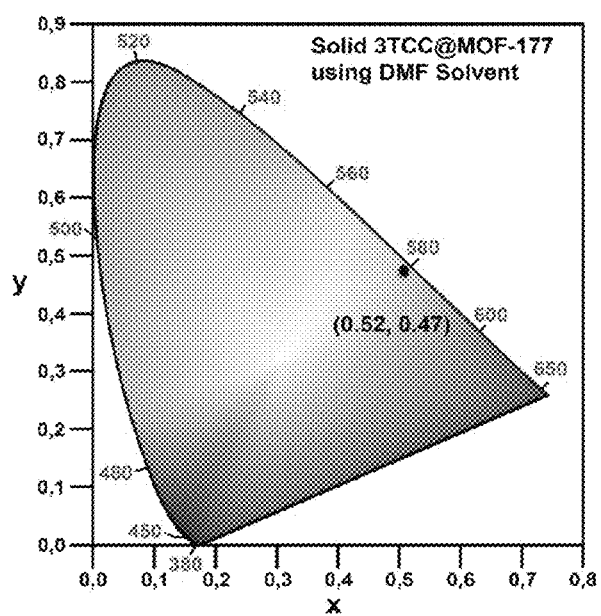
Figure 27D:
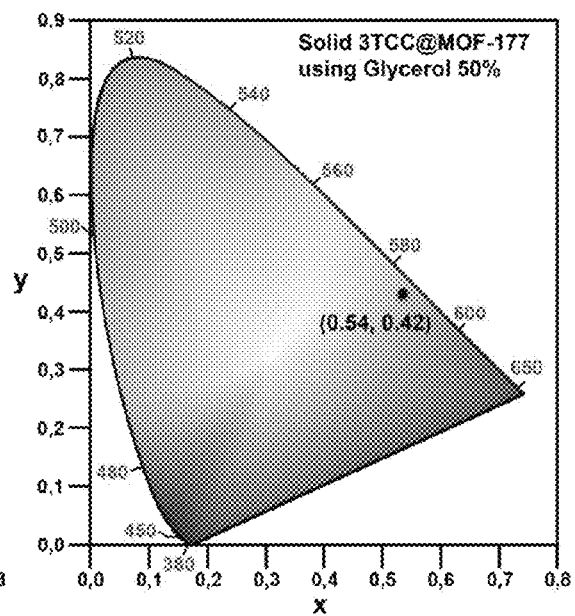

FIG. 26B illustrates a plot of PLQY versus rotational time for 3TCC@MOF-177 (taken from Table 6) prepared with one wt % of 3TCC in MOF-177 using the solvents: (1) methanol, (2) ethanol, (3) butanol, (4) dimethylformamide, (5) 20% glycerol in water, and (6) 70% glycerol in water.

The slight deviations pertinent to DMF (aprotic solvent) and glycerol-water mixture (solvent mixture) require further investigation with other solvents. In the selected solvents, data for modified solids exhibit an inverse trend compared to those for the 3TCC in solution, i.e., butanol>ethanol>methanol (points 1, 2, and 3 in FIG. 26A and FIG. 26B for neat protic solvents).

Contrary to the solution data provided in FIG. 16, a clear correlation was found between rotational times from anisotropy data and corresponding PLQY values from FIG. 26B following the order of methanol>ethanol>butanol. No correlation was found between PLQY excited-state and PL average lifetime values as provided in Table 5.

Interpretation of PLQY Enhancement of TICT@MOF-177 Solids

The experimental results collectively demonstrate that PLQY increases by up to 43-fold when the selected TICT fluorophores are relocated between the pure solvent and MOF pores. In a pure solvent, charge transfer can be expected to be promoted upon twisting the donor component of the TICT dye relevant to the acceptor component. The unprecedented turnover in absolute PLQY when TICT probes are present inside the pores of MOF-177 can be attributed to an entirely different mechanism in the MOF pores. The daylight and emission colors of the new solids are affected by the type of solvent selected during preparation, which confirms the presence of solvents inside the pores as provided in FIGS. 5A and 5B, FIGS. 6A to 6L, FIGS. 27A to 27F, and Table 5).

FIGS. 27A to 27F illustrate the chromaticity plot of 3TCC@MOF-177 solids emission in CIE 1931 color space, calculated using Fluoracle from the emission spectrum in FIG. 20A to 20L. The white point (0.33, 0.33) is shown as a reference. It is also seen that the solvent coordination to the Zn center inside the pores 3TCC@MOF-177, leads to the trend observed in FIGS. 26A and 26B.

The easily prepared luminescent solids can be utilized for sensing, optical memory, switching materials, and imaging technologies, enriching the photonics industry with new solid properties of MOF materials that can be easily fabricated, providing novel concepts in the development of optoelectronic devices.

Advantages

The 3TCC@MOF-177 solids of the invention mark an advancement in the field of luminescent materials by significantly increasing the photoluminescence quantum yield (PLQY) of MOF-based materials, achieving a 2 to 40-fold enhancement over existing benchmarks.

The method of manufacturing the hybrid inorganic-organic MOF compound of the invention introduces a simplified synthetic process that mixes 3TCC with MOF-177 and allows for solvent evaporation, streamlining the production without the need for complex modifications or additional chemicals. It also offers the ability to adjust the PLQY by varying the protic solvent used, demonstrating a novel level of control over the material's properties.

The incorporation of 1-cyano-2-[α-terthiophen-2-yl]-vinyl)carboxylic Acid (3TCC) within the MOF-177 matrix reveals a new interaction mechanism via hydrogen bonding, thereby enhancing PLQY. Additionally, observing the relationship between the anisotropic rotational times of the 3TCC@MOF-177 solids and their PLQY values introduces a method for optimizing luminescent properties through solvent choice.

The innovative method of enhancing photoluminescence quantum yields (PLQY) through the simple mixing of 1-cyano-2-[α-terthiophen-2-yl]-vinyl)carboxylic Acid (3TCC) with MOF-177 presents several advantages in the field of luminescent materials.

1. Significant PLQY Enhancement: The hybrid inorganic-organic MOF compound of the invention offers a remarkable improvement in PLQY, potentially increasing efficiency by 2 to 40 folds compared to existing solutions. This level of enhancement is unprecedented and can significantly boost the performance of photonic devices.
2. Simplified manufacturing process: The process eliminates the need for complex chemical synthesis or modifications, allowing for a more straightforward and accessible production of high-quality luminescent materials. This simplicity can lead to reduced production costs and shorter development cycles.
3. Versatility in Application: By allowing the PLQY and other properties to be tuned through the choice of solvent, this method provides flexibility in tailoring the material properties for specific applications, ranging from sensors to displays and beyond.

The innovative approach of enhancing photoluminescence quantum yields (PLQY) in hybrid inorganic-organic MOF compound through the simple mixing of 1-cyano-2-[α-terthiophen-2-yl]-vinyl)carboxylic Acid (3TCC) with MOF-177, followed by solvent evaporation, brings several tangible benefits to the field of photonic materials and their applications. These benefits, stemming from the unique features of the invention, include:

1. Enhanced efficiency and performance: The substantial increase in PLQY represents a leap in the efficiency and performance of luminescent materials, enabling brighter and more reliable outputs for photonic devices. This enhancement can significantly improve the operational efficacy of sensors, imaging technologies, and display systems.
2. Cost-effectiveness: The simplified synthetic process reduces the need for complex chemical modifications or the addition of expensive catalysts, making the production of high-PLQY luminescent materials more economical. This cost advantage makes it feasible to produce these materials on a larger scale, broadening their accessibility and application.
3. Operational Versatility: The ability to manipulate the PLQY and other photophysical properties of the material by simply changing the solvent used in its preparation introduces a level of operational versatility not available in prior art.
4. Ease of Production: The straightforward method of creating these luminescent materials—mixing two components and allowing the solvent to evaporate simplifies their production process. This ease of manufacture not only reduces production times but also makes it accessible to a wider range of facilities, including those with limited chemical processing capabilities.
5. Innovative Applications: The high PLQY and customizable properties of the hybrid inorganic-organic MOF compound of the invention opens up new avenues for innovative applications in fields such as photonic computing, high-resolution imaging, and advanced sensing technologies. The materials' enhanced brightness and stability can significantly improve the performance and reliability of devices in these areas.

In summary, this invention provides a straightforward, cost-effective, and versatile method for producing solid luminescent materials with unprecedented PLQY, facilitating advancements in photonics and related fields with potential benefits ranging from improved device performance to environmental sustainability.

This specification has been described with reference to embodiments of the invention. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

The invention claimed is:

1. A method of preparing a hybrid inorganic-organic metal organic framework compound with high photoluminescence quantum yields comprising:
   providing a dye,
   wherein the dye is 1-cyano-2-[α-terthiophen-2-yl]-vinyl) carboxylic acid,
   providing a metal organic framework, wherein the metal organic framework is MOF-177 and wherein MOF-177 comprises Zn4O(—COO)6 and triangular 1,3,5-benzenetribenzoate,
   providing a solvent,
   mixing the dye with the metal organic framework in the solvent to form a solvent mixture and
   heating the solvent mixture at a temperature of about 80° C. or more to obtain the hybrid inorganic-organic metal organic framework compound.

2. The method as claimed in claim 1, wherein the step of mixing the dye, the metal organic framework and the solvent involves mixing the dye and metal organic framework in 1 ml of the solvent in the ratio of 1% dye to the metal organic framework.

3. The method as claimed in claim 1, wherein the method further includes stirring the solvent mixture for 24 hours.

4. The method as claimed in claim 1, wherein the solvent is selected from any or a combination of methanol, ethanol, butanol, dimethylformamide (DMF) and glycerol in water.

5. The method as claimed in claim 4, wherein when the solvent is any of methanol, ethanol, butanol, and glycerol in water, the step of heating the solvent mixture is carried out until the solvent has evaporated.

6. The method as claimed in claim 4, wherein when the solvent is dimethylformamide, the step of heating the solvent mixture comprises heating at a temperature of about 120° C. until the solvent has evaporated.

7. The method as claimed in claim 1, wherein the hybrid inorganic-organic metal organic framework compound is 3TCC@MOF-177, and wherein 3TCC@MOF-177 comprises 1-cyano-2-[α-terthiophen-2-yl]-vinyl)carboxylic acid@Zn4O(—COO)6 and triangular 1,3,5-benzenetribenzoate.

* * * * *